(12) United States Patent  
Yanai

(10) Patent No.: US 9,217,887 B2  
(45) Date of Patent: Dec. 22, 2015

(54) STEREOSCOPIC IMAGE RECOGNITION APPARATUS

(71) Applicant: FUJIFILM Corporation, Tokyo (JP)

(72) Inventor: Yujiro Yanai, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 122 days.

(21) Appl. No.: 13/707,991

(22) Filed: Dec. 7, 2012

(65) Prior Publication Data

US 2013/0093968 A1 Apr. 18, 2013

Related U.S. Application Data

(63) Continuation of application No. PCT/JP2011/063420, filed on Jun. 10, 2011.

(30) Foreign Application Priority Data

Jun. 10, 2010 (JP) .................................. 2010-133007  
Jun. 9, 2011 (JP) .................................. 2011-129624

(51) Int. Cl.
| | |
|---|---|
| G02F 1/1335 | (2006.01) |
| G02F 1/133 | (2006.01) |
| G02F 1/1347 | (2006.01) |
| G02F 1/13 | (2006.01) |

(Continued)

(52) U.S. Cl.  
CPC ............ *G02F 1/1313* (2013.01); *G02F 1/1347* (2013.01); *G02F 1/13363* (2013.01); *G02B 27/26* (2013.01); *G02F 2001/133638* (2013.01)

(58) Field of Classification Search  
CPC . G02F 1/13363; G02F 1/1347; G02F 1/1313; G02F 2001/133638; G02B 27/26  
USPC ................................................. 349/15, 73–74  
See application file for complete search history.

(56) References Cited

U.S. PATENT DOCUMENTS

| | | | | |
|---|---|---|---|---|
| 2002/0044350 | A1* | 4/2002 | Sato et al. ...................... | 359/465 |
| 2005/0151906 | A1* | 7/2005 | Yoshimi et al. ................ | 349/118 |

(Continued)

FOREIGN PATENT DOCUMENTS

| | | |
|---|---|---|
| JP | 02-000023 A | 1/1990 |
| JP | H10-232365 A | 9/1998 |

(Continued)

OTHER PUBLICATIONS

Office Action issued by the Chinese State Intellectual Property Office (SIPO) on Dec. 2, 2014, in connection with Chinese Patent Application No. 201180038813.4.

(Continued)

*Primary Examiner* — Nathanael R Briggs  
(74) *Attorney, Agent, or Firm* — Jean C. Edwards, Esq.; Edwards Neils PLLC

(57) ABSTRACT

Provided is a stereoscopic image forming apparatus which is excellent from the viewpoint of brightness, flicker, and crosstalk when viewed from the front side while tilting a face, and suppresses crosstalk at the time of oblique observation. The stereoscopic image recognition apparatus including: a liquid crystal display device including a liquid crystal cell and a pair of polarizing plates on the both sides of the liquid crystal cell; and a time division image display interception device including a polarizer, a liquid crystal encapsulation body, and a λ/4 plate B.

2 Claims, 6 Drawing Sheets

(51) Int. Cl.
  *G02F 1/13363* (2006.01)
  *G02B 27/26* (2006.01)

(56) References Cited

U.S. PATENT DOCUMENTS

| | | |
|---|---|---|
| 2005/0185124 A1 | 8/2005 | Kadoya |
| 2006/0216440 A1 | 9/2006 | Nishikawa et al. |
| 2008/0088752 A1* | 4/2008 | Kim et al. ............... 349/15 |
| 2009/0002580 A1* | 1/2009 | Matsushima et al. ........ 349/12 |
| 2010/0053488 A1* | 3/2010 | Kim et al. ............... 349/48 |

FOREIGN PATENT DOCUMENTS

| | | |
|---|---|---|
| JP | 2001-091951 A | 4/2001 |
| JP | 2002-082307 A | 3/2002 |
| JP | 2003-050376 A | 2/2003 |
| JP | 2004-226945 A | 8/2004 |
| JP | 2005-221532 A | 8/2005 |

OTHER PUBLICATIONS

Office Action issued by the Korean Intellectual Property Office (KIPO) on Aug. 21, 2015 in connection with Korean Patent Application No. 2012-7032028.

* cited by examiner

A schematic view illustrating examples of the optical film of the present invention Schematic view illustrating examples of polarizing plate

STEREOSCOPIC IMAGE RECOGNITION APPARATUS

CROSS-REFERENCE TO RELATED APPLICATIONS AND PRIORITY CLAIMS

This application is a Continuation of International Application No. PCT/JP2011/063420 filed on Jun. 10, 2011, which was published under PCT Article 21(2) in Japanese, which is based upon and claims the benefit of priority from Japanese Patent Applications Nos. 2010-133007 filed on Jun. 10, 2010, and 2011-129624, which was filed Jun. 9, 2011, the contents of all of which are incorporated herein by reference in their entirety.

TECHNICAL FIELD

The present invention relates to a stereoscopic image recognition apparatus capable of recognizing an image without crosstalk when obliquely viewing a liquid crystal display device that projects an image displayed stereoscopically by a time division method.

BACKGROUND ART

A stereoscopic image recognition apparatus disclosed in Patent Document 1 is known as a time division image display interception device that includes a liquid crystal display device including a liquid crystal, cell and a pair of polarizing plates on the front and rear sides thereof as a main construction, and a liquid polarizing plate and a liquid crystal cell in a shape of glasses.

As a construction of tire stereoscopic image recognition apparatus, there is a type that has a λ/4 plate on a visible side of a display side polarizing plate of a liquid crystal display device, and has a liquid crystal encapsulation body and a λ/4 plate on the outside of the polarizing plate of the time division image display interception device.

Although this exemplary embodiment may suppress flicker that is a fluctuation phenomenon unique to a stereoscopic image display device, there is a problem in that when obliquely viewing the stereoscopic image display device, the differentiation between a right eye image and a left eye image which is a mechanism for recognizing a stereoscopic image may not be fully recognized, and a so-called crosstalk phenomenon may occur, which causes the image to be seen dually to a viewer.

In order to solve this problem, Patent Document 2 discloses a technology in which a member used as a λ/4 plate is formed by aligning a discotic liquid crystal on a transparent support.

It has been found out that if the negative A plate described in Patent Document 2 is applied to the stereoscopic image forming apparatus described in Patent Document 1, the crosstalk phenomenon may substantially be reduced.

RELATED ART

Patent Document

[Patent Document 1] Japanese Patent Application Laid-open No. 2002-82307
[Patent Document 2] Japanese Patent Application Laid-open No. 2004-226945

DISCLOSURE OF INVENTION

Problems to be Solved by the Invention

However, the crosstalk problem changes according to the azimuth angle of a viewer. Even if a stereoscopic image forming apparatus was configured by combining the technologies disclosed in the two patent documents mentioned above, it has not been possible to solve the problem of the crosstalk that has a dependence on the azimuth angle.

The present invention has been made in consideration of the above-mentioned problems, and an object of the present invention is to provide a stereoscopic image forming apparatus which is excellent from the viewpoint of brightness, flicker, and crosstalk when viewed from the front side while tilting a face, and which suppresses the crosstalk at the time of an oblique observation.

Means for Solving the Problems

[1] A stereoscopic image recognition apparatus including:
a liquid crystal display device including a liquid crystal cell and a pair of polarizing plates on both sides of the liquid crystal cell; and
a time division image display interception device including a polarizer, a liquid crystal encapsulation body, and a λ/4 plate B,
wherein a λ/4 plate A is disposed on a visible side of the polarizer of a display side polarizing plate in the liquid crystal display device,
the liquid crystal encapsulation body and the λ/4 plate B are disposed on a liquid crystal display device side of the polarizer in the time division image display interception device,
an absorption axis of the display side polarizer in the liquid crystal display device and an absorption axis of the polarizer in the time division image display interception device are orthogonal or parallel to each other,
an angle formed by the absorption, axis of the display side polarizer in the liquid crystal display device and a slow axis of the λ/4 plate A is 45° or 135°,
the slow axes of the λ/4 plate A and the λ/4 plate B are orthogonal or parallel to each other,
the λ/4 plate A and the λ/4 plate B include a transparent support, an alignment film, and an optically anisotropic layer containing a discotic liquid crystal compound,
the discotic liquid crystal compound in the optically anisotropic layer is aligned substantially perpendicular to a plane of the optically anisotropic layer, and
the polarizer of the display side polarizing plate in the liquid crystal display device, the transparent support of the λ/4 plate A, the alignment film of the λ/4 plate A, and the optically anisotropic layer of the λ/4 plate A are arranged toward the visible side in this order.

[2] A stereoscopic image recognition apparatus including:
a liquid crystal display device including a liquid crystal cell, and a pair of polarizing plates on both, sides of the liquid crystal cell; and
a time division image display interception device including a polarizer, a liquid crystal encapsulation body, and a λ/4 plate B,
wherein a λ/4 plate A is disposed on a visible side of the polarizer of a display side polarizing plate in the liquid crystal display device,
the liquid crystal encapsulation body and the λ/4 plate B are disposed on a liquid crystal display device side of the polarizer in the time division image display interception device,
an absorption axis of the display side polarizer in the liquid crystal display device and an absorption axis of the polarizer in the time division image display interception device are orthogonal or parallel to each other, an angle formed by the absorption axis of the display side polarizer of the liquid crystal display device and a slow axis of the λ/4 plate A is 45° or 135°, the slow axes of the λ/4 plate A and the λ/4 plate B are orthogonal or parallel to each other, the λ/4 plate A and the λ/4 plate B include a transparent support, an alignment film, and an optically anisotropic layer containing a discotic liquid crystal compound, the discotic liquid crystal compound in the optically anisotropic layer is aligned substantially perpendicular to a plane of the optically anisotropic layer, and the polarizer of the display side polarizing plate of the liquid crystal display device, the optically anisotropic layer of the λ/4 plate A, the alignment film of the λ/4 plate A, and the transparent support of the λ/4 plate A are arranged toward the visible side in this order.

[3] The stereoscopic image recognition apparatus of [1], wherein in at least one of the λ/4 plate A and λ/4 plate B, the retardation Rth in the thickness direction at the wavelength of 550 nm of the transparent support is 0 nm to 130 nm.

[4] The stereoscopic image recognition apparatus of [1], wherein in at least one of the λ/4 plate A and λ/4 plate B, a value expressed in the following equation is 0 to 2:

$$Rth/Re+0.5$$

Wherein Re is an in-plane retardation at the wavelength of 550 nm, and Rth is a retardation in the thickness direction, at the wavelength of 550 nm.

[5] The stereoscopic image recognition apparatus of [1], wherein an anti-reflection layer is provided on a surface of the λ/4 plate A.

[6] The stereoscopic image recognition apparatus of [2], wherein in at least one of the λ/4 plate A and λ/4 plate B, the retardation Rth in the thickness direction at the wavelength of 550 nm of the transparent support is 0 nm to 130 nm.

[7] The stereoscopic image recognition apparatus of [2], wherein in at least one of the λ/4 plate A and λ/4 plate B, a value expressed in the following equation is 0 to 2:

$$Rth/Re+0.5$$

wherein Re is an in-plane retardation at the wavelength of 550 nm, and Rth is a retardation in the thickness direction at the wavelength of 550 nm.

[8] The stereoscopic image recognition apparatus of [2], wherein an anti-reflection layer is provided on a surface of the λ/4 plate A.

Effects of the Invention

According to the present invention, if is possible to provide a stereoscopic image forming apparatus which is excellent from the view point of brightness, flicker, and crosstalk when viewed from the front side while tiling a face, and which suppresses the crosstalk at the time of oblique observation.

DETAILED DESCRIPTIONS FOR CARRYING OUT THE INVENTION

Figure 1:
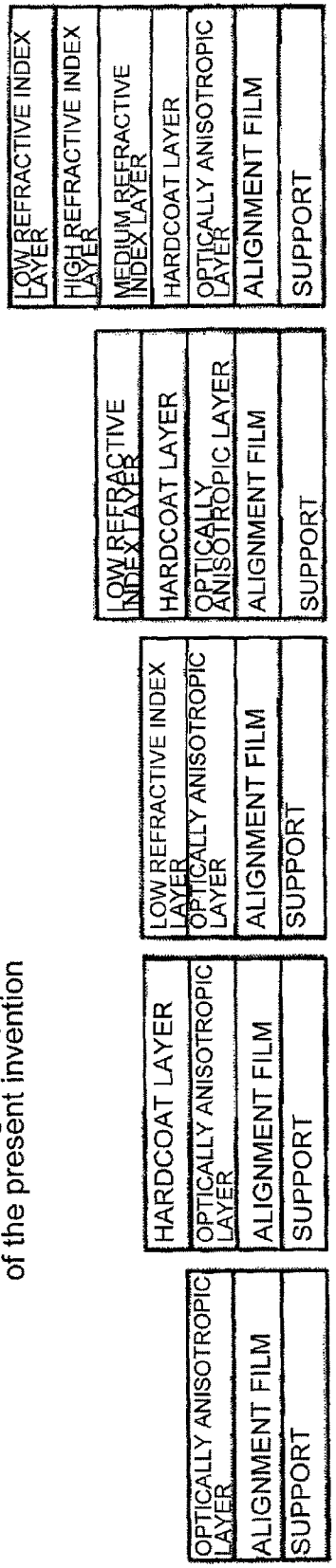
FIG. 1 is a schematic view illustrating an example of a λ/4 plate (an optical film) according to the present invention.

Hereinafter, the present invention will be described in detail.

Meanwhile, in the description of present embodiment, "parallel" or "orthogonal" means a range within an exact angle ± less than 5°. An error with the exact angle is preferably less than 4°, and more preferably less than 3°.

Furthermore, about the angle, "+" means a clockwise direction, and "−" means a counterclockwise.

In addition, fee "slow axis" means the direction where the refractive index becomes the maximum, and unless otherwise described, the measurement wavelength of the refractive index is a value in the visible light region (λ=550 nm).

Furthermore, in the description of the present embodiment, unless specifically described, the "polarizing plate" is used as a meaning to include both a long polarizing plate and a polarizing plate cut into a size suitable for being incorporated into a display device. Meanwhile, "cutting" as mentioned herein also includes "punching", "clipping" and the like. Further, in the description of the present embodiment, the "polarization film" and "polarizing plate" are used differently, but the "polarizing plate (polarizer)" means a laminate having, on at least one side of a "polarizing film", a transparent protective film to protect the polarizing film.

In addition, in the description of the present embodiment, the "molecular symmetry axis" indicates, when a molecule has a rotational-symmetry axis, the symmetry axis thereof, hut it is not required that the molecule satisfies rotational symmetry in the strict sense. In general, in a discotic liquid crystalline compound, the molecular symmetry axis coincides with an axis vertical to the disc plane passing through, the center of the disc plane, and in a rod-like liquid crystalline compound, the molecular symmetry axis coincides with a major axis of the molecule.

Furthermore, in the present specification, Re (λ) and Rth (λ) represent an in-plane retardation and a retardation in a thickness direction at a wavelength of λ, respectively. Re (λ) is measured by irradiating with an incident light having a wavelength of λ nm in the normal direction of the film in KOBRA 21ADH or WR (manufactured by Oji Scientific instruments Co., Ltd.). In selecting the measurement wavelength λ nm, measurement may be performed by exchanging a wavelength selective filter manually or converting measured values into a program or the like. When a film to be measured is represented by a uniaxial or biaxial refractive index ellipsoid, Rth (λ) is calculated by the following method. Meanwhile, this measurement method is used partially in the measurement of the mean tilt angle on the side of the alignment film of discotic liquid crystal molecules in an optically anisotropic layer as described below or on the side opposite to the same.

A total of six points of the Re (λ) are measured by irradiating with an incident light having a wavelength of λ nm from each of the inclined directions at an angle increasing in 10° step increments up to 50° in one direction from the normal direction of the film by using the in-plane slow axis (decided by KOBRA 21ADH or WR) as an inclined axis (rotation axis) (when there is no slow axis, any in-plane direction of the film is used as a rotation axis), and then Rth (λ) is calculated by KOBRA 21ADH or WR based on the retardation value measured, a hypothetical value of the average refractive index, and the inputted film thickness value. In the description, in the case of a film having a direction in which a retardation value is zero at a certain tilt angle about the in-plane slow axis from the normal direction as an axis of rotation, a retardation value at a tilt angle greater than, the tilt angle is changed into a minus sign, and then, is calculated by KOBRA 21DH or WR. Meanwhile, with the slow axis as an inclined axis (rotation axis) (when there is no slow axis, any in-plane direction of the film is used as a rotation axis), retardation values may be measured from any two inclined directions and Rth may also be calculated from the following equations (A) and (III) based on the values, a hypothetical value of an average refractive index and an inputted film thickness value.

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Equation (A)

Meanwhile, the Re (θ) represents a retardation value in a direction inclined by an angle (θ) from the normal direction. Further, in Equation (A), nx represents a refractive index in an in-plane slow axis direction, ny represents a refractive index in an in-plane direction orthogonal to nx, and nz represents a refractive index in a direction orthogonal to nx and ny.

$$Rth((nx+ny)/2-nz) \times d$$

Equation (III)

In the case where a film to be measured may not be represented by a uniaxial or biaxial refractive index ellipsoid, a so-called film having no optic axis, Rth (λ) is calculated by the following method. Eleven points of the Re (λ) are measured by irradiating with an incident light having a wavelength of λ nm from each, of the inclined directions at an angle increasing from −50° to +50° in 10° step increments with respect to the normal direction of the trim by using the in-plane slow axis (decided by KOBRA 21ADH or WR) as an inclined axis (rotation axis), and then Rth (λ) is calculated by KOBRA 21ADH or WR based on the retardation value measured, a hypothetical value of an average refractive index and an inputted film thickness value. In addition, in the above-described measurements, values described in Polymer Handbook (John Wiley & Sons, Inc.) and catalogues of various optical films may be used as the hypothetical value of the average refractive index. The average refractive index of which value is not already known may be measured by an Abbe refractometer. Values of average refractive indices of main optical films are illustrated below: Cellulose acylate (1.48), cycloolefin polymer (1.52), polycarbonate (1.59), polymethyl methacrylate (1.49) and polystyrene (1.59). By inputting these hypothetical values of average refractive index and the film thickness, nx, ny and nz are calculated by KOBRA 21ADH or WR. From these calculated nx, ny, and nz, Nz=(nx−nz)/(nx−ny) is further calculated.

(Measurement of Tilt Angle)

In an optically anisotropic layer in which a discotic liquid crystalline compound or a rod-like liquid crystalline compound is aligned, it is difficult to directly and exactly measure a tilt angle (an angle of a physical target axis in the discotic liquid crystalline compound or the rod-like liquid crystalline compound with the interface of the optically anisotropic layer is referred to as a tilt angle) (θ1) on one side of the optically anisotropic layer and a tilt angle (θ2) on the other side. Thus, in the present specification, θ1 and θ2 are calculated by the following technique. The technique does not exactly express the actual alignment state of the present invention, but is effective as a means for showing the relative relationship of a part of the optical characteristics possessed by an optical film.

In order to ease the calculation in the technique, the following two points are assumed as tilt angles at the two interfaces of the optically anisotropic layer.

1. The optically anisotropic layer is assumed to be a multilayered body composed of a layer including a discotic liquid crystalline compound or a rod-like liquid crystalline compound. Further, the layer of the smallest unit constituting the same (assuming that the tilt angles of the discotic liquid crystalline compound or the rod-like liquid crystalline compound are uniform in the layer) is assumed to be optically uniaxial.

2. The tilt angle in each layer is assumed to monotonously change as a linear function along the thickness direction of the optically anisotropic layer.

The specific calculation method is as follows.

(1) Within a plane in which the tilt angle of each layer monotonously changes as a linear function along the thickness direction of the optically anisotropic layer, the retardation values are measured at 3 or more measurement angles by changing the incident angle of a measurement light on the optically anisotropic layer. For simplification of the measurement and the calculation, it is preferred that the normal direction to the optically anisotropic layer is set at 0°, and the retardation values are measured at 3 measurement angles of −40°, 0° and +40°. These measurements may be performed by KOBRA-21ADH and KOBRA-WR (manufactured by Oji Scientific instruments Co., Ltd.), and transmission type ellipsometers AEP-100 (manufactured by Shimadzu Corporation), M150 and M520 (manufactured by JASCO Corporation), and ABRIOA (manufactured by Uniopt Corporation).

(2) In the model, the refractive index of an ordinary light of each layer is represented by no, the refractive index of an extraordinary light is represented by ne (ne is the same value for all the layers, and the same applies to no), and the thickness of the whole multilayered body is represented by d. Further, on the assumption that the tilt direction at each layer coincides with the uniaxial optical axis direction of the layer, fating is performed with the tilt angle (θ1) on one side of the optically anisotropic layer and the tilt angle (θ2) on the other side thereof as variables to calculate θ1 and θ1, such that the calculation of the angle dependency of the retardation value of the optically anisotropic layer coincides with the measured value.

Herein, for no and ne, known values such as bibliographic values and catalogue values may be used. When the value is unknown, the value may also be measured by using an Abbe refractometer. The thickness of the optically anisotropic layer may be measured by an optical interference thickness meter, a cross-sectional photograph of a scanning electron microscope and the like.

The present invention relates to stereoscopic Image recognition apparatuses as described in [1] and [2] below.

[1] A stereoscopic image recognition apparatus including:
a liquid crystal display device including a liquid crystal cell, and a pair of polarizing plates on both sides of the liquid crystal cell (a pair of polarizing plates consisting of a backlight side polarizing plate and a display side polarizing plate); and a time division, image display interception device including a polarizer, a liquid crystal encapsulation body, and a λ/4 plate B, wherein, a λ/4 plate A is disposed on a visible side of the polarizer of a display side polarizing plate of the liquid crystal display device, the liquid crystal encapsulation body and the λ/4 plate B are disposed on a liquid crystal display device side of the polarizer of the time division image display interception device, an absorption axis of fee display side polarizer of the liquid crystal display device and an absorption axis of the polarizer of the time division image display interception device are orthogonal or parallel to each other, an angle formed by the absorption axis of the display side polarizer of the liquid crystal display device and a slow axis of the λ/4 plate A is 45° or 135°, the slow axes of the λ/4 plate A and the λ/4 plate B are orthogonal or parallel to each other, the λ/4 plate A and the λ/4 plate B include a transparent support, an alignment film, and an optically anisotropic layer containing a discotic liquid crystal compound, the discotic liquid crystal, compound in the optically anisotropic layer is aligned substantially orthogonal to a plane of the optically anisotropic layer, and the polarizer of the display side polarizing plate of the liquid crystal display device, the transparent support of the λ/4 plate A, the alignment film of the λ/4 plate A, and the optically anisotropic layer of the λ/4 plate A are arranged toward the visible side in this order.

[2] A stereoscopic image recognition apparatus including:

a liquid crystal display device including a liquid crystal cell, and a pair of polarizing plates on the both sides of the liquid crystal cell (a pair of polarizing plates consisting of a backlight side polarizing plate and a display side polarizing plate); and a time division image display interception device including a polarizer, a liquid crystal encapsulation body, and a λ/4 plate B, wherein a λ/4 plate A is disposed on a visible side of the polarizer of a display side polarizing plate of the liquid crystal display device, the liquid crystal encapsulation body and the λ/4 plate B are disposed on a liquid crystal display device side of the polarizer of the time division image display interception device, an absorption axis of the display side polarizer of the liquid crystal display device and an absorption axis of the polarizer of the time division image display interception device are orthogonal or parallel to each other, an angle formed by the absorption axis of the display side polarizer of the liquid crystal display device and a slow axis of the λ/4 plate A is 45° or 135°, the slow axes of the λ/4 plate A and the λ/4 plate B are orthogonal or parallel to each other, the λ/4 plate A and the λ/4 plate B include a transparent support, an alignment film, and an optically anisotropic layer containing a discotic liquid crystal compound, the discotic liquid crystal compound in the optically anisotropic layer is aligned substantially orthogonal to a plane of the optically anisotropic layer, and the polarizer of the display side polarizing plate of the liquid crystal display device, the optically anisotropic layer of the λ/4 plate A, the alignment film of the λ/4 plate A, and the transparent support of the λ/4 plate A are arranged toward the visible side in this order.

Hereinafter, various materials and manufacturing method used for manufacturing the λ/4 plate, the polarizer, and the image forming device in the present invention will be described in detail.

[λ/4 Plate]

The λ/4 plates in me present invention will be described. The λ/4 plate A and the λ/4 plate B may be same or different from each other. Now, a λ/4 plate which may be used as the λ/4 plate A and the λ/4 plate B will be described. The λ/4 plate in the present invention includes an optically anisotropic layer having a refractive index anisotropy developed by the vertical alignment of a discotic liquid crystal compound. The optically anisotropic layer is preferably formed from a composition containing a discotic liquid crystalline compound. In addition, a layer may be included which has an optical anisotropy developed by stretching a polymer film to align polymer molecules in the film.

An in-plane retardation of the λ/4 plate (Re550) in the present invention is preferably 100 nm to 175 nm, more preferably 110 nm to 165 nm, and still more preferably 120 nm to 155 nm.

The retardation in the thickness direction of the λ/4 plate in the present invention is preferably −400 nm to 260 nm, more preferably −200 nm to 160 nm, and still more preferably −90 nm to 80 nm.

It is desirable that the Re450/Re550 of the λ/4 plate is not more than 1.18 and not less than 0.93. With this separate range it is possible to obtain a less optical wavelength-dependent or incident angle-dependent λ/4 plate.

In the present specification, the λ/4 plate in the present invention may be referred to as an "optical film". In addition, the λ/4 plate in the present invention may be an optical film in which various functional layers are laminated to exhibit various functions.

In the present invention, from the viewpoint of maintaining an on-axis circular polarization property in a inclined direction in at least one of the λ/4 plate A and the λ/4 plate B as well, a value expressed by the following equation is preferably 0 to 2, more preferably 0.2 to 1, and still more preferably 0.4 to 0.6.

$$Rth/Re+0.5$$

Re is an in-plane retardation at a wavelength of 550 nm, and Rth is a retardation in the thickness direction at a wavelength of 550 nm.

[Optically Anisotropic Layer Containing a Discotic Liquid Crystalline Compound]

There is no specific limitation on the type of the discotic liquid crystalline compound used in forming the optically anisotropic layer provided in the λ/4 plate. For example, it is possible to use an optically anisotropic layer obtained by forming a low molecular liquid crystalline compound in a nematic alignment in the liquid crystal state, and fixing the alignment by photo-crosslinking or thermal crosslinking, or an optically anisotropic layer obtained by forming a high molecular liquid crystalline compound in a nematic alignment in the liquid crystal state, and fixing the alignment by photo-crosslinking or thermal crosslinking. In addition, in the present invention, if the optically anisotropic layer is a layer formed by a corresponding discotic liquid crystalline component fixed by polymerization or the like, the optical anisotropy layer does not necessarily exhibit the liquid crystalline property after the layer is formed. A polymerizable liquid crystalline compound may be a multifunctional polymerizable liquid crystal or a monofunctional polymerizable liquid crystal.

In the optically anisotropic layer, the molecules of the discotic liquid crystal compound are aligned and fixed in the vertical alignment state. In order to fabricate a phase difference plate of which the viewing angle dependency is symmetrical, the discotic plane of the discotic liquid crystalline is preferably substantially perpendicular to the film plane (the plane of the optically anisotropic layer). The description that the discotic liquid crystalline compound is substantially perpendicular means that the mean value of the angles formed by the film plane (the plane of the optically anisotropic layer) and discotic planes of the discotic liquid crystalline compound is within the range of 70° to 90°. 80° to 90° are more preferred, and 85° to 90° are still more preferred.

The λ/4 plate preferably includes an optically anisotropic layer containing a liquid crystalline compound, and the optically anisotropic layer may be composed of only one layer or a laminate of optically anisotropic layers having two or more layers.

The optically anisotropic layer may be formed by coating a liquid crystalline compound such as a rod-like liquid crystalline compound or a discotic liquid crystalline compound, and if desired, a coating solution containing a polymerization initiator, an alignment controlling agent or other additives as described below, on a support. It is preferred that an alignment film is formed on a support and then the optically anisotropic layer is formed by coating the coating solution on the surface of the alignment film.

[Discotic Liquid Crystalline Compound]

In the present invention, it is preferred that a discotic liquid crystalline compound is used for forming the optically anisotropic layer that the λ/4 plate has. The discotic liquid crystalline compound is described in various documents (C. Destrade et al., Mol. Cryst. Liq. Cryst. vol. 71, page 111 (1981); Quarterly Survey of Chemistry, No. 22, Chemistry of Liquid Crystal Chap. 5, Chap. 10 Section 2 (1994) published by Chemical Society of Japan; B. Kohne et al., Angew. Chem. Soc. Chem. Comm., page 1794 (1985); and J. Zhang et al., J. Am. Chem. Soc., vol. 116, page 2655 (1994)). The polymerization of discotic lipoid crystalline compounds is described in Japanese Patent Application Laid-Open No. H8-27284.

It is preferred that the discotic liquid crystalline compound has a polymerizable group to allow the compound to be fixed by polymerization. For example, a structure may be contemplated, in which a polymerizable group as a substituent is bonded to the disc type core of the discotic liquid crystalline compound. However, when the polymerizable group is directly bonded to the disc type core, it is difficult to maintain the alignment state in the polymerization reaction. Thus, a structure is preferred, in which a linking group is interposed between the disc type core and the polymerizable group. That is, the discotic liquid crystalline compound having a polymerizable group is preferably a compound represented by the following formula.

$$D(-L-P)_n$$

In the formula, D is a disc type core, L is a divalent linking group, P is a polymerizable group, and n is an integer of 1 to 12. Specifically preferred examples of the disc type core (D), the divalent linking group (L) and the polymerizable group (P) in the formula, are (D1) to (D15), (L1) to (L25) and (P1) to (P18), each described in the official gazette of Japanese Patent Application Laid-Open No. 2001-4837, and the contents described in the same official gazette may be preferably used. Meanwhile, the discotic nematic liquid crystal phase-solid phase transition temperature of the liquid crystalline compound is preferably 30° C. to 300° C., and more preferably 30° C. to 170° C.

The discotic liquid crystalline compound represented by the following Formula (I) has a low wavelength dispersibility of the in-plane retardation, and thus, a high in-plane retardation may be developed. Furthermore, a vertical alignment having excellent uniformity at a high average tilt angle may be achieved without using a special alignment film or additives, and thus, the compound is preferably used for forming an optically anisotropic layer. Further, a coating solution containing the liquid crystalline compound has a tendency that the viscosity thereof is relatively decreased, and is preferred from the viewpoint of good applicability.

(1)-1 Discotic Liquid Crystal Compound Represented by Formula (I)

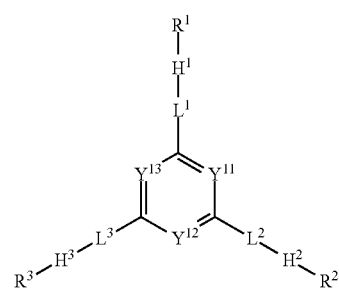

In the formula, each of $Y^{11}$, $Y^{12}$ and $Y^{13}$ independently represents a methine which may be substituted, or a nitrogen atom.

When $Y^{11}$, $Y^{12}$ and $Y^{13}$ are a methine, the hydrogen atom in the methine may be substituted with a substituent. Preferred examples of the substituent which the methane may have include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom and a cyano group. Among these substituents, an alkyl group, an alkoxy group, an alkoxycarbonyl group, an acyloxy group, a halogen atom and a cyano group are more preferred, and an alkyl group having 1 to 12 carbon atoms, an alkoxy group having 1 to 12 carbon atoms, an alkoxycarbonyl group having 2 to 12 carbon atoms, an acyloxy group having 2 to 12 carbon atoms, a halogen atom and a cyano group are more preferred.

It is more preferred that all of $Y^{11}$, $Y^{12}$ and $Y^{13}$ are a methane in terms of readiness and costs of the compound synthesis, and it is still more preferred that the methine is unsubstituted.

Each of $L^1$, $L^2$ and $L^3$ independently represents a single bond or a divalent linking group.

When $L^1$, $L^2$ and $L^3$ are a divalent linking group, it is preferred that each of $L^1$, $L^2$ and $L^3$ is independently a divalent linking group selected from the group consisting of —O—, —S—, —C(=O)—, —NR$^7$—, —CH=CH—, —C≡C—, a divalent cyclic group and a combination thereof. R$^7$ is an alkyl group having 1 to 7 carbon atoms or a hydrogen atom, preferably an alkyl group having 1 to 4 carbon atoms or a hydrogen atom, more preferably a methyl group, an ethyl group or a hydrogen atom, and most preferably a hydrogen atom.

The divalent cyclic group in $L^1$, $L^2$ and $L^3$ is a divalent linking group having at least one cyclic structure (hereinafter referred to as a cyclic group in some cases). The cyclic group is preferably a 5-, 6- or 7-membered ring, more preferably a 5- or 6-membered ring, and most preferably a 6-membered ring. The ring included in the cyclic ring may be a condensed ring. However, a monocycle is more preferred than a condensed ring. Furthermore, the ring included in the cyclic group may be any of an aromatic ring, an aliphatic ring and a heterocyclic ring. Preferred examples of the aromatic ring include a benzene ring and a naphthalene ring. Preferred examples of the aliphatic ring include a cyclohexane ring. Preferred examples of the heterocyclic ring include a pyridine ring and a pyrimidine ring. The cyclic group is more preferably an aromatic ring or a heterocyclic ring. Meanwhile, the divalent cyclic group in the present invention is more preferably a divalent linking group composed of only a cyclic structure (however, including substituents) (hereinafter the same).

Among the divalent cyclic groups represented by $L^1$, $L^2$ and $L^3$, the cyclic group having a benzene ring is preferably a 1,4-phenylene group. The cyclic group having a naphthalene ring is preferably a naphthalene-1,5-diyl group or a naphthalene-2,6-diyl group. The cyclic group having a cyclohexane ring is preferably a 1,4-cyclohexylene group. The cyclic group having a pyridine ring is preferably a pyridine-2,5-diyl group. The cyclic group having a pyrimidine ring is preferably a pyrimidine-2,5-diyl group.

The divalent cyclic group represented by $L^1$, $L^2$ and $L^3$ may have a substituent. Examples of the substituent include a halogen atom (preferably a fluorine atom and a chlorine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group substituted having 2 to 16 carbon atoms, and an acylamino group having 2 to 16 carbon atoms.

Preferred examples of $L^1$, $L^2$ and $L^3$ include a single bond, —O—CO—, *—CO—O—, *—CH=CH—, *—C≡C—, *-divalent cyclic group-, *—O—CO-a divalent group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH—, and *-divalent cyclic group-C≡C—. A single bond, *—CH=CH—, *—C≡C—, *—CH=CH-divalent cyclic group—and *—C≡C-divalent cyclic group—are particularly preferred, and a single bond is most preferred. Here, * represents a position bonding to the 6-membered ring side including $Y^{11}$, $Y^{12}$ and $Y^{13}$ in Formula (I).

In Formula (I), each of $H^1$, $H^2$ and $H^3$ independently represents a group of Formula (I-A) or Formula (I-B).

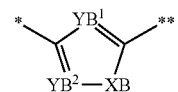

Formula (I-A)

in Formula (I-A), each of $YA^1$ and $YA^2$ independently represents a methine which may have a substituent, or a nitrogen atom; XA represents an oxygen atom, a sulfur atom and methylene or imino; * represents a position bonding to the side of $L^1$ to $L^3$ in Formula (I); and ** represents a position bonding to the side of $R^1$ to $R^3$ in Formula (I).

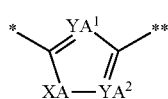

Formula (I-B)

In Formula (I-B), each of $YB^1$ and $YB^2$ independently represents a methine which may have a substituent, or a nitrogen atom; XB represents an oxygen atom, a sulfur atom and methylene or imino; * represents a position bonding to the side of $L^1$ to $L^3$ in Formula (I); and ** represents a position bonding to the side of $R^1$ to $R^3$ in Formula (I).

In Formula (I), each of $R^1$, $R^2$ and $R^3$ independently represents the following Formula (I-R).

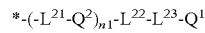

Formula (I-R)

In Formula (I-R), * represents a position bonding to the side of $H^1$ to $H^3$ in Formula (I).

$L^{21}$ represents a single bond or a divalent linking group. When $L^{21}$ is a divalent linking group, $L^{21}$ is preferably a divalent linking group selected from the group consisting of —O—, —S—, —C(=O)—, —NR$^8$—, —CH=CH—, —C≡C— and a combination thereof. $R^8$ is an alkyl group having 1 to 7 carbon atoms or a hydrogen atom, preferably an alkyl group having 1 to 4 carbon atoms or a hydrogen atom, more preferably a methyl group, an ethyl group or a hydrogen atom, and most preferably a hydrogen atom.

$L^{21}$ is preferably any of a single bond, *—O—CO—, *—CO—O—, *—CH=CH— and *—C≡C— (wherein, *** represents the * side in Formula (DI-R)), and more preferably a single bond.

$Q^2$ represents a divalent group (cyclic group) having at least one cyclic structure. Preferred examples of the cyclic group include a cyclic group having a 5-, 6- or 7-membered ring, more preferred example thereof include a cyclic group having a 5- or 6-membered ring, and still more preferred example include a cyclic group having a 6-membered ring. The cyclic structure included in the cyclic group may be a condensed ring. However, a monocycle is more preferred than a condensed ring. Furthermore, the ring included in the cyclic group may be any of an aromatic ring, an aliphatic ring and a heterocyclic ring. Preferred examples of the aromatic ring include a benzene ring, a naphthalene ring, an anthracene ring and a phenanthrene ring. Preferred examples of the aliphatic ring include a cyclohexane ring. Preferred examples of the heterocyclic ring include a pyridine ring and a pyrimidine ring.

Among the groups represented by $Q^2$, the cyclic group having a benzene ring is preferably a 1,3-phenylene group and a 1,4-pheneylene group. The cyclic group having a naphthalene ring is preferably a naphthalene-1,4-diyl group, a naphthalene-1,5-diyl group, a naphthalene-1,6-diyl group, a naphthalene-2,5-diyl group and a naphthalene-2,6-diyl, naphthalene-2,7-diyl group. The cyclic group having a cyclohexane ring is preferably a 1,4-cyclohexylene group. The cyclic group having a pyridine ring is preferably a pyridine-2,5-diyl group. The cyclic group having a pyrimidine ring is preferably a pyrimidine-2,5-diyl group. Among them, a 1,4-phenylene group, a napthalene-2,6-diyl group and a 1,4-cyclohexylene group are particularly preferred.

Among the groups represented by $Q^2$, the cyclic group having a 5-membered ring is preferably a 1,2,4-oxadiazole-2,5-diyl group, a 1,3,4-oxadiazole-2,4-diyl group, a 1,2,4-thiadiazole-2,5-diyl group and a 1,3,4-thiadiazole-2,5-diyl group.

$Q^2$ may have a substituent. Examples of the substituent include a halogen atom (preferably a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. Among them, a halogen atom, a cyano group, an alkyl group having 1 to 6 carbon atoms and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms and a trifluoromethyl group are still more preferred.

n1 represents an integer of 0 to 4. n1 is preferably an integer of 1 to 3, and more preferably 1 or 2.

$L^{22}$ represents —O—, —O—CO—, —CO—O—, —O—CO—O—, —S—, —N($R^{101}$)—, —$SO_2$—, —$CH_2$, —CH=CH— or —C≡C—, $R^{101}$ represents an alkyl group having 1 to 5 carbon atoms, and ** indicates a position bonding to $Q^2$ side.

$L^{22}$ is preferably —O—, —O—CO—, —CO—O—, —O—CO—O—, —$CH_2$—, —CH=CH— and —C≡C—, and more preferably —O—, —O—CO—, —O—CO—O— and **—$CH_2$. When $L^{22}$ is a group including a hydrogen atom, the hydrogen atom may be substituted with a substituent. Preferred examples of the substituent include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkythio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms and an acylamino group having 2 to 6 carbon atoms, and a halogen atom and an alkyl group having 1 to 6 carbon atoms are more preferred.

$L^{23}$ represents a divalent linking group selected from the group consisting of —O—, —S—, —C(=O)—, —$SO_2$—, —NH—, —$CH_2$—, —CH=CH—, —C≡C— and a combination thereof. Here, a hydrogen atom in —NH—, —$CH_2$— and —CH=CH— may be substituted with a substituent. Preferred examples of such substituents may include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms and acylamino group having 2 to 6 carbon atoms, and more preferably a halogen atom and an alkyl group having 1 to 6 carbon atoms. By being substituted with these substituents, it is possible to enhance solubility for a solvent used when preparing a liquid crystalline composition from the liquid crystalline compound of the present invention.

$L^{23}$ is preferably selected from the group consisting of —O—, —C(=O)—, —$CH_2$—, —CH=CH—, —C≡C—, and a combination thereof. $L^{23}$ contains preferably 1 to 20 carbon atoms, and more preferably 2 to 14 carbon atoms. In addition, $L^{23}$ contains preferably 1 to 16 —$CH_2$—, more preferably 2 to 12 —$CH_2$—.

$Q^1$ represents a polymerizable group or a hydrogen atom. In a case where the liquid crystalline compound of the present invention is used in an optical film, such as an optically compensatory film in which the magnitude of phase difference is preferably not changed by heat, $Q^1$ is preferably a polymerizable group. The polymerizable group is preferably an addition polymerizable group (including a ring-opening polymerizable group) or a condensation polymerizable group. That is, the polymerizable group is preferably a functional group which enables an addition polymerization reaction or a condensation polymerization reaction. Examples of a polymerizable group will be shown below.

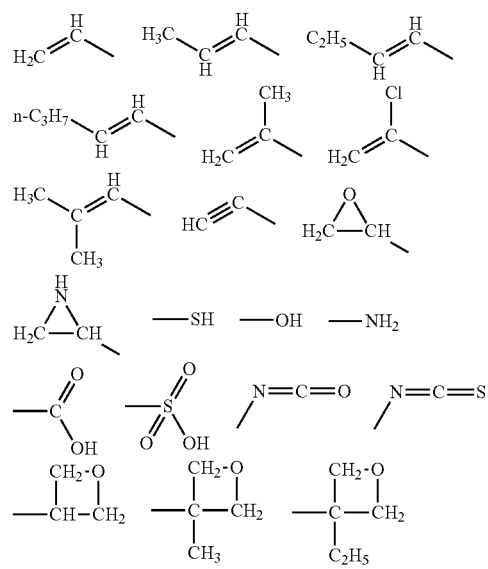

In addition, the polymerizable group is particularly preferably a functional group which enables an addition polymerization reaction. As such a polymerizable group, an ethylenically unsaturated polymerizable group or a ring-opening polymerizable group is preferred.

Examples of such an ethylenically unsaturated polymerizable group may include the following Formulas (M-1) to (M-6).

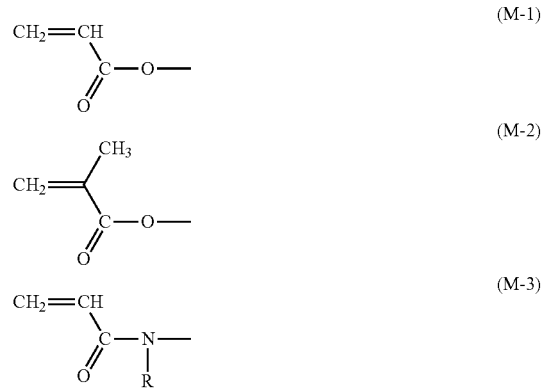

-continued

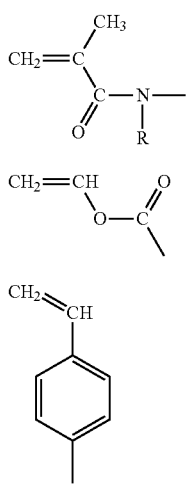

In Formulas (M-3) and (M-4), R represents a hydrogen atom or an alkyl group, and is preferably a hydrogen atom or a methyl group.

Among Formulas (M-1) to (M-6), (M-1) or (M-2) is preferred, and (M-1) is more preferred.

The ring-opening polymerizable group is preferably an epoxy group, and more preferably an oxetanyl group.

Among the compounds of Formula (I), a compound represented by the following Formula (I') is more preferable.

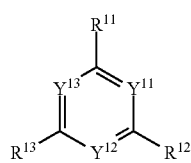

Formula (I')

In Formula (I'), each of $Y^{11}$, $Y^{12}$ and $Y^{13}$ independently represents a methine which may have a substituent, or a nitrogen atom, and is preferably a methine which may have a substituent, and it is preferred that the methine is unsubstituted.

Each of $R^{11}$, $R^{12}$ and $R^{13}$ independently represents the following Formula (I'-A), the following Formula (I'-B) or the following Formula (I'-C). In order to reduce the wavelength dispersibility of the intrinsic birefringence, Formula (I'-A) or Formula (I'-C) is preferred, and Formula (I'-A) is more preferred. $R^{11}$, $R^{12}$ and $R^{13}$ are preferably $R^{11}$=$R^{12}$=$R^{13}$.

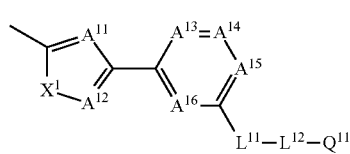

Formula (I'-A)

In Formula (I'-A), each of $A^{11}$, $A^{12}$, $A^{13}$, $A^{14}$, $A^{15}$ and $A^{16}$ independently represents a methine which may have a substituent, or a nitrogen atom.

It is preferred that at least one of $A^{11}$ and $A^{12}$ is a nitrogen atom, and if is more preferred that both of them are a nitrogen atom.

It is preferred that at least three of $A^{13}$, $A^{14}$, $A^{15}$ and $A^{16}$ are a methine which may have a substituent, and it is more preferable that all of them are a methine which may have a substituent. In addition, it is preferred that the methine is unsubstituted.

Examples of substituents in a case where $A^{11}$, $A^{12}$, $A^{13}$, $A^{14}$, $A^{15}$ and $A^{16}$ are methines which may have a substituent include a halogen atom (a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 6 carbon atoms. Among them, a halogen atom, a cyano group, an alkyl group having 1 to 6 carbon, atoms, and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms, and a trifluoromethyl group are still more preferred.

$X^1$ represents an oxygen atom, a sulfur atom, a methylene or an imino, and is preferably an oxygen atom.

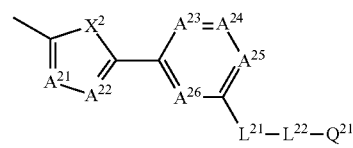

Formula (I'-B)

In Formula (I'-B), each of $A^{21}$, $A^{22}$, $A^{23}$, $A^{24}$, $A^{25}$ and $A^{26}$ independently represents a methine which may have a substituent, or a nitrogen atom.

It is preferred that at least one of $A^{21}$ and $A^{22}$ is a nitrogen atom, and it is more preferred that both are androgen atom.

It is preferred that at least three of $A^{23}$, $A^{24}$, $A^{25}$ and $A^{26}$ are a methine which may have a substituent, and it is more preferred that all of them are a methine which may have a substituent. In addition, it is preferred that the methine is unsubstituted.

Examples of substituents in a case where $A^{21}$, $A^{22}$, $A^{23}$, $A^{24}$, $A^{25}$ and $A^{26}$ are a methine which may be substituted include a halogen atom (a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon, atoms, and an acylamino group having 2 to 16 carbon atoms. Among them, a halogen atom, a cyano group, an alkyl group having 1 to 6 carbon atoms, and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms, and a trifluoromethyl group are still more preferred.

$X^2$ represents an oxygen atom, a sulfur atom, a methylene or an imino, and is preferably an oxygen atom.

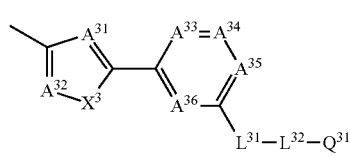

Formula (I'-C)

In Formula (I'-C), each of $A^{21}$, $A^{22}$, $A^{23}$, $A^{24}$, $A^{25}$ and $A^{26}$ independently represents a methine which may have a substituent or a nitrogen atom.

It is preferred that at least one of $A^{31}$ and $A^{32}$ is a nitrogen atom, and it is more preferred that both are a nitrogen atom.

It is preferred that at least three of $A^{33}$, $A^{34}$, $A^{35}$ and $A^{36}$ are a methine which may have a substituent, and it is more preferred that all of them are a methine which may have a substituent. In addition, it is preferred that the methine is unsubstituted.

In a case where $A^{31}$, $A^{32}$, $A^{33}$, $A^{34}$, $A^{35}$ and $A^{36}$ are methines, the methines may have a substituent. Examples of substituents include a halogen atom (a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon, atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. Among them, a halogen, atom, a cyano group, an alkyl group having 1 to 6 carbon atoms, and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms, and a trifluoromethyl group are still more preferred.

$X^3$ represents an oxygen atom, a sulfur atom, a methylene or an imino, and is preferably an oxygen atom.

Each of $L^{11}$ in Formula (I'-A), $L^{21}$ in Formula (I'-B) and $L^{31}$ in Formula (I'-C) independently represents —O—, —C(=O)—, —O—CO—, —CO—O—, —O—CO—O—, —S—, —NH—, —SO$_2$—, —CH$_2$—, —CH=CH— or —C≡C—. Preferably, it is —O—, —C(=O)—, —O—CO—, —CO—O—, —O—CO—O—, —CH$_2$—, —CH=CH— or —C≡C—, and more preferably, —O—, —O—CO—, —CO—O—, —O—CO—O— or —C≡C—. Especially, a small wavelength dispersion of intrinsic birefringence can be expected. In Formula (I'-A), $L^{11}$ is preferably —O—, —CO—O—, —C≡C—, and among them, —CO—O— is preferred because it can reveal a discotic nematic phase at a higher temperature. When the groups as described above include a hydrogen atom, the hydrogen atom may be substituted by a substituent. Preferably, examples of such a substituent include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms, and more preferably a halogen atom and an alkyl group having 1 to 6 carbon atoms.

Each of $L^{12}$ in Formula (I'-A), $L^{22}$ in Formula (I'-B), and $L^{32}$ in Formula (I'-C) independently represents a divalent linking group selected from the group consisting of —O—, —S—, —C(=O)—, —SO$_2$—, —NH—, —CH$_2$—, —CH=CH—, —C≡C— and a combination thereof. Here, a hydrogen atom in —NH—, —CH$_2$—, —CH=CH— may be substituted by a substituent. Preferred Examples of such a substituent include a halogen atom, a cyano group, a nitro group, a hydroxyl group, a carboxyl group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms, and an acylamino group having 2 to 6 carbon atoms, and preferably a halogen atom, a hydroxyl group and an alkyl group having 1 to 6 carbon atoms, and more preferably a halogen atom, a methyl group and an ethyl group.

It is preferred that each of $L^{12}$, $L^{22}$ and $L^{32}$ is independently selected from the group consisting of —O—, —C(=O)—, —CH$_2$—, —CH=CH—, —C≡C—, and a combination thereof.

Each of $L^{12}$, $L^{22}$ and $L^{32}$ independently has preferably 1 to 20 carbon atoms, and more preferably 2 to 14 carbon atoms. It is preferred to have 2 to 14 carbon atoms, it is more preferred to have 1 to 16 —CH$_2$—, and it is more preferred to have 2 to 12 —CH$_2$—.

The number of carbon atoms forming $L^{12}$, $L^{22}$ and $L^{32}$ affects a phase transition temperature of a liquid crystal, and a solubility of a compound in a solvent. In general, as the number of carbon atoms increases, the transition temperature from a discotic nematic phase (ND phase) to an isotropic liquid tends to be lowered. In addition, the solubility in a solvent tends to increase as the number of carbon atoms increases.

Each of $Q^{11}$ in Formula (I'-A), $Q^{21}$ in Formula (I'-B), and $Q^{31}$ in Formula (I'-C) independently represents a polymerizable group or a hydrogen atom. In addition, it is preferred that $Q^{11}$, $Q^{21}$, and $Q^{31}$ are a polymerizable group. It is preferred that the polymerizable group is an addition polymerizable group (including a ring-opening polymerizable group) or a condensation polymerizable group. That is, it is preferred that the polymerizable groups are a group which enables an addition polymerization reaction or a condensation polymerization reaction. The examples of polymerizable groups below are the same as those described above, and preferred examples are also the same as those described above.

Here, specific examples of the compound represented by Formula (I) Include compounds described in [0038] to [0069] of the official gazette of Japanese Patent Application Laid-Open No. 2009-97002 or the following compounds, but the present invention is not limited thereto.

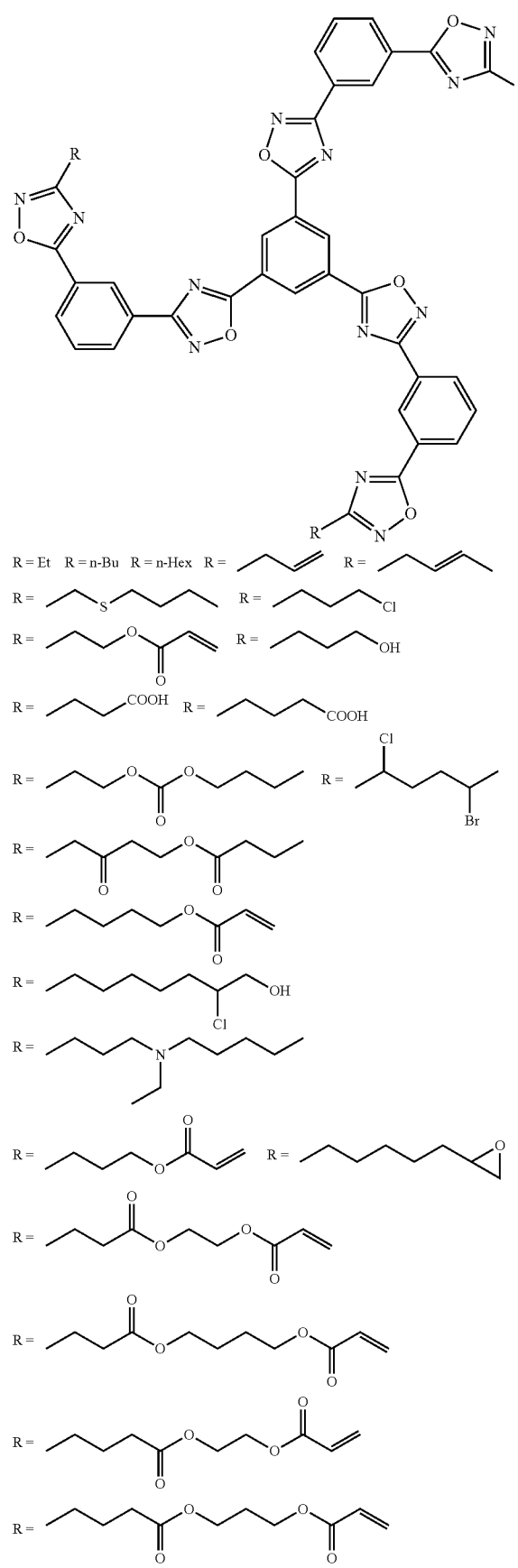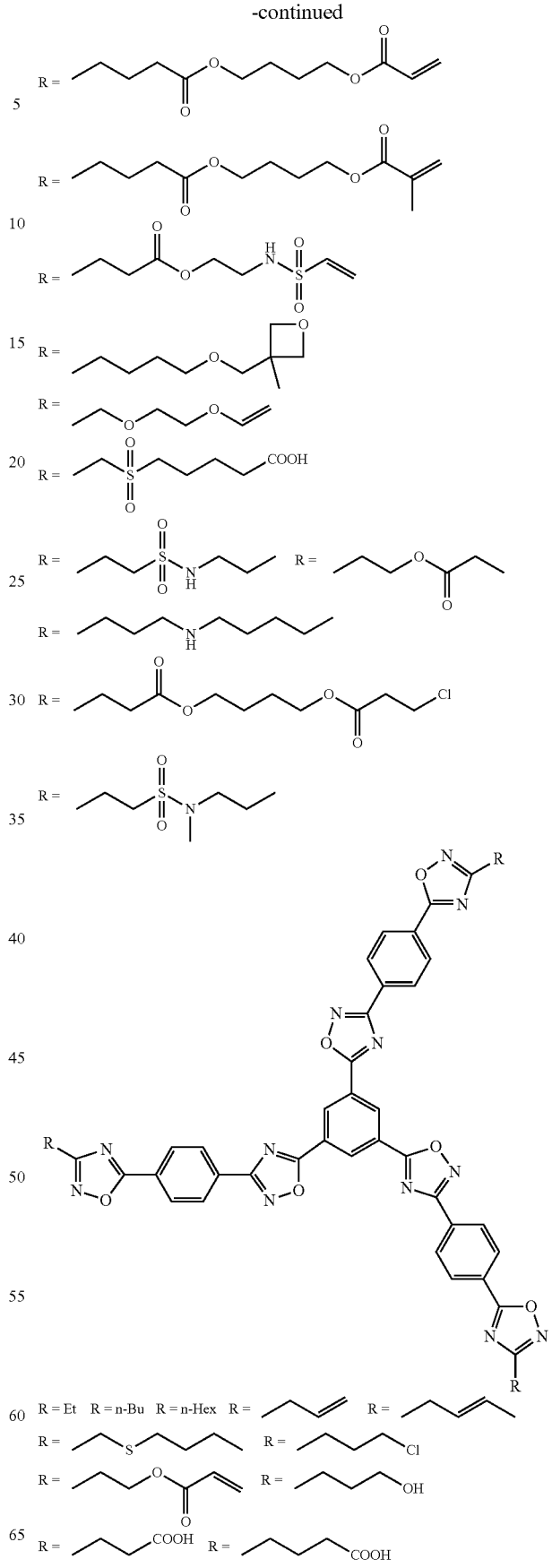

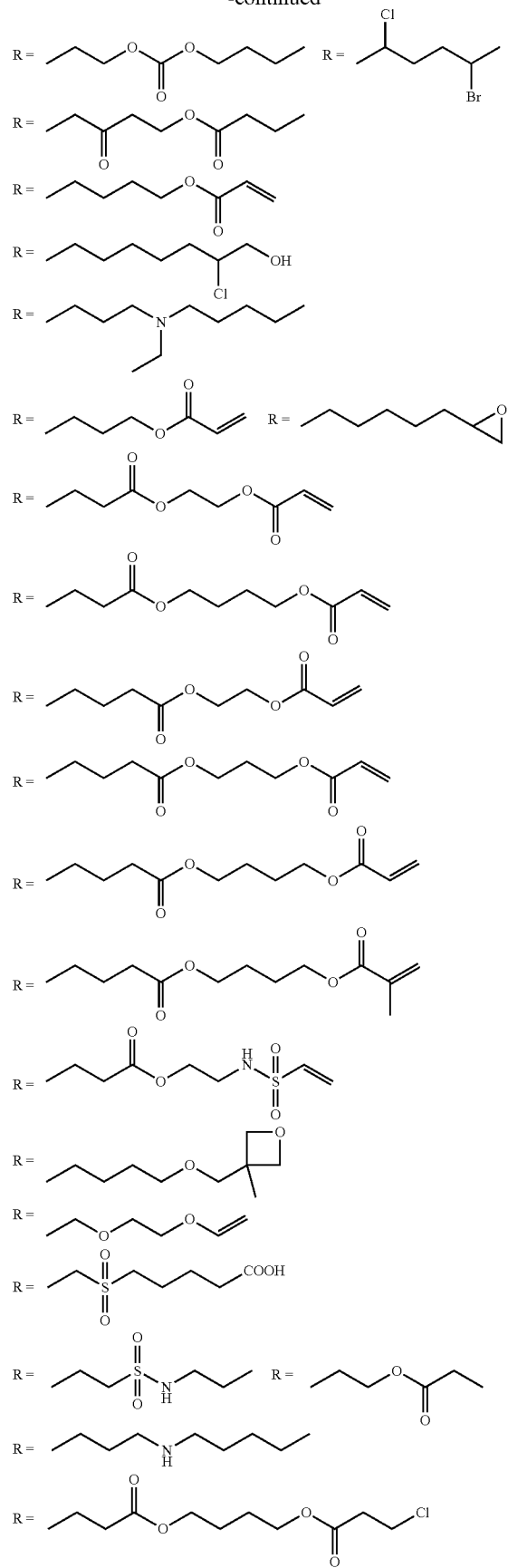
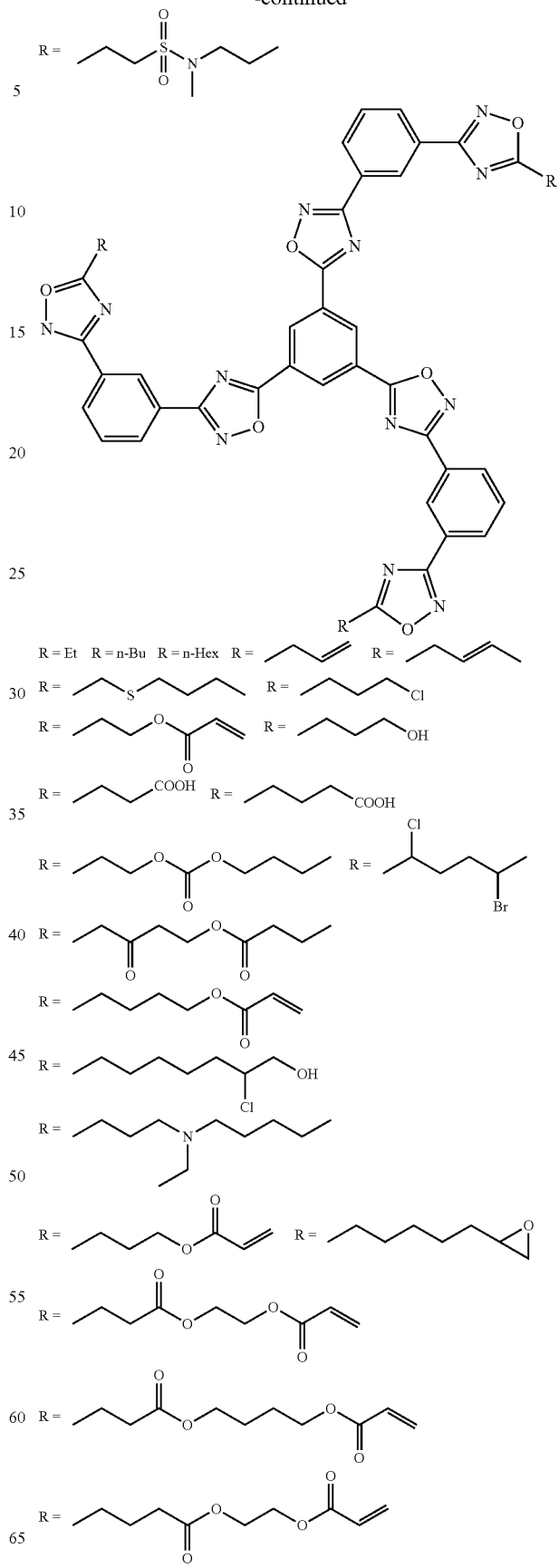

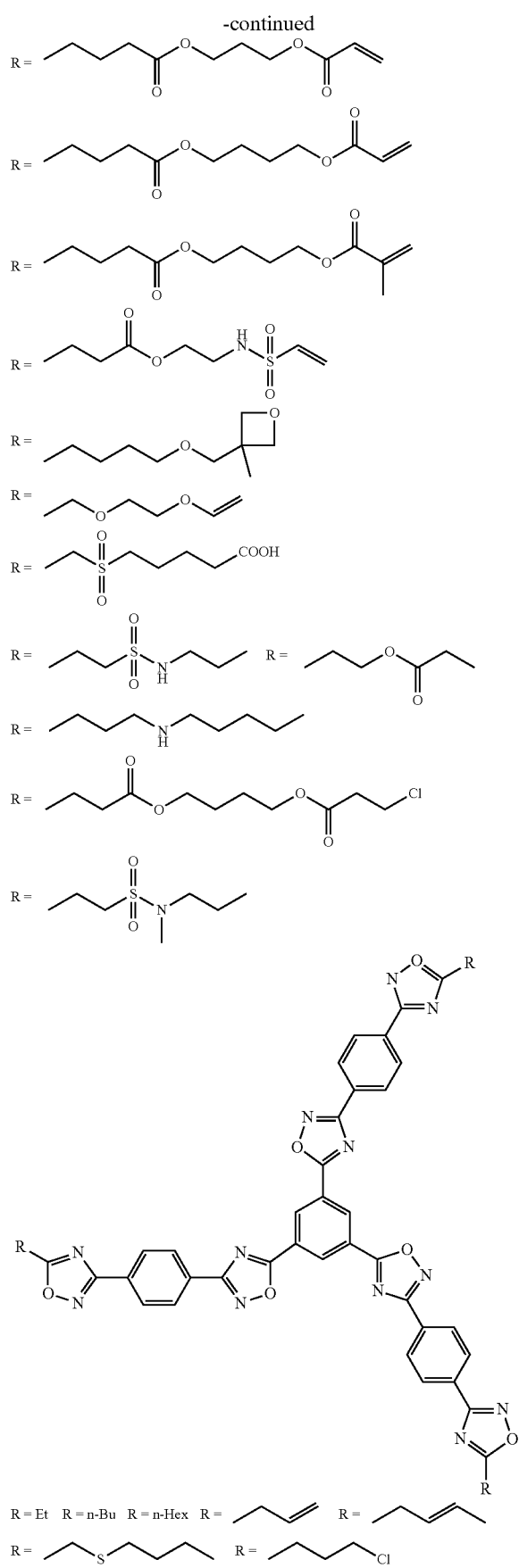

25
-continued
26
-continued
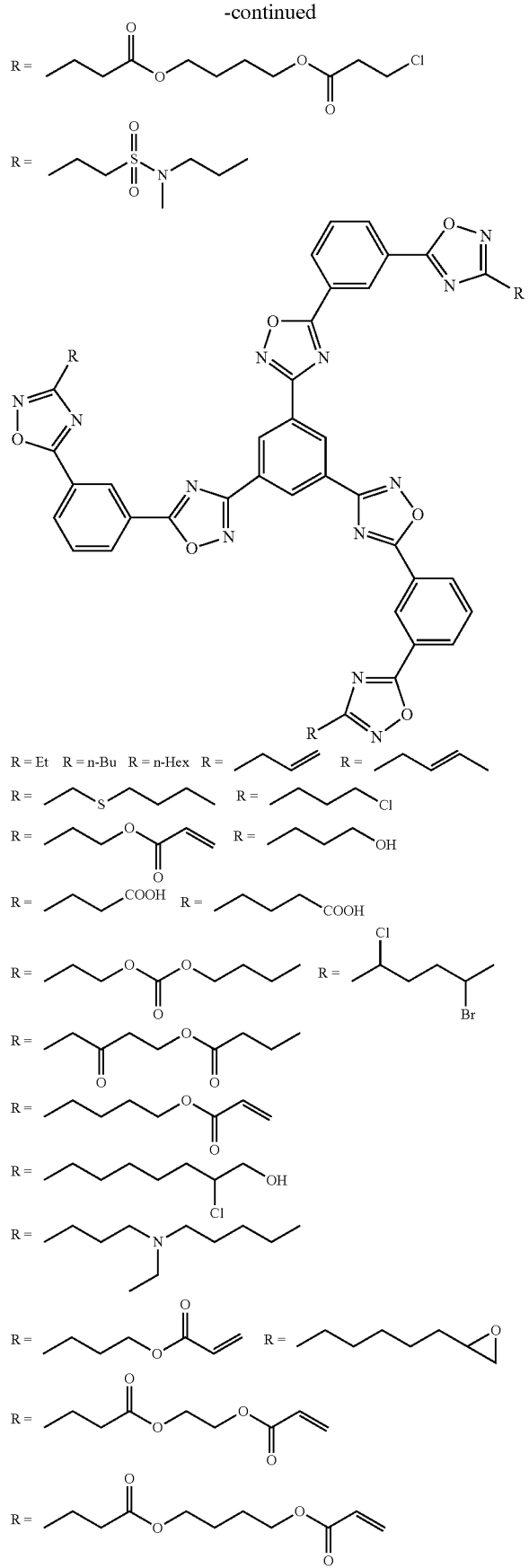
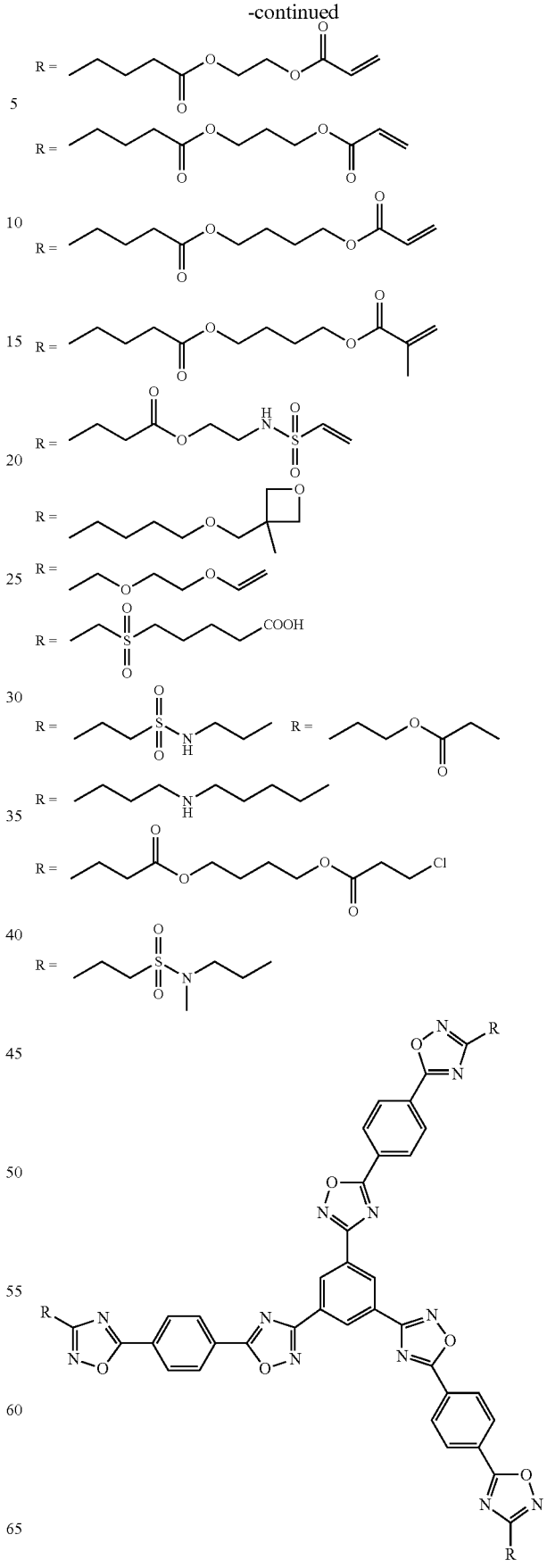

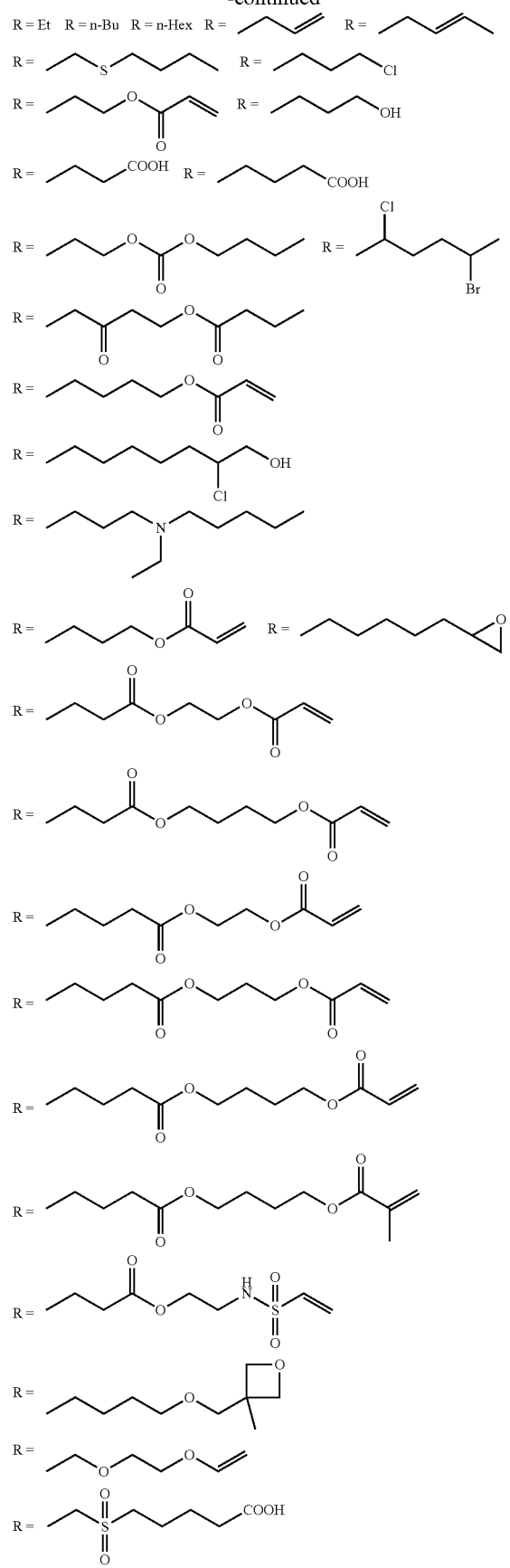
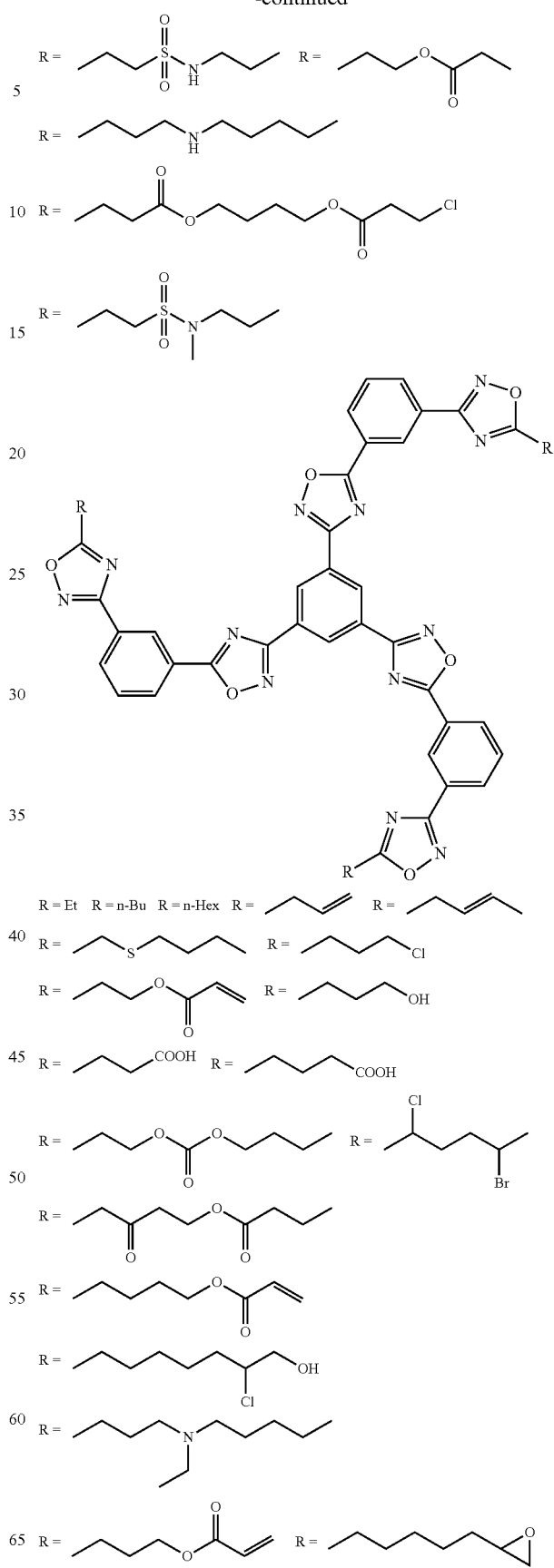

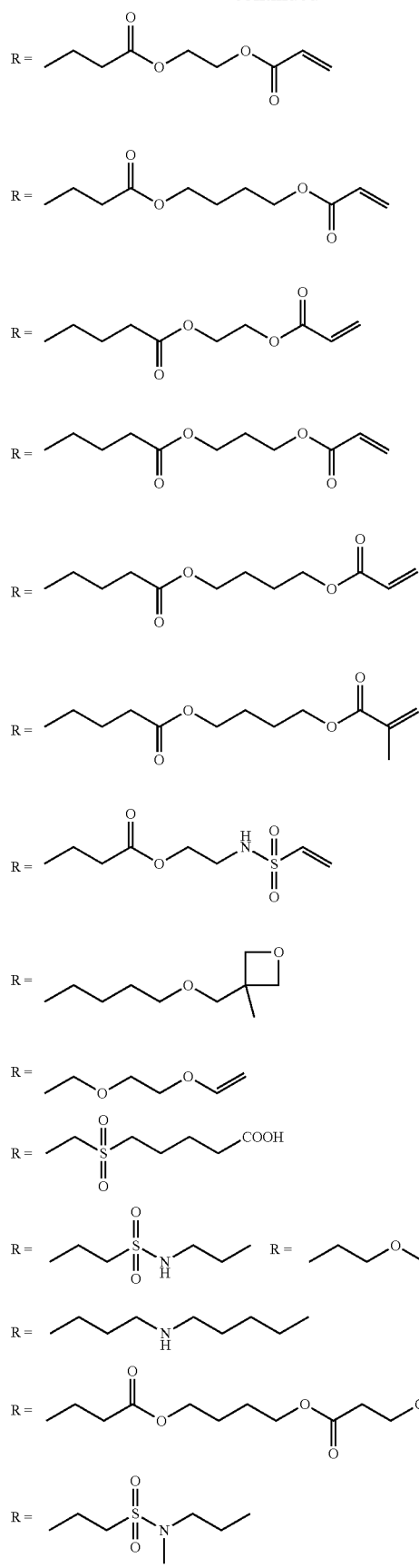
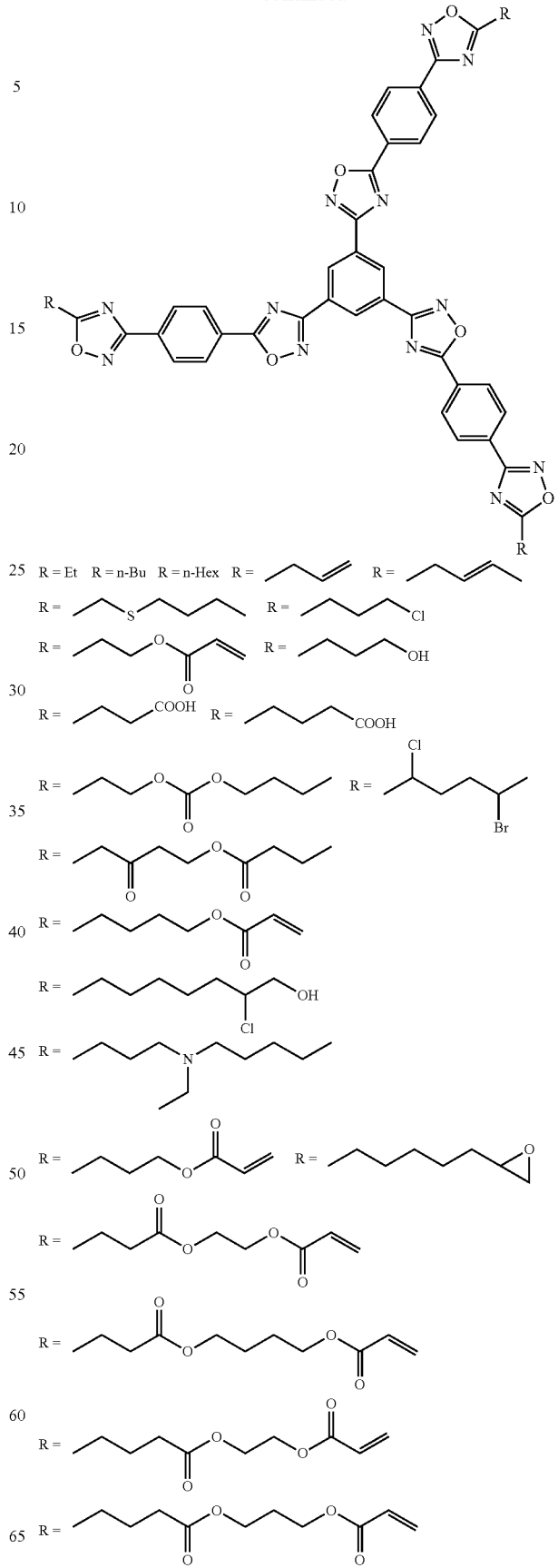

31
-continued
R = 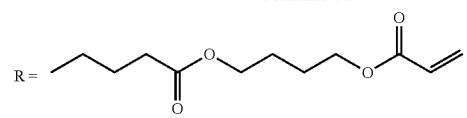
R = 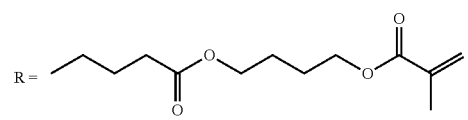
R = 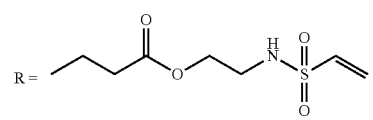
R = 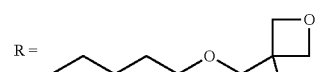
R = 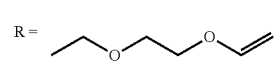
R = 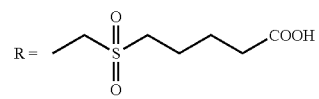
R = 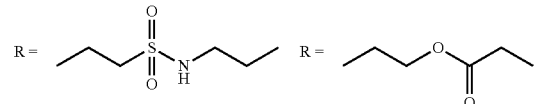
R = 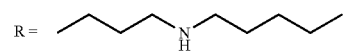
R = 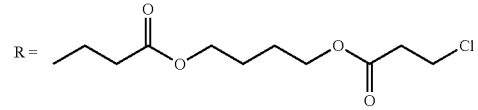
R = 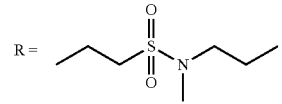
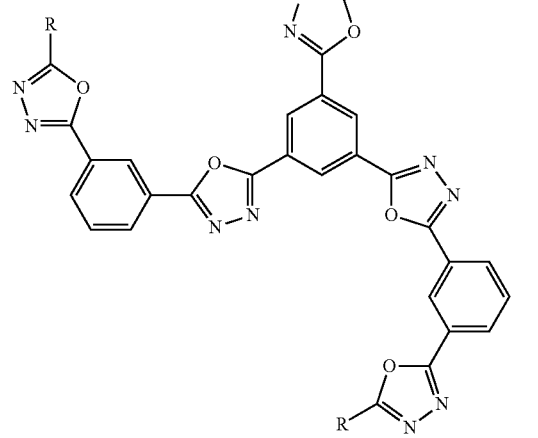
R = 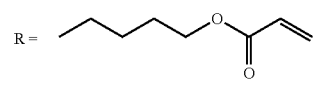
32
-continued
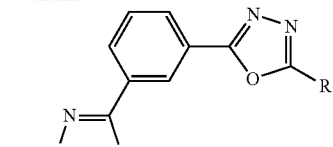
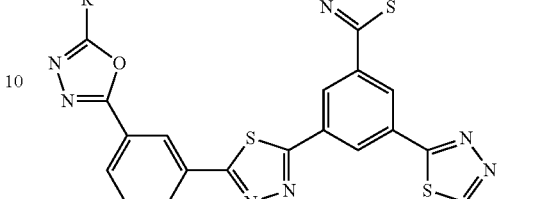
R = 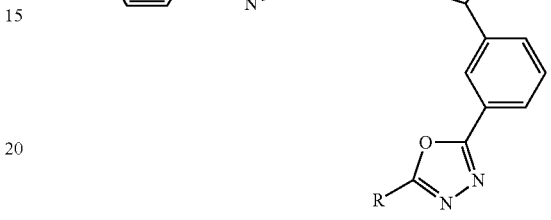
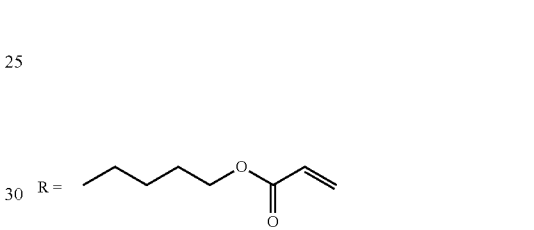
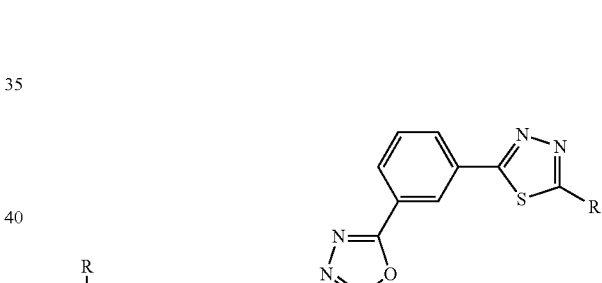
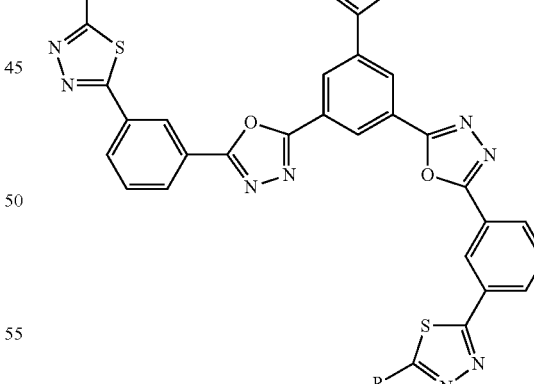
R = 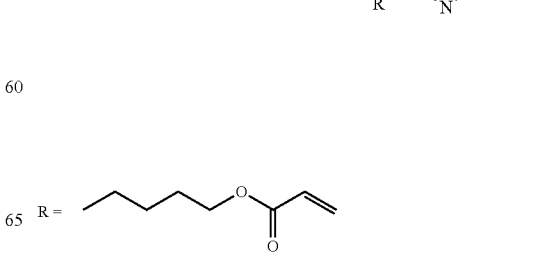

33
-continued
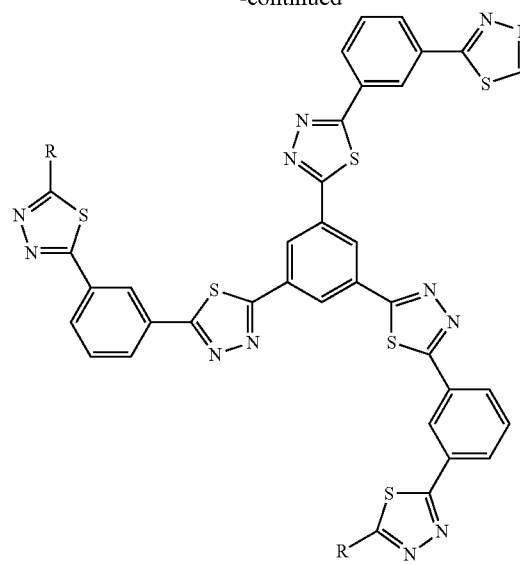
R = 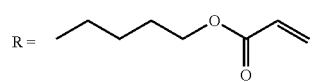
34
-continued
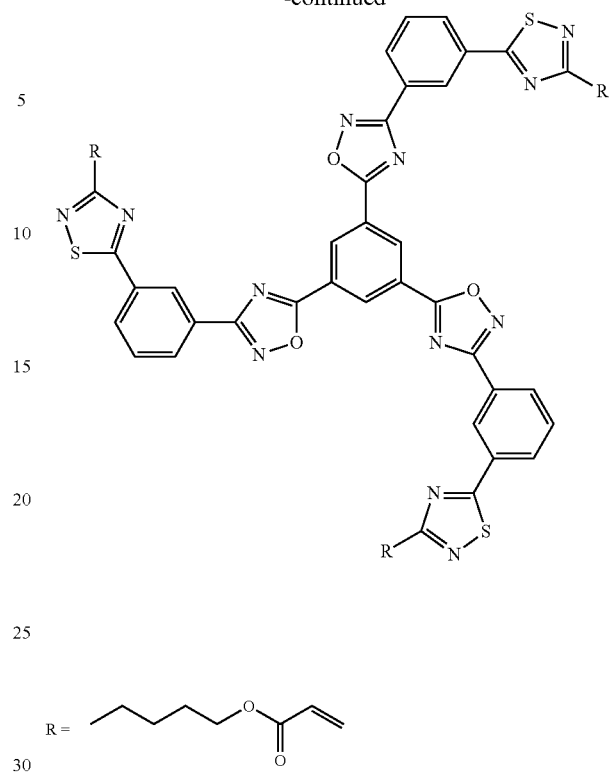
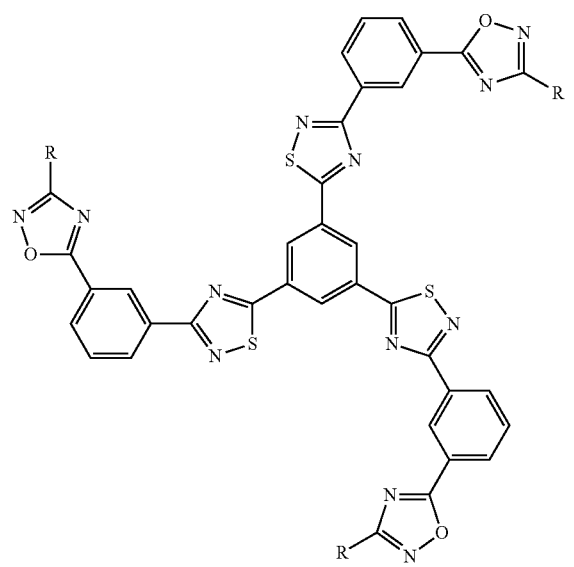
R = 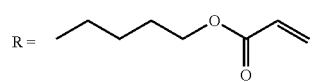
R = 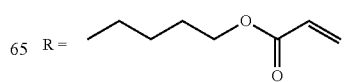

35
-continued
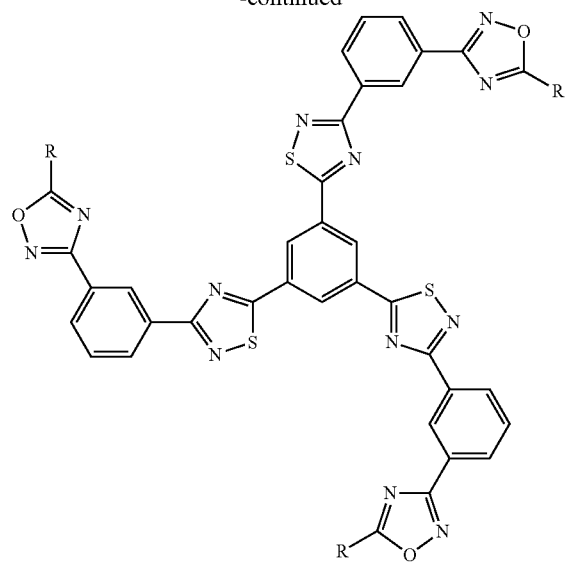
R = 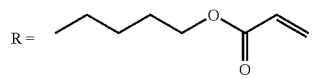
36
-continued
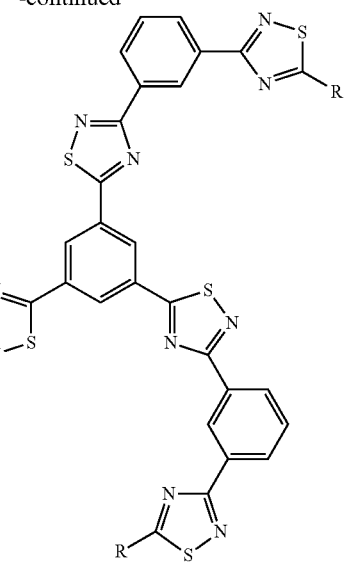
R = 
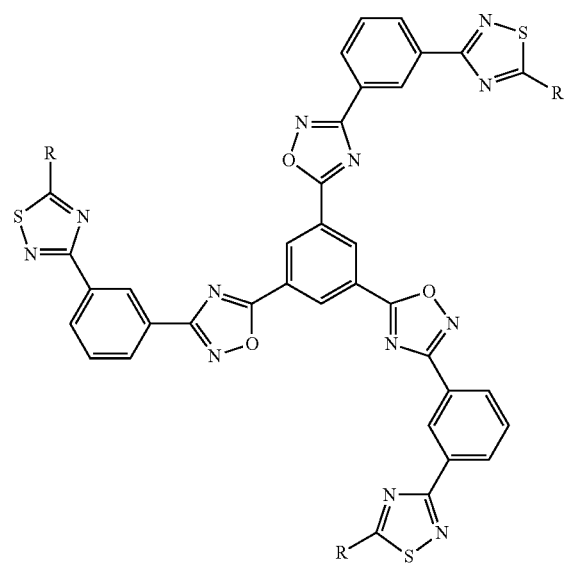
R = 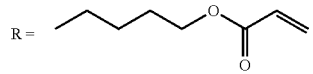
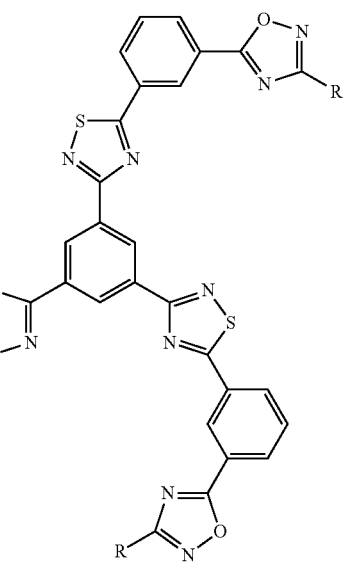
R = 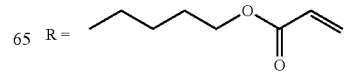

37
-continued
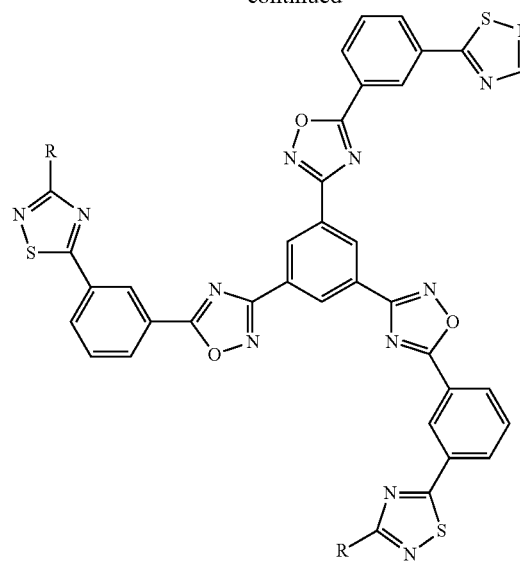
R = 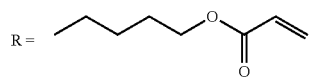
38
-continued
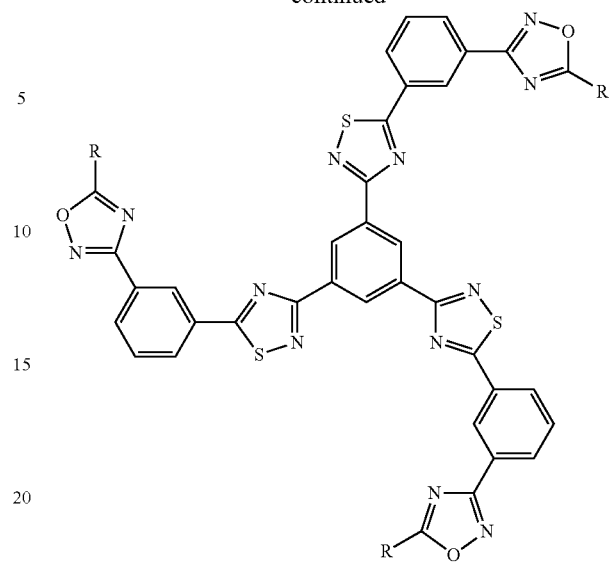
R = 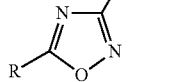
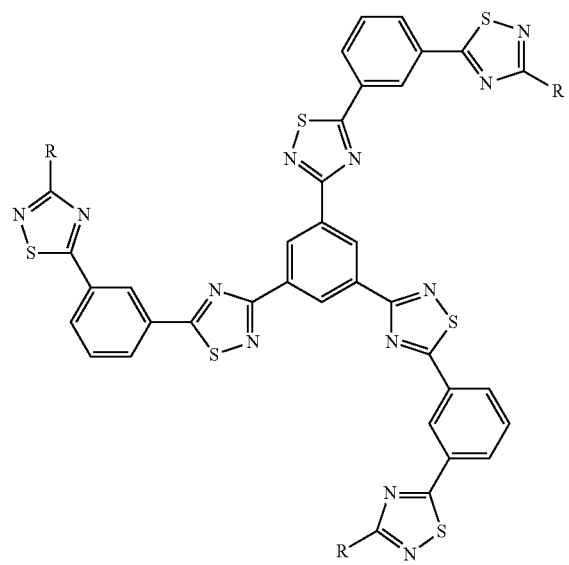
R = 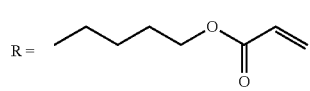
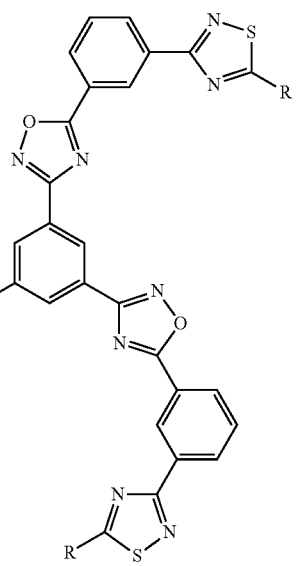
R = 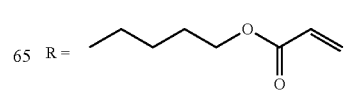

39
-continued
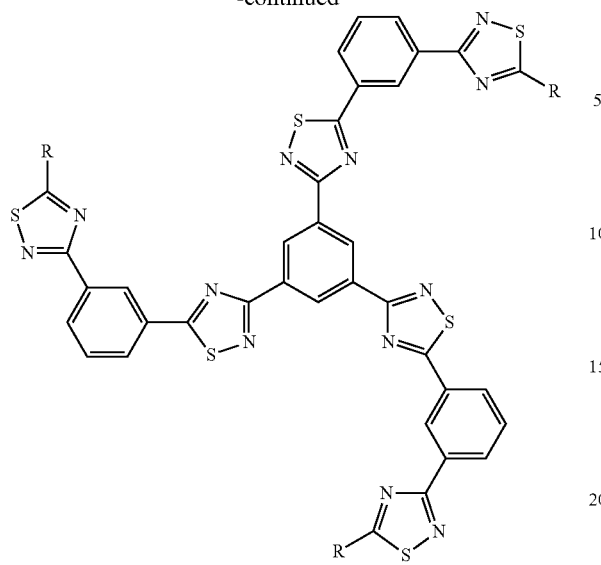
R = 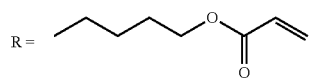
40
-continued
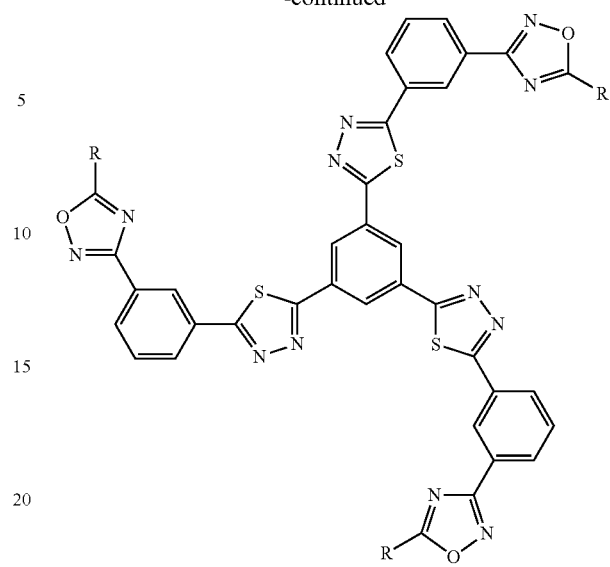
R = 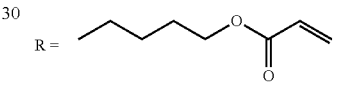
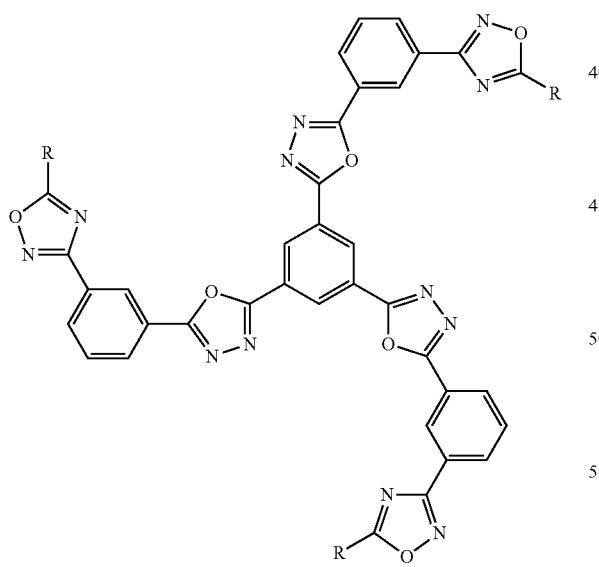
R = 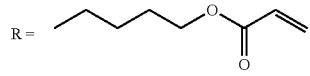
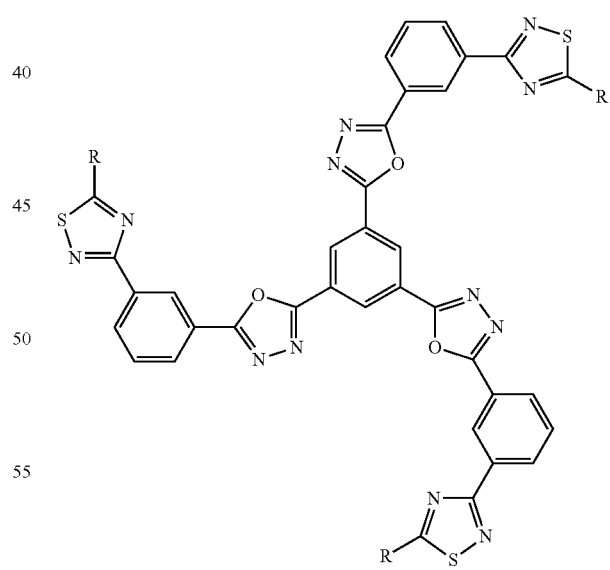
R = 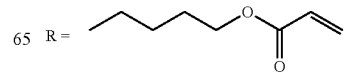

41
-continued
42
-continued
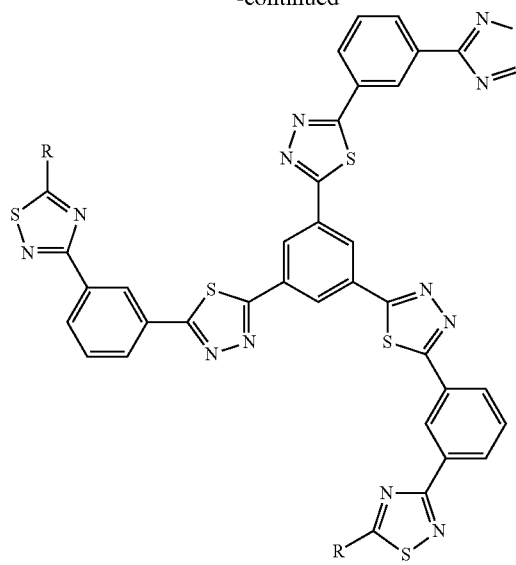
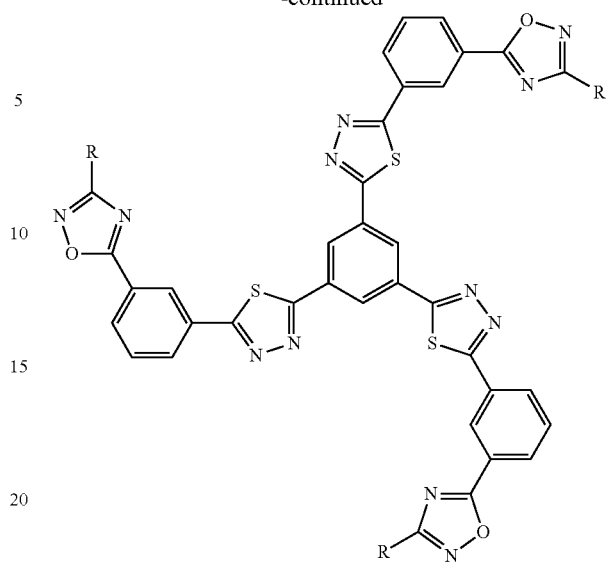
R =
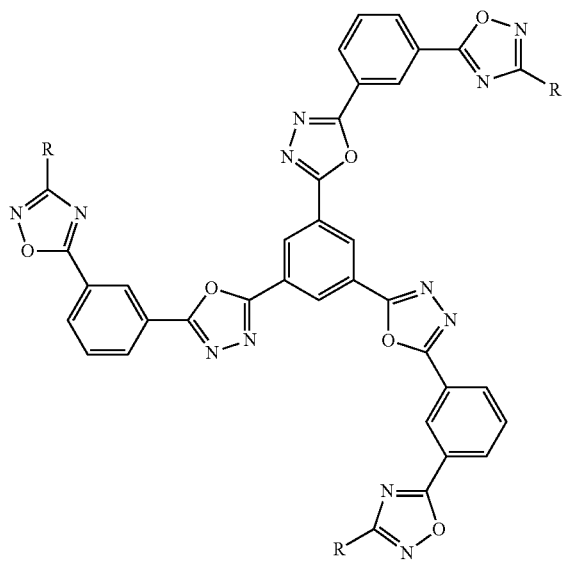
R =

43
-continued
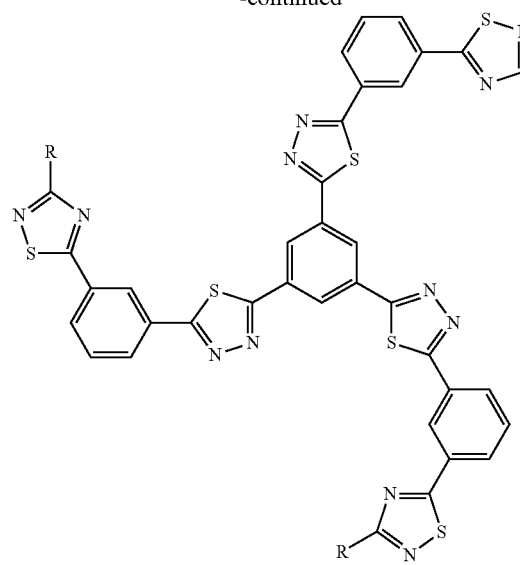
R = 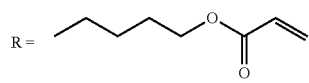
44
-continued
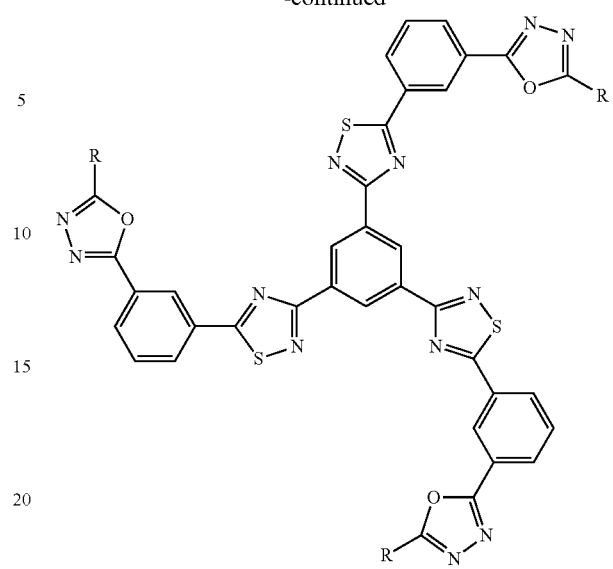
R = 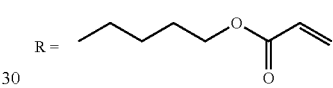
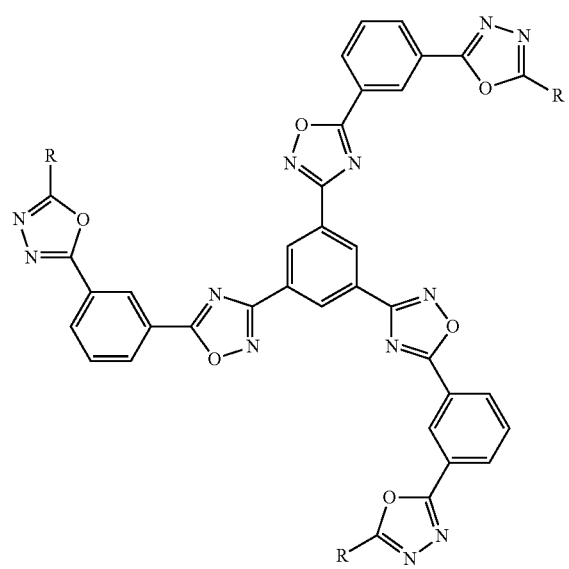
R = 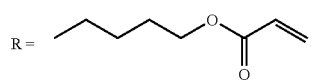
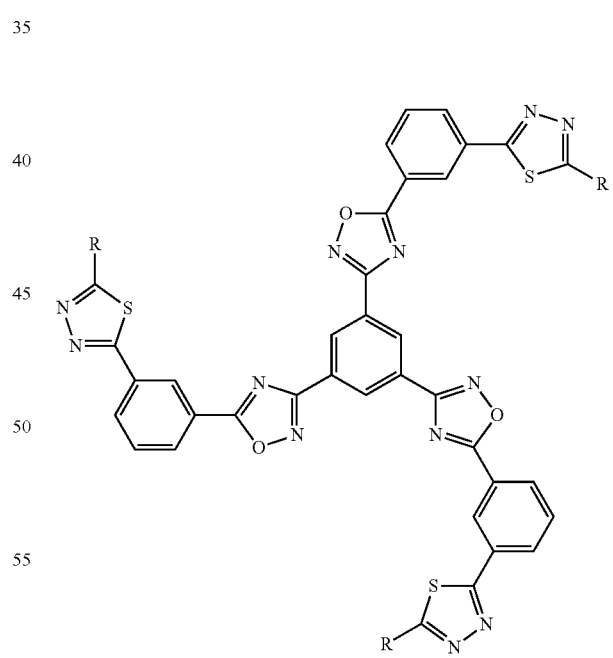
R = 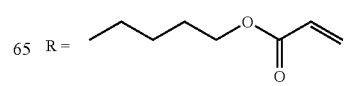

45
-continued
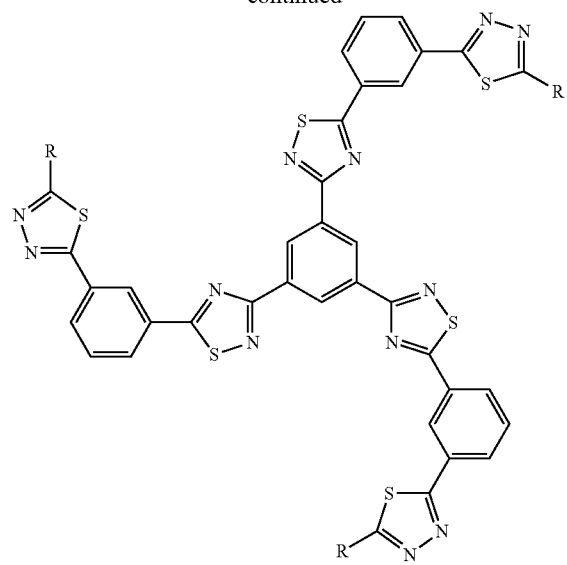
R = 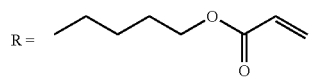
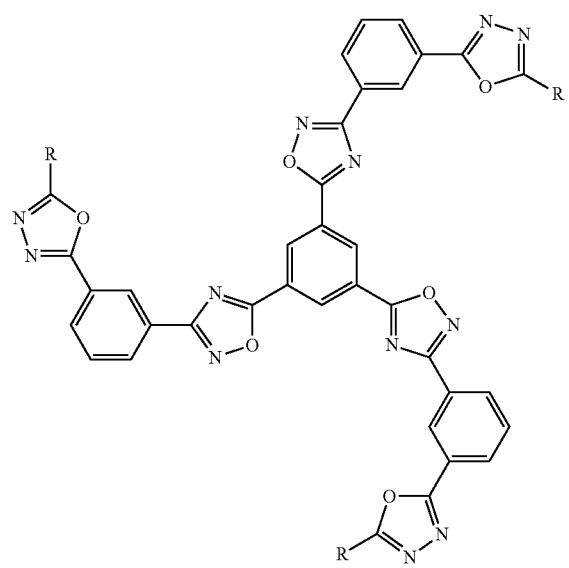
R = 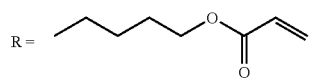
46
-continued
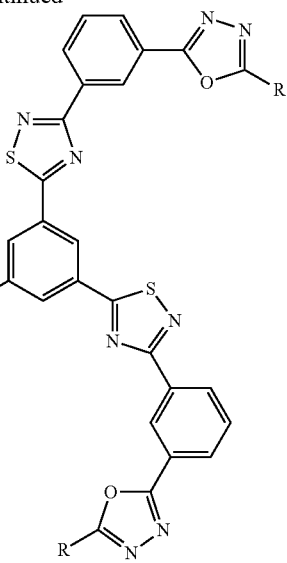
R = 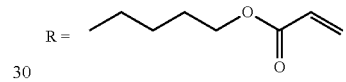
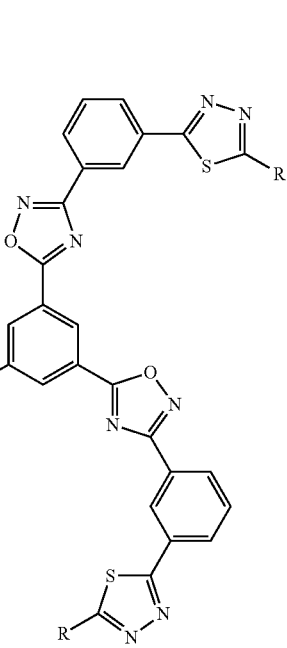
R = 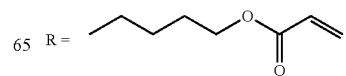

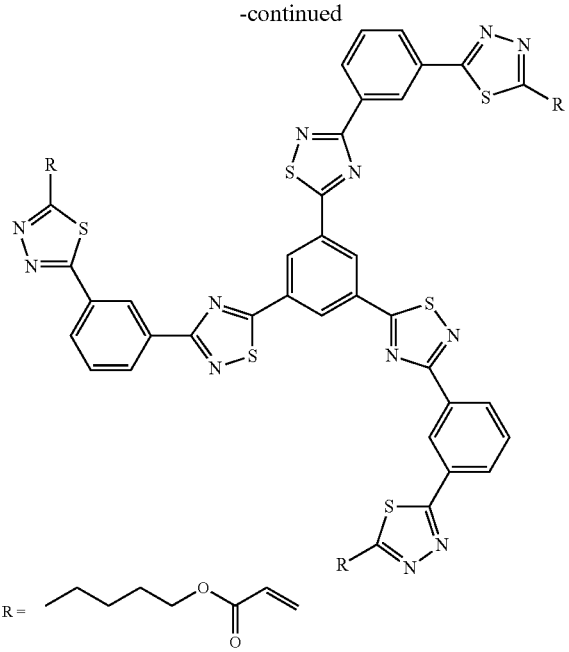

R = [acrylate structure shown]

Examples of a discotic liquid crystalline compound which is a triphenylene compound and has small wavelength dispersibility include compounds described in the paragraphs [0062] to [0967] of the official gazette of Japanese Patent Application Laid-Open No. 2907-108732, but the present invention is not limited thereto.

[Rod-Like Liquid Crystalline Compound]

In the present invention, a rod-like liquid crystalline compound other than the discotic liquid crystalline compound may be used for forming the optically anisotropic layer that the λ/4 plate has. As the rod-like liquid crystalline compound, azomethines, azoxys, cyanobiphenyls, cyanophenyl esters, benzoic acid esters, cyclohexanecarboxylic acid phenyl, esters, cyanophenylcyclohexanes, cyano-substituted phenylpyrimidines, alkoxy-substituted phenylpyrimidines, phenyl dioxanes, tolans and alkenylcyclohexyl benzonitriles are preferably used. Polymer liquid crystalline compounds as well as the above-described low molecular liquid crystalline compounds may be used. It is more preferred that the alignment of the rod-like liquid crystalline compound is fixed by polymerization. As the liquid crystalline compound, compounds having a partial structure capable of causing a polymerization or crosslinking reaction by activated light rays, electronic rays, heat and the like are suitably used. The number of the partial structures is preferably 1 to 6, and more preferably 1 to 3. As a polymerizable rod-like liquid crystalline compound, it is possible to use compounds described in Makromol. Chem., vol. 190, 2255 page (1989), Advanced Materials vol. 5, 107 page (1993), the specifications of U.S. Pat. Nos. 4,683,327, 5,622,648 and 5,770,107, the official gazettes of International Publication Nos. WO95/22586, 95/24455, 97/00600, 98/23580 and 98/52905, the official gazettes of Japanese Patent Application Laid-Open Nos. H1-272551, H6-16616, H7-110469 and H11-80081, the official gazette of Japanese Patent Application Laid-Open No. 2001-328973 and the like.

A preferred range of the content of the liquid crystalline compound in the composition for forming the optically anisotropic layer is preferably 50% by mass or more, more preferably 60% by mass to 99.8% by mass, and still more preferably 70% by mass to 99.5% by mass, based on the total solid content of the composition (in the case of a coating solution, based on the composition except for a solvent).

[Vertical Alignment Accelerator]

When the optically anisotropic layer is formed, in order to uniformly and vertically align the molecules of the liquid crystalline compound, an alignment controlling agent capable of vertically aligning and controlling the liquid crystalline compound on the alignment film interface side and the air interface side is preferably used. For this purpose, an optically anisotropic layer is preferably formed by using a composition containing, together with a liquid crystalline compound, a compound which acts on an alignment film to vertically align a liquid crystalline compound by the excluded volume effect, electrostatic effect or surface energy effect. Further, as for the alignment control on the air interface side, an optically anisotropic layer is preferably formed by using a composition containing, together with a liquid crystalline compound, a compound which is unevenly distributed to the air interface during alignment of the liquid crystalline compound and acts to vertically align the liquid crystalline compound by the excluded volume effect, electrostatic effect or surface energy effect. As a compound (alignment film interface side vertically aligning agent) which accelerates the vertical alignment of the molecules of the liquid crystalline compound on the alignment film interface side, a pyridinium derivative is suitably used. As a compound (air interface side vertically aligning agent) which accelerates the vertical alignment of the molecules of the liquid crystalline compound on the air interface side, a compound containing a fluoroaliphatic group and one or more hydrophilic groups selected from the group consisting of a carboxyl group (—COOH), a sulfo group (—SO$_3$H), a phosphonoxy group {—OP(=O)(OH)$_2$} and salts thereof, which accelerate the compound to be unevenly distributed to the air interface side, is suitably used. In addition, by blending these compounds, for example, when the liquid crystalline composition is prepared as a coating solution, the coatability of the coating solution is improved and thus, unevenness or cissing is suppressed from being generated.

Hereinafter, the vertically aligning agent will be described in detail.

[Alignment Film Interface Side Vertically Aligning Agent]

As an alignment film interface side vertically aligning agent which may be used in the present invention, a pyridinium derivative (pyridinium salt) represented by the following Formula (II) is suitably used. Molecules of a discotic liquid crystalline compound may be aligned substantially vertically in the vicinity of an alignment film by adding at least one of the pyridinium derivatives to the liquid crystalline compound.

Formula (II)

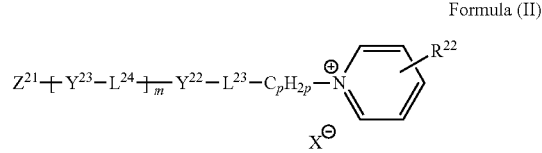

In the formula, each of $L^{23}$ and $L^{24}$ represents a divalent liking group.

$L^{23}$ is preferably a single bond, —O—, —O—CO—, —CO—O—, —C≡C—, —CH=CH—, —CH=N—, —N=CH—, —N=N—, —O-AL-O—, —O-AL-O—CO—, —O-AL-CO—O—, —CO—O-AL-O—, —CO—O-

AL-O—CO—, —CO—O-AL-CO—O—, —O—CO-AL-O—, —O—CO-AL-O—CO— or —O—CO-AL-CO—O—, and AL is an alkylene group having 1 to 10 carbon atoms. $L^{23}$ is preferably a single bond, —O—, —O-AL-O—, —O-AL-O—CO—, —O-AL-CO—O—, —CO—O-AL-O—, —CO—O-AL-CO—O—, —CO—O-AL-O—CO—, —CO—O-AL-CO—O—, —O—CO-AL-O—, —O—CO-AL-O—CO— or —O—CO-AL-CO—O—, more preferably a single bond or —O— and most preferably —O—.

$L^{24}$ is preferably a single bond, —O—, —O—CO—, —CO—O—, —C≡C—, —CH═CH—, —CH═N—, —N═CH— or —N═N—, and more preferably —O—CO— or —CO—O—. When m is 2 or more, it is more preferred that a plurality of $L^{24}$'s are alternately —O—CO— and —CO—O—.

$R^{22}$ is a hydrogen atom, an unsubstituted amino group or a substituted amino group having 1 to 25 carbon atoms.

When $R^{22}$ is a dialkyl substituted amino group, two alkyl groups may be bonded with each other to form a nitrogen-containing heterocyclic ring. A nitrogen-containing heterocyclic ring formed at this time is preferably a 5- or 6-membered ring. $R^{22}$ is more preferably a hydrogen atom, an unsubstituted amino group or a dialkyl substituted amino group having 2 to 12 carbon atoms, and still more preferably a hydrogen atom, an unsubstituted amino group or a dialkyl substituted amino group having 2 to 8 carbon atoms. When $R^{22}$ is an unsubstituted amino group and a substituted amino group, the 4-position of the pyridinium ring is preferably substituted.

X is an anion.

X is preferably a monovalent anion. Examples of the anion include a halide anion (for example, a fluoride ion, a chloride ion, a bromide ion, an iodide ion and the like), a sulfonate ion (for example, a methanesulfonate ion, a trifuloromethanesulfonate ion, a methylsulfate ion, a p-toluenesulfonate ion, a p-chlorobenzenesulfonate ion, a 1,3-benzenedisulfonate ion, a 1,5-naphthalenedisulfonate ion, a 2,6-napthalenedisulfonate ion and the like), a sulfate ion, a carbonate ion, a nitrate ion, a thiocyanate ion, a perchlorate ion, a tetrafluoroborate ion, a pierate ion, an acetate ion, a formate ion, a trifluoroacetate ion, a phosphate ion (for example, a hexafluorophosphate ion), a hydroxide ion and the like. X is preferably a halide anion, a sulfonate ion and a hydroxide ion.

Each of $Y^{22}$ and $Y^{23}$ is a divalent linking group having a 3- or 6-membered ring as a partial structure.

The 5- or 6-membered ring may have a substituent. At least one of $Y^{22}$ and $Y^{23}$ is preferably a divalent linking group having a 5- or 6-membered ring having a substituent as a partial structure. It is preferred that each of $Y^{22}$ and $Y^{23}$ is independently a divalent linking group having a 6-membered ring which may have a substituent as a partial structure. The 6-membered ring includes an aliphatic ring, an aromatic ring (benzene ring) and a heterocyclic ring. Examples of the 6-membered aliphatic ring include a cyclohexane ring, a cyclohexene ring and a cyclohexadiene ring. Examples of the 6-membered heterocyclic ring include a pyran ring, a dioxane ring, a dithiane ring, a thin ring, a pyridine ring, a piperidine ring, an oxazine ring, a morpholine ring, a thiazine ring, a pyridazine ring, a pyrimidine ring, a pyrazine ring, a piperazine ring and a triazine ring. The 6-membered ring may be condensed with another 6- or 5-membered ring.

Examples of the substituent include a halogen atom, cyano group, an alkyl group having 1 to 12 carbon atoms and an alkoxy group having 1 to 12 carbon atoms. The alkyl group and the alkoxy group may be substituted with an acyl group having 2 to 12 carbon atoms or an acyloxy group having 2 to 12 carbon atoms. The substituent is preferably an alkyl group having 1 to 12 (more preferably 1 to 6, and still more preferably 1 to 3) carbon atoms. Two or more substituents may be included, and for example, when $Y^{22}$ and $Y^{23}$ are a phenylene group, $Y^{22}$ and $Y^{23}$ may be substituted with 1 to 4 alkyl groups having 1 to 12 (more preferably 1 to 6, and still more preferably 1 to 3) carbon atoms.

Furthermore, m is 1 or 2, and preferably 2. When m is 2, each may be the same as or different from every other of $Y^{23}$ and $L^{24}$.

$Z^{21}$ is a monovalent group selected from the group consisting of a halogen-substituted phenyl, a nitro-substituted phenyl, a cyano-substituted phenyl, a phenyl substituted with an alkyl group having 1 to 25 carbon atoms, a phenyl substituted with an alkoxy group having 1 to 25 carbon atoms, an alkyl group having 1 to 25 carbon atoms, an alkynyl group having 2 to 25 carbon atoms, an alkoxy group having 1 to 25 carbon atoms, an alkoxycarbonyl group having 1 to 25 carbon atoms, an aryloxycarbooyl group having 7 to 26 carbon atoms and an arylcarbonyl group having 7 to 26 carbon atoms.

When m is 2, $Z^{21}$ is preferably cyano, an alkyl group having 1 to 25 carbon atoms, or an alkoxy group having 1 to 25 carbon atoms, and more preferably an alkoxy group having 4 to 20 carbon atoms.

When m is 1, $Z^{31}$ is preferably an alkyl group having 7 to 25 carbon atoms, an alkoxy group having 7 to 25 carbon atoms, an acyl-substituted alkyl group having 7 to 25 carbon atoms, an acyl-substituted alkoxy group having 7 to 25 carbon atoms, an acyloxy-substituted alkyl group having 7 to 12 carbon atoms, or an acyloxy-substituted alkoxy group having 7 to 25 carbon atoms.

The acyl group is represented, by —CO—R, the acyloxy group is represented by —O—CO—R, and R is an aliphatic group (an alkyl group, a substituted alkyl group, an alkenyl group, a substituted alkenyl group, an alkynyl group or a substituted alkynyl group), or an aromatic group (an aryl group or a substituted aryl group). R is preferably an aliphatic group, and more preferably an alkyl group or an alkenyl group.

p is an integer of 1 to 10. p is particularly preferably 1 or 2. $C_pH_{2p}$ means a chained alkylene group which may have a branched structure. $C_pH_{2p}$ is preferably a straight-chained alkylene group (—$(CH_2)_p$—).

Among the compounds represented by the above-mentioned Formula (II), a compound represented by the following (II') is preferred.

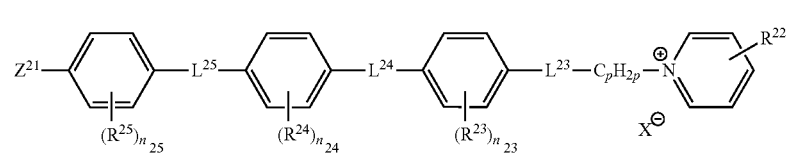

Formula (II')

In Formula (II'), the same symbols as in Formula (II) have the same meaning, and the preferred ranges thereof are also the same. $L^{23}$ has the same meaning as $L^{24}$, and the preferred ranges thereof are also the same. $L^{24}$ and $L^{25}$ are preferably —O—CO— or —CO—O—, and it is preferred that $L^{24}$ is —O—CO— and $L^{25}$ is —CO—O—.

Each of $R^{23}$, $R^{24}$ and $R^{25}$ is an alkyl group having 1 to 12 (more preferably 1 to 6, and still more preferably 1 to 3) carbon atoms. $n_{23}$ represents 0 to 4, $n_{24}$ represents 1 to 4, and $n_{25}$ represents 0 to 4. It is preferred that $n_{23}$ and $n_{25}$ are 0, and $n_{24}$ is 1 to 4 (more preferably 1 to 3).

Specific examples of the compound represented by Formula (II) include the compounds as described in [0058] to [0061] of the specification of the official gazette of Japanese Patent Application Laid-Open No. 2006-113500.

Besides, specific examples of the compound represented by Formula (II) include the following compounds. However, in the following formula, an anion ($X^-$) is omitted.

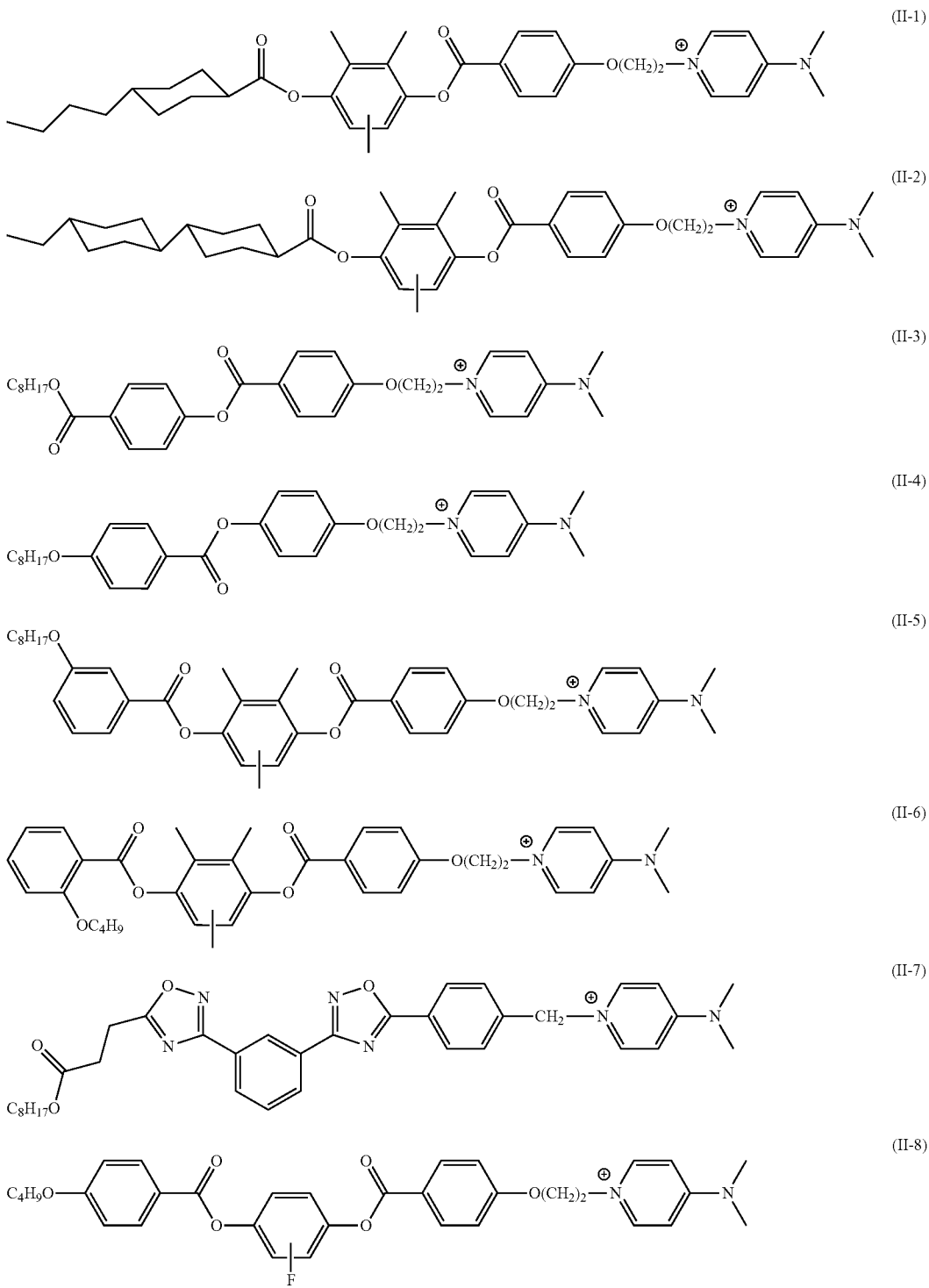

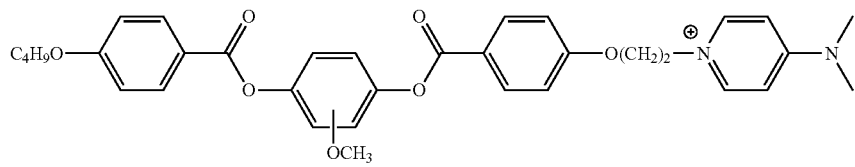
(II-9)
Hereinafter, specific examples of the compound represented by Formula (II') will be shown. However, in the following formula, an anion ($X^-$) is omitted.
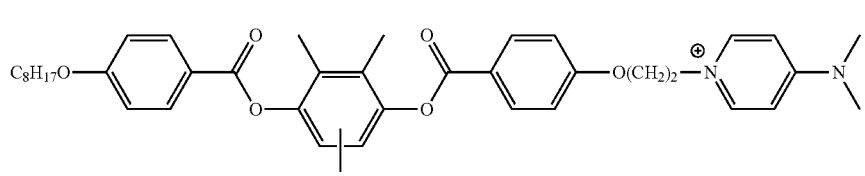
(II-10)
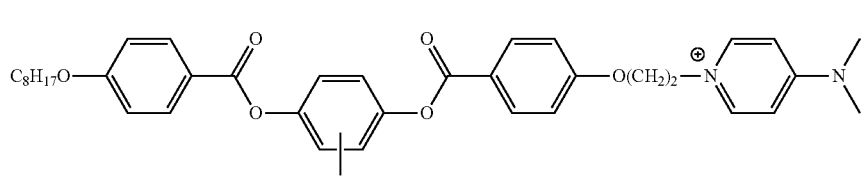
(II-11)
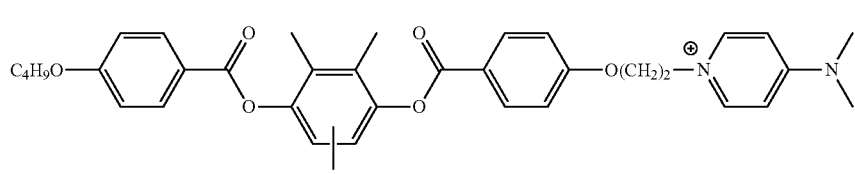
(II-12)
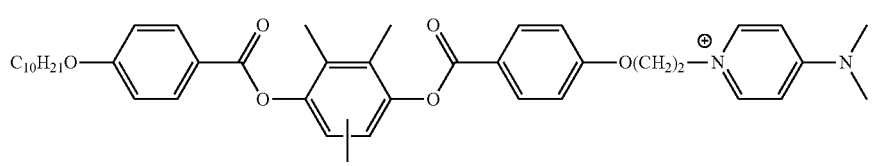
(II-13)
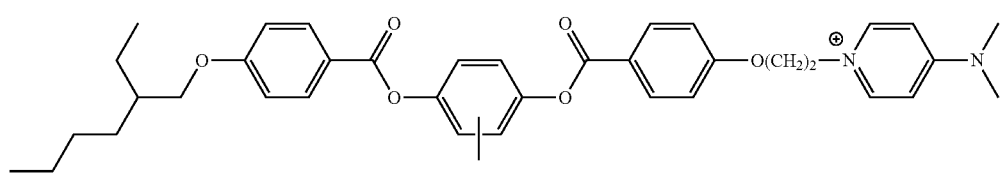
(II-14)
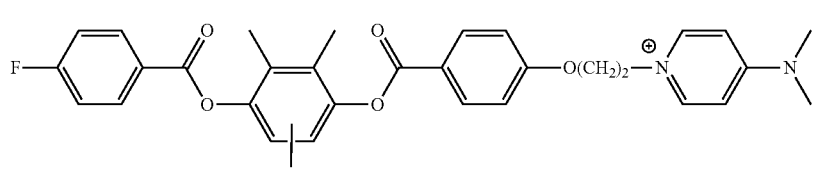
(II-15)
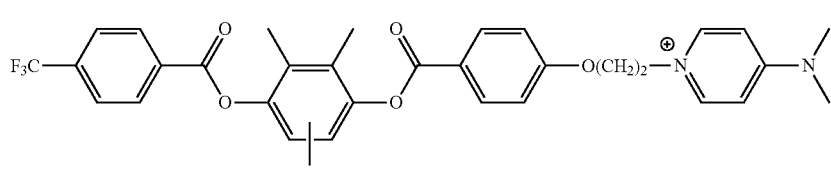
(II-16)

-continued
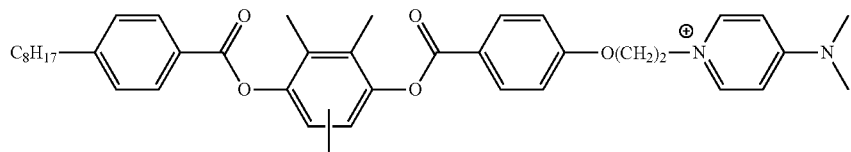
(II-17)
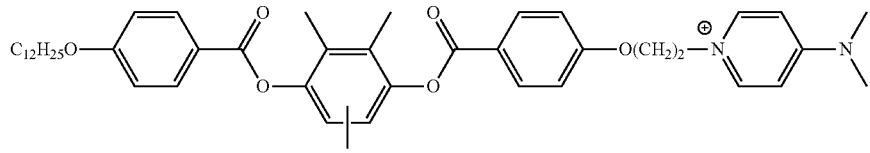
(II-18)
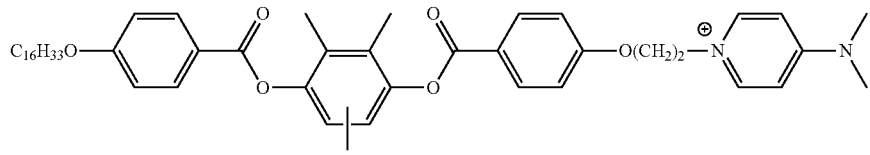
(II-19)
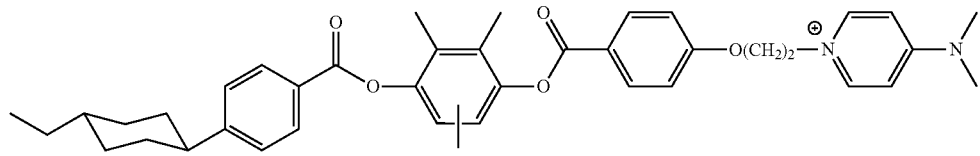
(II-20)
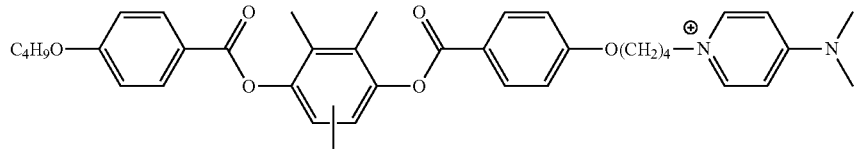
(II-21)
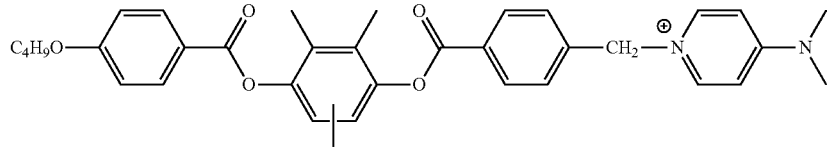
(II-22)
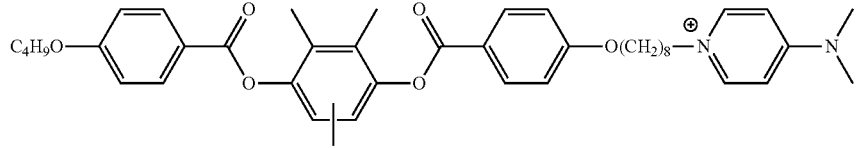
(II-23)
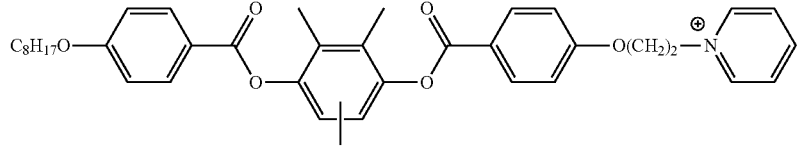
(II-24)
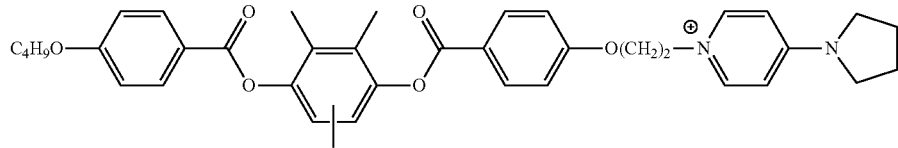
(II-25)

-continued

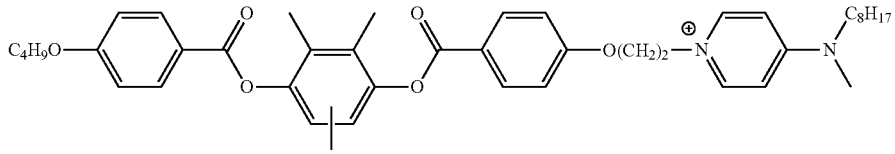
(II-26)

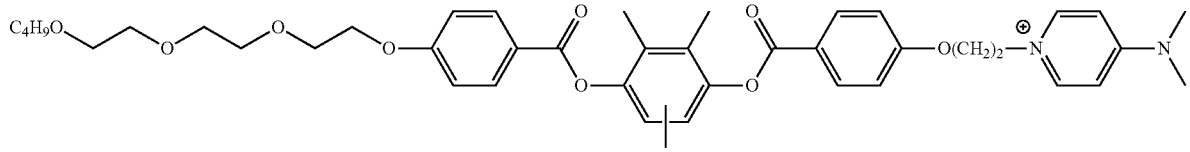
(II-27)

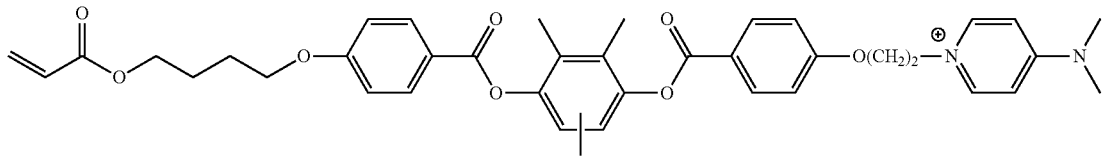
(II-28)

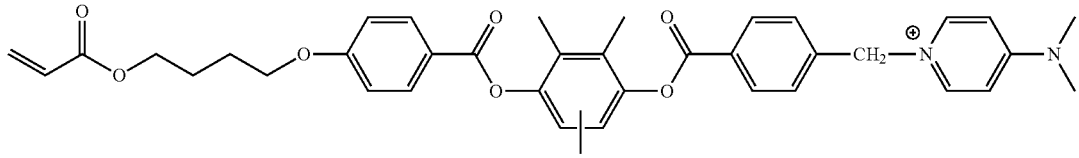
(II-29)

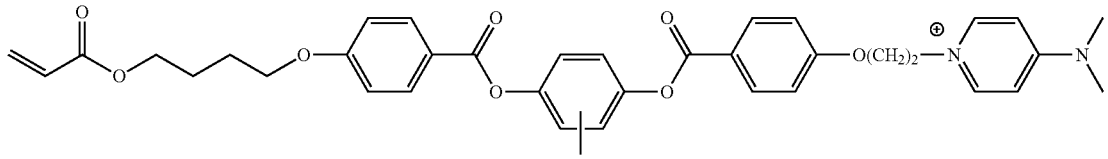
(II-30)

The pyridinium derivative of Formula (II) is generally obtained by subjecting a pyridine ring to alkylation (Menschutkin reaction).

A preferred range of the content of the pyridinium derivative in the composition for forming an optically anisotropic layer varies depending on the use thereof, but is preferably 0.005% by mass to 8% by mass, and more preferably 0.01% by mass to 5% by mass, based on the composition (liquid crystalline composition except for a solvent when the composition is prepared as a coating solution).

[Air Interface Side Vertically Aligning Agent]

As the air interface side vertically aligning agent in the present invention, a fluorine-containing compound represented by the following fluorine-based polymer (IIA) or Formula (III) is suitably used.

The fluorine-based polymer is a copolymer including a repeating unit derived from a fluoro-aliphatic group-containing monomer and a repeating unit represented by the following Formula (IIA).

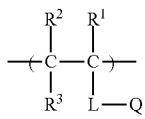

Formula (IIA)

In Formula (IIA), each of $R^1$, $R^2$ and $R^3$ independently represents a hydrogen atom or a substituent. Q represents a carboxylic group (—COOH) or a salt thereof, a sulfo group (—$SO_3H$) or a salt thereof, or a phosphonoxy group {—OP(=O)($OH)_2$} or a salt thereof. L represents any group selected from the following group of linking groups or a divalent linking group formed by combining two or more thereof.

(Group of Linking Groups)

A single bond, —O—, —CO—, —$NR^b$— ($R^6$ represents a hydrogen atom, an alkyl group, an aryl group or an aralkyl group), —S—, —$SO_2$—, —P(=O)($OR^c$)— ($R^c$ represents an alkyl group, an aryl group or an aralkyl group), an alkylene group and an arylene group.

Fluorine-containing compound represented by the following Formula (III).

$$(R^0)_m\text{-}L^0\text{-}(W)_n \quad \text{(III)}$$

In the formula, $R^0$ represents an alkyl group, an alkyl group having a $CF_3$ group at the end, or art alkyl group having a $CF_2H$ group at the end, and m represents an integer of 1 or more. Each $R^0$ may be the same as or different from every other $R^0$, but at least one thereof represents an alkyl group having a $CF_3$ group or a $CF_2H$ group at the end. $L^0$ represents a (m+n)-valent linking group, W represents a carboxylic group (—COOH) or a salt thereof, a sulfo group (—$SO_3H$) or a salt thereof or a phosphonoxy group {—OP(=O)($OH)_2$} or a salt thereof and n represents an integer of 1 or more.

First, the fluorine-based polymer will be described.

The fluorine-based polymer that may be used in the present invention is characterized in that the polymer contains a fluoro-aliphatic group and one or more hydrophilic groups selected from the group consisting of a carboxyl group (—COOH), a sulfo group (—SO$_3$H), a phosphonoxy group {—OP(=O)(OH)$_2$} and salts thereof. As for kinds of the polymers, there is a description on pages 1 to 4 in "Revised Chemistry of Polymer Synthesis" written by Takayuki Otsu and published by Kagaka-Dojin Publishing Company, Inc., 1968, and examples of the polymers include polyolefins, polyesters, polyamides, polyimides, polyurethanes, polycarbonates, polysulfones, polyethers, polyacetals, polyketones, polyphenylene oxides, polyphenylene sulfides, polyarylates, PTFEs, polyvinylidene fluorides, cellulose derivatives, and the like. The fluorine-based polymer is preferably polyolefins.

The fluorine-based polymer is a polymer having a fluoro-aliphatic group in the side chain thereof. The fluoro-aliphatic group has preferably 1 to 12 carbon atoms, and more preferably 6 to 10 carbon atoms. The aliphatic group may be chained or cyclic, and when the aliphatic group is chained, the aliphatic group may be straight-chained or branch-chained. Among them, a straight-chained fluoro-aliphatic group having 6 to 10 carbon atoms is preferred. The degree of substitution by a fluorine atom is not particularly limited, but 50% or more of the hydrogen atoms in the aliphatic group are preferably substituted by a fluorine atom, and 60% or more are more preferably substituted. The fluoro-aliphatic group is contained in the side chain bonded with the main chain of a polymer through an ester bond, an amide bond, an imide bond, a urethane bond, a urea bond, an ether bond, a thioether bond, an aromatic ring and the like. One of the fluoro-aliphatic groups is derived from a fluoro-aliphatic compound prepared by the telomerization method (also referred to as a telomer method) or the oligomerization method (also referred to as an oligomer method). The preparation method of the fluoro-aliphatic compounds is described, for example, on pages 117 to 118 of "Synthesis and Function of Fluorine Compounds" (compiled by Nobuo Ishikawa, published by CMC Publishing Co., Ltd., 1987), or on pages 747 to 752 of "Chemistry of Organic Fluorine Compounds II" (Monograph 187, Ed by Milos Hudlicky and Attila E. Pavlath, American Chemical Society, 1995). The telomerization method is a method to which an alkyl halide having a large chain transfer constant such as an iodide and the like is used as a telogen to perform radical polymerization of a fluorine-containing vinyl compound such as tetrafluoroethylene and the like, thereby synthesizing a telomer (exemplified in Scheme-1).

Scheme 1

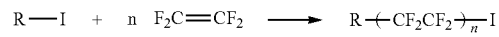

The obtained iodine-terminated telomer is usually subjected to appropriate terminal chemical modification, for example, as in [Scheme 2] and thus derived to fluoro-aliphatic compounds. These compounds are further converted, if necessary, into desired monomer structures, which are then used in the preparation of a fluoro-aliphatic group-containing polymer.

Scheme 2

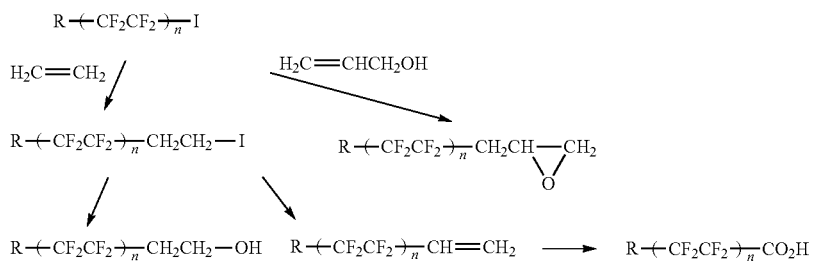

Specific examples of a monomer that may be used in the preparation of the fluorine-based polymer usable in the present invention include me compounds described in Paragraph Nos. [0075] to [0081] of the official gazette of Japanese Patent Application Laid-Open No. 2006-113500, and the like, but the present invention is not limited to these specific examples in any way.

In Formula (IIA), each of R$^1$, R$^2$ and R$^3$ independently represents a hydrogen atom or a substituent selected from the group of substituents exemplified below.

(Group of Substituents)

Examples of the group of substituents include an alkyl group (an alkyl group having preferably 1 to 20 carbon atoms, more preferably 1 to 12 carbon atoms, and particularly preferably 1 to 8 carbon atoms, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), an alkenyl group (an alkenyl group having preferably 2 to 20 carbon atoms, more preferably 2 to 12 carbon atoms, and particularly preferably 2 to 8 carbon atoms, and examples thereof include a vinyl group, an aryl group, a 2-butenyl group, a 3-pentenyl group and the like), an alkynyl group (an alkynyl group having preferably 2 to 20 carbon atoms, more preferably 2 to 12 carbon atoms, and particularly preferably 2 to 8 carbon atoms, and examples thereof include a propargyl group, a 3-pentynyl group and the like), an aryl group (an aryl group having preferably 6 to 30 carbon atoms, more preferably 6 to 20 carbon atoms, and particularly preferably 6 to 12 carbon atoms, and examples thereof include a phenyl group, a p-methylphenyl group, a naphthyl group and the like), an aralkyl group (an aralkyl group having preferably 7 to 30 carbon atoms, more preferably 7 to 20 carbon atoms, and particularly preferably 7 to 12 carbon atoms, and examples thereof include a benzyl group, a phenethyl group, a 3-phenylpropyl group and the like), a substituted or unsubstituted amino group (an amino group having preferably 0 to 20 carbon atoms, more preferably 0 to 10 carbon atoms, and particularly preferably 0 to 6 carbon atoms, and examples thereof include an unsubstituted amino group, a methylamino group, a dimethylamino group, a diethylamino group, an anilino group and the like).

an alkoxy group (an alkoxy group having preferably 1 to 20 carbon atoms, more preferably 1 to 16 carbon atoms, and particularly preferably 1 to 10 carbon atoms, and examples thereof include a methoxy group, an ethoxy group, a butoxy group and the like), an alkoxycarbonyl group (an alkoxycarbonyl group having preferably 2 to 20 carbon atoms, more preferably 2 to 16 carbon atoms, and particularly preferably 2 to 10 carbon atoms, and examples thereof include a memoxycarhonyl group, an ethoxycarbonyl group and the like), an acyloxy group (an acyloxy group having preferably 2 to 20 carbon atoms, more preferably 2 to 16 carbon atoms, and particularly preferably 2 to 10 carbon atoms, and examples thereof include an acetoxy group, a benzoyloxy group and the like), an acylamino group (an acylamino group having preferably 2 to 20 carbon atoms, more preferably 2 to 16 carbon atoms, and particularly preferably 2 to 10 carbon atoms, and examples thereof include an acetylamino group, a benzoylamino group and the like), an alkoxycarbonylamino group (an alkoxycarbonylamino group having preferably 2 to 20 carbon atoms, more preferably 2 to 16 carbon atoms, and particularly preferably 2 to 12 carbon atoms, and examples thereof include a methoxycarbonylamino group and the like), an aryloxycarbonylamino group (an aryloxycarbonylamino group having preferably 7 to 20 carbon atoms, more preferably 7 to 16 carbon atoms, and particularly preferably 7 to 12 carbon atoms, and examples thereof include a phenyloxycarbonylamino group and the like), a sulfonylamino group (a sulfonylamino group having preferably 1 to 20 carbon atoms, more preferably 1 to 16 carbon atoms, and particularly preferably 1 to 12 carbon atoms, and examples thereof include a methanesulfonylamino group, a benzenesulfonylamino group and the like), a sulfamoyl group (a sulfamoyl group having preferably 0 to 20 carbon atoms, more preferably 0 to 16 carbon, atoms, and particularly preferably 0 to 12 carbon atoms, and examples thereof include a sulfamoyl group, a methylsulfamoyl group, a dimethylsulfamoyl group, a phenylsulfamoyl group and the like), a carbamoyl group (a carbamoyl group having preferably 1 to 20 carbon atoms, more preferably 1 to 16 carbon atoms, and particularly preferably 1 to 12 carbon atoms, and examples thereof include an unsubstituted carbamoyl group, a methylcarbamoyl group, a diethylcarbamoyl group, a phenylcarbamoyl group and the like), and an alkylthio group (an alkythio group having preferably 1 to 20 carbon atoms, more preferably 1 to 16 carbon atoms, and particularly preferably 1 to 12 carbon atoms, and examples thereof include a methylthio group, an ethylthio group and the like), an arylthio group (an arylthio group having preferably 6 to 20 carbon atoms, more preferably 6 to 16 carbon atoms, and particularly preferably 6 to 12 carbon atoms, and examples thereof include a phenylthio group and the like), a sulfonyl group (a sulfonyl group having preferably 1 to 20 carbon atoms, more preferably 1 to 16 carbon atoms, and particularly preferably 1 to 12 carbon atoms, and examples thereof include a mesyl group, a tosyl group and the like), a sulfinyl group (a sulfinyl group having preferably 1 to 20 carbon atoms, more preferably 1 to 16 carbon atoms, and particularly preferably 1 to 12 carbon atoms, and examples thereof include a methanesulfinyl group, a benzenesulfinyl group and the like), a ureido group (a ureido group having preferably 1 to 20 carbon atoms, more preferably 1 to 16 carbon atoms, and particularly preferably 1 to 12 carbon atoms, and examples thereof include an unsubstituted ureido group, a methylureido group, a phenylureido group, and the like), a phosphoric amide group (a phosphoric amide group having preferably 1 to 20 carbon atoms, more preferably 1 to 16 carbon atoms, and particularly preferably 1 to 12 carbon atoms, and examples thereof include a diethylphosphoric amide group, a phenylphosphoric amide group and the like), a hydroxyl group, a mercapto group, a halogen atom (for example, a fluorine atom, a chlorine atom, a bromine atom and an iodine atom), a cyano group, a sulfo group, a carboxyl group, a nitro group, a hydroxamic acid group, a sulfino group, a hydrazine group, an imino group, a heterocyclic group (a heterocyclic group having preferably 1 to 30 carbon atoms and more preferably 1 to 12 carbon atoms, for example, a heterocyclic group having a heteroatom such as a nitrogen atom, an oxygen atom, a sulfur atom and the like, and examples thereof include an imidazolyl group, a pyridyl group, a quinolyl group, a furyl group, a piperidyl group, a morpholino group, a benzoxazolyl group, a benzimidazolyl group, a benzthiazolyl group and the like), a silyl group (a silyl group having preferably 3 to 40 carbon atoms, more preferably 3 to 30 carbon atoms, and particularly preferably 3 to 24 carbon atoms, and examples thereof include a trimethylsilyl group, a triphenylsilyl group and the like). These substituents may be further substituted with these substituents. In addition, when two or more substituents are possessed, each substituent may be the same as or different from every other substituent. Furthermore, the substituents may be bonded to each other to form a ring, if possible.

Each of $R^1$, $R^2$ and $R^3$ independently represents preferably a hydrogen atom, an alkyl group, a halogen group (for example, a fluorine atom, a chlorine atom, a bromine atom, an iodine atom and the like), or a group represented by -L-Q as described below, more preferably a hydrogen atom, an alkyl group having 1 to 6 carbon atoms, a chlorine atom, or a group represented by -L-Q, particularly preferably a hydrogen atom or an alkyl group having 1 to 4 carbon atoms, and most preferably a hydrogen atom or an alkyl group having 1 to 2 carbon atoms. Specific examples of the alkyl group include a methyl group, an ethyl group, an n-propyl group, an n-butyl group, a sec-butyl group and the like. The alkyl group may have a suitable substituent. Examples of the substituent include a halogen atom, an aryl group, a heterocyclic group, an alkoxyl group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamide group, a sulforyl group, a carboxyl group and the like. Meanwhile, for the number of carbon atoms in the alkyl group, carbon atoms in the substituents are not included. Hereinafter, the same applies to the number of carbon atoms in other groups.

L represents a divalent linking group selected from the group of linking groups, or a Divalent linking group formed by combining two or more thereof. Among the group of the linking groups, $R^b$ of —$NR^b$— represents a hydrogen atom, an alkyl group, an aryl group or an aralkyl group, and preferably a hydrogen atom or an alkyl group. Further, $R^c$ of —PO(O$R^c$)— represents an alkyl group, an aryl group or an aralkyl group, and preferably an alkyl group. When $R^b$ and $R^c$ represent an alkyl group, an aryl group or an aralkyl group, the number of carbon atoms is the same as described for the "group of substituents". Examples of L preferably include a single bond, —O—, —CO—, —$NR^b$—, —S—, —$SO_2$—, an alkylene group or an arylene group, and particularly preferably include —CO—, —O—, —$NR^b$—, an alkylene group or an arylene group. When L includes an alkylene group, the number of carbon atoms in the alkylene group is preferably 1 to 10, more preferably 1 to 8, and particularly preferably 1 to 6. Specific examples of the particularly preferred alkylene group include methylene, ethylene, trimethylene, tetrahatylene, a hexamethylene group and the like. When L includes an arylene group, the number of carbon atoms in the arylene group is preferably 6 to 24, more preferably 6 to 18, and particularly preferably 6 to 12. Specific examples of the particularly preferred arylene group include phenylene, a naphthalene group and the like. When L includes a divalent linking group (that is, an aralkylene group) obtained by combining an alkylene group and an arylene group, the number of carbon atoms in the aralkylene group is preferably 7 to 34, more preferably 7 to 26, and particularly preferably 7 to 16. Specific examples of the particularly preferred aralkylene group include a phenylenemethylene group, a phenyleneethylene group, a methylenephenylene group and the like. The group exemplified as L may have a suitable substituent. Examples of the substituent include those which are the same as previously exemplified as the substituent in $R^1$ to $R^3$. Hereinafter, the specific structures of L include the structures described in Paragraph Nos. [0090] and [0091] of the official gazette of Japanese Patent Application Laid-Open No. 2006-113500, but the present invention is not limited to these specific examples in any way.

In Formula (IIA), Q represents a carboxyl group and a salt thereof (for example, a lithium salt a sodium salt, a potassium salt, an ammonium salt (for example, ammonium, tetramethylammonium, trimethyl-2-hydroxyethylammonium, tetrabutylammonium, trimethylbenzylammonium, dimethylphenylammonium and the like), a pyridinium salt and the like), a sulfo group and a salt thereof (examples of the cation forming a salt are the same as those described for the carboxyl group), and a phosphonoxy group and a salt thereof (examples of the cation forming a salt are the same as those described for the carboxyl group). Q is more preferably a carboxyl group, a sulfo group, or a phospho group, and particularly preferably a carboxyl group or a sulfo group.

The fluorine-based polymer may include one of the repeating units represented by Formula (IIA), and may also contain two or more thereof. In addition, the fluorine-based polymer may have one or two or more of other repeating units in addition to each repeating unit. The other repeating unit is not particularly limited, but preferred examples thereof include a repeating unit derived from a typical radically polymerizable monomer. Hereinafter, specific examples of the monomer that derives other repeating units will be mentioned. The fluorine-based polymer may contain a repeating unit derived from one or two or more of monomers selected from the following group of monomers.

Group of Monomers (1) Alkenes

Ethylene, propylene, t-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride and the like;

(2) Dienes 1,3-butadiene, isoprene, 1,3-pentadiene, 2-ethyl-1,3-butadiene, 2-n-propyl, 3-butadiene, 2,3-dimethyl-1,33-butadienes 2-methyl-1,3-pentadiene, 1-phenyl-1,3-butadiene, 1-α-naphthyl-1,3-butadiene, 1-β-naphthyl-1,3-butadiene-, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene and 2-cyano-1,3-butadiene, 1,4-divinyl cyclohexane and the like;

(3) Derivatives of α,β-unsaturated Carboxylic Acid (3a) Alkyl Acrylates

Methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl a acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl Acrylate, ω-methoxypolyethylene glycol acrylate (number of added moles of polyoxyethylene: N=2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate and the like;

(3b) Alkyl Methacrylates

Methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethylene glycol methacrylate (number of added moles of polyoxyethylene: n=2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, allyl methacrylate, 2-isocyanatoethyl methacrylate and the like;

(3c) Diesters of Unsaturated Polyvalent Carboxylic Acid

Dimethyl malate, dibutyl malate, dimethyl itaconate, dibutyl itaconate, dibutyl crotonate, dihexyl crotonate, diethyl fumarate, dimethyl fumarate and the like;

(3d) Amides of α,β-unsaturated Carboxylic Acid

N,N-dimethylacrylic amide, N,N-diethylacrylic amide, N-n-propylacrylic amide, N-tert-butylacrylic amide, N-tert-octyl methacrylamide, N-cyclohexylacrylic amide, N-phenylacrylic amide, N-(2-acetoacetoxyethyl)acrylic amide, N-benzylacrylic amide, N-acryloylmorpholine, diacetone acrylic amide, N-methylmaleimide and the like;

(4) Unsaturated Nitriles

Acrylonitrile, methacrylonitrile and the like;

(5) Styrenes and Derivatives Thereof

Styrene, vinyltolueue, ethyl styrene, p-tert-butylstyrene, methyl p-vinylbenzoate, α-methylstyrene, p-chloromethyl styrene, vinylnaphthalen, p-methoxystyrene, p-hydroxxymethylstyrene, p-acetoxystyrene and the like;

(6) Vinyl Esters

Vinyl acetate, vinyl propionate, vinyl butyrate, vinyl isobutyrate, vinyl benzoate, vinyl salicylate, vinyl chloroacetate, vinyl methoxyacetate, vinyl phenyl acetate and the like;

(7) Vinyl Ethers

Methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether and the like; and (8) Other Polymerizable Monomers N-vinylpyrrolidone, methyl vinyl ketone, phenyl vinyl ketone, methoxyethyl vinyl ketone, 2-vinyloxazoline, 2-isopropenyloxazoline and the like.

Among the fluorine-based polymers, the amount of the fluoro-aliphatic group-containing monomer is preferably 5% by mass or more, more preferably 10% by mass or more, and still more preferably 30% by mass or more, based on the total amount of the monomer constituting the polymer. In the fluorine-based polymer, the amount of the repeating unit represented by Formula (IIA) is preferably 0.5% by mass or more, more preferably 1% by mass to 20% by mass, and still more preferably 1% by mass to 10% by mass, based on the total amount of the monomer constituting the fluorine polymer. For the percentage by mass, the value of the preferred range is easily changed according to the molecular weight of the monomer to be used, and thus by presenting the molar number of the functional group per unit mass of a polymer, the content of a repeating unit represented by Formula (IIA) may be accurately determined. When the notation is used, a preferred amount of a hydrophilic group contained in the fluorine-based polymer (Q in Formula (IIA)) is 0.1 mmol/g to 10 mmol/g, and a more preferred amount is 0.2 mmol/g to 8 mmol/g.

The mass average molecular weight of the fluorine-based polymer that is used in the present invention is preferably 1,000,000 or less, more preferably 500,000 or less, and still more preferably 100,000 or less. The mass average molecular weight may be measured as a value in terms of polystyrene (PS) by using gel permeation chromatography (GPC).

A polymerization method of the fluorine-based polymer is not particularly limited, but for example, a polymerization method such as cationic polymerization or radical polymerization using a vinyl group, anionic polymerization and the like may be adopted, and among them, the radical polymerization is particularly preferred in that the polymerization may be used for all purposes. As a polymerization initiator of the radical polymerization, a known compound such as a radical thermopolymerization initiator, a radical photopolymerization initiator and the like may be used, but a radical thermopolymerization initiator is particularly preferably used. Herein, the radical thermopolymerization initiator is a compound which generates radicals by heating to the decomposition temperature or more. Examples of the radical thermopolymerization initiator include diacyl peroxide (acetyl peroxide, benzoyl peroxide and the like), ketone peroxide (methyl ethyl ketone peroxide, cyclohexaoone peroxide and the like), hydroperoxide (hydrogen peroxide, tert-butylhydroperoxide, cumene hydroperoxide and the like), dialkyl peroxide (di-tert-butyl peroxide, dicumyl peroxide, dilauroyl peroxide, and the like), peroxy esters (tert-butyl peroxyacetate, tert-butyl peroxypivalate and the like), an azo-based compound (azo-bis-isobutyronitrile, azobisisovaleronitrile and the like), and persulfates (ammonium persulfate, sodium persulfate, potassium persulfate and the like). These radical thermopolymerization initiators may be used either alone or in combination of two or more thereof.

The radical polymerization method is not particularly limited, but an emulsion polymerization method, a suspension polymerization method, a mass polymerization method, a solution polymerization method and the like may be adopted. The solution polymerization which is a typical radical polymerization method will be described in more detail. The fundamentals of other polymerization methods are the same, and details thereof are described, for example, in "Experimental Methods for Polymer Synthesis" edited by the Society of Polymer Science, Japan (TOKYO KAGAKU-DOJIN Co., Ltd., 1981) and the like.

An organic solvent is used to perform the solution polymerization. These organic solvents may be arbitrarily selected as long as the solvents do not impair the object and effect of the present invention. The organic solvents are usually an organic compound having a boiling point in a range of 50° C. to 200° C. under atmospheric pressure, and an organic compound which uniformly dissolves each constitutional component is preferred. Preferred examples of the organic solvent include alcohols such as isopropanol, butanol and the like; ethers such as dibutyl ether, ethylene glycol dimethyl ether, tetrahydrofuran, dioxane and the like; ketones such as acetone, methyl ethyl ketone, methyl isobutyl ketone, cyclohexanone and tire like; esters such as ethyl acetate, butyl acetate, amyl acetate, γ-butyrolactone and the like; and aromatic hydrocarbons such as benzene, toluene, xylene and the like. Meanwhile, these organic solvents may be used either alone or in combination of two or more thereof. Further, from the viewpoint of solubility of a monomer or a produced polymer, a water-mixed organic solvent may also be applied, in which water is used in combination with the organic solvent.

In addition, the conditions for solution polymerization are not particularly limited, but it is preferred that the system is heated within a temperature range of for example, 50° C. to 200° C. for 10 minutes to 30 hours. Furthermore, in order not to deactivate the generated radicals, it is preferred that inert gas is purged not only during the solution polymerization, but also prior to the solution polymerization initiation. As the inert gas, a nitrogen gas is typically suitably used.

In order to obtain the fluorine-based polymer within a preferred molecular weight range, a radical polymerization method using a chain transfer agent is particularly effective. As the chain transfer agent, it is possible to use any of mercaptans (for example, octylmercaptan, decylmercaptan, dodecylmercaptan, tert-dodecylmercaptan, octadecylmercaptan, thiophenol p-nonylthiophenol and the like), polyhalogenated alkyl (for example, carbon tetrachloride, chloroform, 1,1,1-trichloroethane, 1,1,1-tribromooctane and the like), and low-active monomers (α-methylstyrene, an α-methylstyrene dimer and the like), but mercaptans having 4 to 16 carbon atoms are preferably used. The amount of the chain transfer agent used is significantly influenced by an activity of the chain transfer agent, a combination of the monomers, polymerization conditions, or the like, and thus is required to be precisely controlled. Usually, based on the total molar number of the monomers used, the amount of the chain transfer agent used is approximately 0.01 mol % to 50 mol %, preferably 0.05 mol % to 30 mol %, and particularly preferably 0.08 mol % to 25 mol %. These chain transfer agents may be allowed to be present, in the system, together with the subjective monomers whose degree of polymerization during the polymerisation process needs to be controlled, and the addition method thereof is not particularly critical. The chain transfer agent may be added while being dissolved in a monomer, or may also be added separately from the monomer.

Meanwhile, it is also preferred that the fluorine-based polymer of the present invention has a polymerizable group as a substituent in order to fix the alignment state of the discotic liquid crystalline compound.

Specific examples of a fluoro-aliphatic group-containing copolymer which is preferably used as the fluorine-based polymer in the present invention include the compounds described in Paragraph Nos. [0110] to [0114] of the official gazette of Japanese Patent Application Laid Open No. 2006-113500, and the like, but the present invention is not limited to these specific examples in any way.

The fluorine-based polymer used in the present invention may be prepared by a known and practical method. For example, to an organic solvent including the monomer having a fluoro-aliphatic group as previously exemplified, a monomer having a group capable of hydrogen bonding and the like, a radical polymerization initiator for all purposes may be added, and the resulting mixture may be polymerized to prepare the fluorine-based polymer. Further, in cases, other addition polymerizable unsaturated compounds may be further added to prepare the fluorine-based polymer by the above-mentioned method. According to the polymerizability of each monomer, a dropwise polymerization method that performs polymerization while adding monomers and an initiator dropwise into a reactor, or the like is effective for obtaining a polymer with a uniform composition.

A preferred range of the content of the fluorine-based polymer in the composition varies depending on the use thereof, but when the fluorine-based polymer is used for formation of an optically anisotropic layer, the content is preferably 0.005% by mass to 8% by mass, more preferably 0.01% by mass to 5% by mass, and still more preferably 0.05% by mass to 3% by mass, based on the composition (the composition except for a solvent in the case of a coating solution). When the amount of the fluorine-based polymer added is less than 0.005% by mass, the effect thereof is insufficient, and when the amount added is more than 8% by mass, the coating film is not sufficiently dried, or the performance as an optical film (for example, uniformity of retardation, and the like) is influenced negatively.

Subsequently, a fluorine-containing compound represented by Formula (III) will be described.

In Formula (III), $R^0$ functions as a hydrophobic group of a fluorine-containing compound. An alkyl group represented by $R^0$ may be a substituted or unsubstituted alkyl group, may be a straight-chained or branch-chained, and is preferably an alkyl group having 1 to 20 carbon atoms, more preferably an alkyl group having 4 to 16 carbon atoms, and particularly preferably an alkyl group having 6 to 16 carbon atoms. As the substituent, any one of the substituents exemplified as the group D of substituents as described below may be applied. An alkyl group having a $CF_3$ group at the end, which is represented by $R^0$, has preferably 1 to 20 carbon atoms, more preferably 4 to 16 carbon atoms, and particularly preferably 4 to 8 carbon atoms. The alkyl group having a $CF_3$ group at the end is an alkyl group having the hydrogen atoms contained in the alkyl group, which are partially substituted or all substituted with fluorine atoms, 50% or more of hydrogen atoms in the alkyl group are preferably substituted with fluorine atoms, 50% or more thereof are more preferably substituted, and 70% or more thereof are particularly preferably substituted. The remaining hydrogen atoms may also be substituted with substituents exemplified as the group D of substituents as described below. An alkyl group having a $CF_2H$ group at the end, which is represented by $R^0$, has preferably 1 to 20 carbon atoms, more preferably 4 to 16 carbon atoms, and particularly preferably 4 to 8 carbon atoms. The alkyl group having a $CF_2H$ group at the end is an alkyl group having the hydrogen atoms contained in the alkyl group, which are partially substituted or all substituted with fluorine atoms. 50% or more of hydrogen atoms in the alkyl group are preferably substituted with fluorine atoms, 60% or more thereof are more preferably substituted, and 70% or more thereof are particularly preferably substituted. The remaining hydrogen atoms may also be substituted with substituents exemplified as the group D of substituents as described below. Examples of the alkyl group having a $CF_3$ group at the end or the alkyl group having a $CF_2H$ group at the end, which is represented by $R^0$, are shown below.

R1: n-$C_8F_{17}$—
R2: n-$C_6F_{13}$—
R3: n-$C_4F_9$—
R4: n-$C_8F_{17}$—$(CH_2)$—
R5: n-$C_6F_{13}$—$(CH_2)$—
R6: n-$C_4F_9$—$(CH_2)_2$—
R6: H—$(CF_2)_8$—
R8: H—$(CF_2)_6$—
R9: H—$(CF_2)_4$—
R10: H—$(CF_2)_8$—$(CH_2)$—
R11: H—$(CF_2)_6$—$(CH_2)$—
R12: H—$(CF_2)_4$—$(CH_2)$—

In Formula (III), a (m+n)-valent linking group represented by $L^0$ is preferably a linking group formed by combining at least two groups selected from the group consisting of an alkylene group, an alkenylene group, an aromatic group, a heterocyclic group, —CO—, —NR— (in which R is an alkyl group having 1 to 5 carbon atoms or a hydrogen atom), —O—, —S—, —SO— and —$SO_2$—.

In Formula (III), W represents a carboxyl group (—COOH) or a salt thereof, a sulfo group (—$SO_3H$) or a salt thereof or a phosphonoxy group {—OP(=O)(OH)$_2$} or a salt thereof. The preferred range of W is the same as that of Q in Formula (IIA).

Among the fluorine-containing compounds represented by Formula (III), a compound represented by the following Formula (III)-a or (III)-b is preferred.

Formula (III)-a

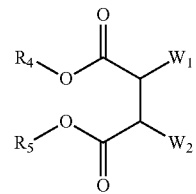

In Formula (III)-a, each of and $R_4$ represents an alkyl group, an alkyl group having a $CF_3$ group at the end, or an alkyl group having a $CF_2H$ group at the end, but $R_4$ and $R_5$ are not an alkyl group at the same time. Each of $W_1$ and $W_2$ represents a hydrogen atom, a carboxyl group (—COOH) or a salt thereof a sulfo group (—$SO_3H$) or a salt thereof; a phosphonoxy group {—OP(=O)(OH)$_2$} or a salt thereof, or an alkyl group, an alkoxy group, or an alkylamino group having a carboxyl group, a sulfo group, or a phosphonoxy group as a substituent, but $W_1$ and $W_2$ are not a hydrogen atom at the same time.

$(R_6-L_2-)_{m2}(Ar_1)$—$W_3$      Formula (III)-b

In Formula (III)-b, $R_6$ represents an alkyl group, an alkyl group having a $CF_3$ group at the end, or an alkyl group having a $CF_2H$ group at the end, m2 represents an integer of 1 or more, each $R_6$ may be the same as or different from every other $R_6$, but at least one $R_6$ represents an alkyl group having a $CF_3$ group or a $CF_2H$ group at the end, $L_2$ represents a divalent linking group selected from the group consisting of an alkylene group, art aromatic group, —CO—, —NR— (R is an alkyl group having 1 to 5 carbon atoms or a hydrogen atom), —O—, —S—, —SO—, —$SO_2$—, or a combination thereof, and each $L_2$ may be the same as or different from every other $L_2$. $Ar_1$ represents an aromatic hydrocarbon ring or an aromatic heterocyclic ring, and $W_3$ represents a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group, or a phosphonoxy group as a substituent.

First, the Formula (III)-a will be described.

$R_4$ and $R_5$ have the same meaning as $R^0$ in Formula (III), and preferred ranges thereof are also the same. A carboxyl group (—COOH) or a salt thereof, a sulfo group (—$SO_3H$) or a salt thereof a phosphonoxy group {—OP(=O)(OH)$_2$} or a salt thereof represented by $W_1$ and $W_2$ have the same meaning as W in Formula (III), and preferred ranges thereof are also the Same. An alkyl group having a carboxyl group, a sulfo group or a phosphonoxy group as a substituent represented by $W_1$ and $W_2$ may be straight-chained or branch-chained, and is preferably an alkyl group having 1 to 20 carbon atoms, more preferably an alkyl group having 1 to 8 carbon atoms, and particularly preferably an alkyl group having 1 to 3 carbon atoms. The alkyl group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same meaning as the carboxyl group, the sulfo group and the phosphonoxy group represented by W in Formula (III), and preferred ranges thereof are also the same. The alkyl group having a carboxyl group, a sulfo group or a phosphonoxy group as a substituent may be substituted with other substituents, and as the substituent, any one of substituents exemplified as the group D of substituents as described below may be applied. An alkoxy group having a carboxyl group, a sulfo group or a phosphonoxy group as a substituent represented by $W_1$ and $W_2$ may be straight-chained or branch-chained, and is preferably an alkoxy group having 1 to 20 carbon atoms, more preferably an alkoxy group having 1 to 8 carbon atoms, and particularly preferably an alkoxy group having 1 to 4 carbon atoms. The alkoxy group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same meaning as the carboxyl group, the sulfo group and the phosphonoxy group represented by W in Formula (III), and preferred ranges thereof are also the same. The alkoxy group having a carboxyl group, a sulfo group or a phosphonoxy group may be substituted with other substituents, and as the substituent, any one of substituents exemplified as the group D of substituents as described below may be applied. An alkylamino group having a carboxyl group, a sulfo group or a phosphonoxy group as a substituent represented by $W_1$ and $W_2$ may be straight-chained or branch-chained, and is preferably an alkylamino group having 1 to 20 carbon atoms, more preferably an alkylamino group having 1 to 8 carbon atoms, and particularly preferably an alkylamino group having 1 to 4 carbon atoms. The alkylamino group having a carboxyl group, a sulfo group or a phosphonoxy group may have at least one of a carboxyl group, a sulfo group or a phosphonoxy group, and the carboxyl group, the sulfo group and the phosphonoxy group have the same meaning as the carboxyl group, the sulfo group and the phosphonoxy group represented by W in Formula (III), and preferred ranges thereof are also the same. The alkylamino group having a carboxyl group, a sulfo group or a phosphonoxy group may be substituted with other substituents, and as the substituent, any one of substituents exemplified as the group D of substituents as described below may be applied.

Each of $W_1$ and $W_2$ is particularly preferably a hydrogen atom or $(CH_2)_n SO_3M$ (n represents 0 or 1). M represents a cation, but when the electric charge within the molecule becomes 0, M may not exist. As the cation represented by M, for example, a protonium ion, an alkali metal ion (a lithium ion, a sodium ion, a potassium ion and the like), an alkaline-earth, metal ion (a barium ion, a calcium ion and the like), an ammonium ion and the like are preferably applied. Among them, a protonium ion, a lithium ion, a sodium ion, a potassium ion and an ammonium ion are particularly preferred.

Subsequently, Formula (III)-b will be described.

$R_6$ have the same meaning as $R^0$ in Formula (III), and preferred ranges thereof are also the same.

$L^2$ preferably represents a linking group (R is a hydrogen atom or a substituent) having 0 to 40 carbon atoms in total, which is composed of an alkylene group having 1 to 12 carbon atoms, an aromatic group having 6 to 12 carbon atoms, —CO—, —NR—, —O—, —S—, —SO—, —$SO_2$—, and a combination thereof, and particularly preferably a linking group having 0 to 20 carbon atoms in total, which is composed of an alkylene group having 1 to 8 carbon atoms, a phenyl group, —CO—, —NR—, —O—, —S—, —$SO_2$—, and a combination thereof. $Ar_1$ preferably represents an aromatic hydrocarbon ring having 6 to 12 carbon atoms, and particularly preferably a benzene ring or a naphthalene ring. A carboxyl group (—COOH) or a salt thereof a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group or a phosphonoxy group as a substituent, represented by $W_3$, has the same meaning as a carboxyl group (—COOH) or a salt thereof, a sulfo group (—$SO_3H$) or a salt thereof, phosphonoxy {—OP(=O)(OH)$_2$} or a salt thereof, or an alkyl group, an alkoxy group or an alkyl amino group having a carboxyl group, a sulfo group or a phosphonoxy group as a substituent, represented by $W_1$ and $W_2$ in formula (III)-a and preferred ranges thereof are also the same.

$W_3$ preferably represents a carboxyl group (—COOH) or a salt thereof, a sulfo group (—$SO_3H$) or a salt thereof, or an alkylamino group having a carboxyl group (—COOH) or a salt thereof or a sulfo group (—$SO_3H$) or a salt thereof as a substituent, and particularly preferably $SO_3M$ or $CO_2M$. M represents a cation, but when the electric charge within the molecule becomes 0, M may not exist. As the cation represented by M, for example, a protonium ion, an alkali metal ion (a lithium ion, a sodium ion, a potassium ion and the like), an alkaline-earth metal ion (a barium ion, a calcium ion and the like), an ammonium ion and the like are preferably applied. Among them, a protonium ion, a lithium ion, a sodium ion, a potassium ion and an ammonium ion are particularly preferred.

In the present specification, examples of the group D of substituents include an alkyl group (an alkyl group having preferably 1 to 20 carbon atoms, more preferably 1 to 12 carbon, atoms, and particularly preferably 1 to 8 carbon atoms, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), an alkenyl group (an alkenyl group having preferably 2 to 20 carbon atoms, more preferably 2 to 12 carbon atoms, and particularly preferably 2 to 8 carbon atoms, and examples thereof include a vinyl group, an allyl group, a 2-butenyl group, a 3-pentenyl group and the like), an alkynyl group (an alkynyl group having preferably 2 to 20 carbon atoms, more preferably 2 to 12 carbon atoms, and particularly preferably 2 to 8 carbon atoms, and examples thereof include a propargyl group, a 3-pentynyl group and the like), an aryl group (an aryl group having preferably 6 to 30 carbon atoms, more preferably 6 to 20 carbon atoms, and particularly preferably 6 to 12 carbon atoms, and examples thereof include a phenyl group, a p-methylphenyl group, a naphthyl group and the like), a substituted or unsubstituted amino group (an amino group having preferably 0 to 20 carbon atoms, more preferably 0 to 10 carbon atoms, and particularly preferably 0 to 6 carbon atoms, and examples thereof include an unsubstituted amino group, a methylamino group, a dimethylamino group, a diethylamino group, a dibenzylamino group and the like).

an alkoxy group (an alkoxy group having preferably 1 to 20 carbon atoms, more preferably 1 to 12 carbon atoms, and particularly preferably 1 to 8 carbon atoms, and examples thereof include a methoxy group, an ethoxy group, a butoxy group and the like), an aryloxy group (an aryloxy group having preferably 6 to 20 carbon atoms, more preferably 6 to 16 carbon atoms, and particularly preferably 6 to 12 carbon atoms, and examples thereof include a phenyloxy group, a 2-naphthyloxy group and the like), an acyl group (an acyl group having preferably 1 to 20 carbon atoms, more preferably 1 to 16 carbon atoms, and particularly preferably 1 to 12 carbon atoms, and examples thereof include an acetyl group, a benzoyl group, a formyl group, a pivaloyl group and the like), an alkoxycarbonyl group (an alkoxycarbonyl group having preferably 2 to 20 carbon atoms, more preferably 2 to 16 carbon atoms, and particularly preferably 2 to 12 carbon atoms, and examples thereof include a methoxycarbonyl group, an ethoxycarbonyl group and the like), an aryloxycarbonyl group (an aryloxycarbonyl group having preferably 7 to 20 carbon atoms, more preferably 7 to 16 carbon atoms, and particularly preferably 7 to 10 carbon atoms, and examples thereof include a phenyloxycarbonyl group and the like), acyloxy group (an acyloxy group having preferably 2 to 20 carbon atoms, more preferably 2 to 16 carbon atoms, and particularly preferably 2 to 10 carbon atoms, and examples thereof include an acetoxy group, a benzoyloxy group and the like).

an acylamino group (an acylamino group having preferably 2 to 20 carbon atoms, more preferably 2 to 16 carbon atoms, and particularly preferably 2 to 10 carbon atoms, and examples thereof include an acetylamino group, a benzoylamino group and the like), an alkoxycarbonylamino group (an alkoxycarbonylamino group having preferably 2 to 20 carbon atoms, more preferably 2 to 16 carbon atoms, and particularly preferably 2 to 12 carbon atoms, and examples thereof include a methoxycarbonylamino group and the like), an aryloxycarbonylamino group (an aryloxycarbonylamino group having preferably 7 to 20 carbon atoms, more preferably 7 to 16 carbon atoms, and particularly preferably 7 to 12 carbon atoms, and examples thereof include a phenyloxycarbonylamino group and the like), a sulfonylamino group (a sulfonylamino group having preferably 1 to 20 carbon atoms, more preferably 1 to 16 carbon atoms, and particularly preferably 1 to 12 carbon atoms, and examples thereof include a methanesulfonylamino group, a benzenesulfonylamino group and the like), a sulfamoyl group (a sulfamoyl group having preferably 0 to 20 carbon atoms, more preferably 0 to 16 carbon atoms, and particularly preferably 0 to 12 carbon atoms, and examples thereof include a sulfamoyl group, a methylsulfamoyl group, a dimethylsulfamoyl group, a phenylsulfamoyl group and the like), a carbamoyl group (a carbamoyl group having preferably 1 to 20 carbon atoms, more preferably 1 to 16 carbon atoms, and particularly preferably 1 to 12 carbon atoms, and examples thereof include an unsubstituted carbamoyl group, a methylcarbamoyl group, a diethylcarbamoyl group, a phenylcarbamoyl group and the like).

an alkylthio group (an alkylthio group having preferably 1 to 20 carbon atoms, more preferably 1 to 16 carbon atoms, and particularly preferably 1 to 12 carbon atoms, and examples thereof include a methylthio group, an ethylthio group and the like), an arylthio group (an arylthio group having preferably 6 to 20 carbon atoms, more preferably 6 to 16 carbon atoms, and particularly preferably 6 to 12 carbon atoms, and examples thereof include a phenylthio group and the like), a sulfonyl group (a sulfonyl group having preferably 1 to 20 carbon atoms, more preferably 1 to 16 carbon atoms, and particularly preferably 1 to 12 carbon atoms, and examples thereof include a mesyl group, a tosyl group and the like), a sulfinyl group (a sulfinyl group having preferably 1 to 20 carbon atoms, more preferably 1 to 16 carbon atoms, and particularly preferably 1 to 12 carbon atoms, and examples thereof include a methanesulfinyl group, a benzenesulfinyl group and the like), a ureido group (a ureido group having preferably 1 to 20 carbon atoms, more preferably 1 to 16 carbon atoms, and particularly preferably 1 to 12 carbon atoms, and examples thereof include an unsubstituted ureido group, a methylureido group, a phenylureido group, and the like), a phosphoric amide group (a phosphoric amide group having preferably 1 to 20 carbon atoms, more preferably 1 to 16 carbon atoms, and particularly preferably 1 to 12 carbon atoms, and examples thereof include a diethylphosphoric amide group, a phenylphosphoric amide group and the like), a hydroxyl group, a mercapto group, a halogen atom (for example, a fluorine atom, a chlorine atom, a bromine atom and an iodine atom), a cyano group, a sulfo group, a carboxyl group, a nitro group, a hydroxamic acid group, a sulfino group, a hydrazine group, an imino group, a heterocyclic group (a heterocyclic group having preferably 1 to 30 carbon atoms and more preferably 1 to 12 carbon atoms, for example, a heterocyclic group having a heteroatom such as a nitrogen atom, an oxygen atom, a sulfur atom and the like, and examples thereof include an imidazoyl group, a pyridyl group, a quinolyl group, a furyl group, a piperidyl group, a morpholino group, a benzoxazolyl group, a benzimidazolyl group, a benzthiazolyl group and the like), and a silyl group (a silyl group having preferably 3 to 40 carbon atoms, more preferably 3 to 30 carbon atoms, and particularly preferably 3 to 24 carbon atoms, and examples thereof include a trimethylsilyl group, a triphenylsilyl group and the like). These substituents may be former substituted with these substituents. In addition, when two or more substituents are possessed, each substituent may be the same as or different from every other substituent. Furthermore, the substituents may be bonded to each other to form a ring, if possible.

Meanwhile, it is also preferred that the fluorine-containing compound of the present invention, has a polymerizable group as a substituent in order to fix the alignment state of the discotic liquid crystalline compound.

Specific examples of the fluorine-containing compound represented by Formula (III), which may be used in the present invention, include the compounds described in Paragraph Nos. [0136] to [0140] of the official gazette of Japanese Patent Application Laid-Open No. 2006-113500, and the like, but the present invention is not limited to these specific examples in any way.

A preferred range of the content of the fluorine-containing compound in the composition varies depending on the use thereof, but when the fluorine-containing compound is used for formation of an optically anisotropic layer, the content is preferably 0.005% by mass to 8% by mass, more preferably 0.01% by mass to 5% by mass, and still more preferably 0.05% by mass to 3% by mass, based on the composition (the composition except for a solvent in the case of a coating solution).

[Polymerizable Initiator]

An aligned (preferably vertically aligned) liquid crystalline compound is fixed while maintaining the alignment state. Fixation is preferably performed by a polymerizing reaction of a polymerizable group (P) which is introduced to the liquid crystalline compound. Examples of the polymerization reaction include a thermopolymerization reaction using a thermopolymerization initiator and a photopolymerization reaction using a photopolymerization initiator. A photopolymerization reaction is preferred. Examples of the photopolymerization initiator include α-carbonyl compounds (described in the specifications of U.S. Pat. Nos. 2,367,661 and 2,367,670), acyloin ethers (described in the specification of U.S. Pat. No. 2,448,828), α-hydrocarbon substituted aromatic acyloin compounds (described in the specification of U.S. Pat. No. 2,732,512), polynuclear quinone compounds (described in the specifications of U.S. Pat. Nos. 3,046,127 and 2,951,758), a combination of triarylimidazole dimer and p-aminophenyl ketone (described in the specification of U.S. Pat. No. 3,549,367), acridine and phenazine compounds (described in the specifications of Japanese Patent Application Laid-open No. Sho 60-105667 and U.S. Pat. No. 4,239,850), and oxadiaxole compounds (described, in the specification of U.S. Pat. No. 4,212,970).

The amount of the photopolymerization initiator used is preferably 0.01 mass % to 20 Mass % and more preferably 0.5 mass % to 5 mass %, based on the solid content in a coating solution. For the light irradiation for polymerization of a discotic liquid crystalline molecule, ultraviolet rays are preferably used. The irradiation energy is preferably 20 mJ/cm$^2$ to 50 J/cm$^2$, and more preferably 100 mJ/cm$^2$ to 800 mJ/cm$^2$. In order to accelerate the Photopolymerization reaction, light irradiation may be performed under a heating condition. The thickness of the phase difference film is preferably 0.1 μm to 10 μm, more preferably 0.5 μm to 5 μm, and most preferably 1 μm to 5 μm.

[Other additives in Optically Anisotropic Layer]

Along with the above-mentioned liquid crystalline compound, a plasticizer, a surfactant, polymerizable monomers, or the like may be used in combination to improve the uniformity of a coating film, the strength of the film, alignment characteristics of a liquid crystalline compound, and the like. For these materials, a material having compatibility with a liquid crystalline compound and not hindering the alignment is preferred.

Examples of the polymerizable monomer include a radical polymerizable or cationic polymerizable compound. The monomer is preferably a polyfunctional radical polymerizable monomer, and is preferably copolymerizable with the above-mentioned polymerizable group-containing liquid crystal compound. Examples thereof include those described in Paragraph Nos. [0018] to [0020] of the specification of the official gazette of Japanese Patent Application laid-Open No. 2002-290423. The amount of the compound added is generally in a range of 1% by mass to 50% by mass, and preferably 5% by mass to 30% by mass, based on the discotic liquid crystalline molecules.

Examples of the surfactant include a compound known in the related art, and a fluorine-based compound is particularly preferred. Specific examples thereof include the compounds described in Paragraph Nos. [0028] to [0056] of the official gazette of Japanese Patent Application Laid-Open No. 2001-330725 and the compounds described in Paragraph Nos. [0069] to [0126] of the official gazette of Japanese Patent Application No. 2003-295212.

A polymer that is used with a liquid crystalline compound is preferably the polymer which may thicken a coating solution. Examples of the polymer include a cellulose ester. Preferred examples of the cellulose ester include the cellulose ester described in Paragraph No. [0178] of the official gazette of Japanese Patent Application Laid-Open No. 2000-155216. In order not to inhibit the alignment of a liquid crystalline compound, the amount of the polymer added is preferably in a range of 0.1% by mass to 1.0% by mass, and more preferably in a range of 0.1% by mass to 8% by mass, based on the liquid crystalline molecules.

The transition temperature of the discotic nematic liquid crystal phase-solid phase of the liquid crystalline compound is preferably 70° C. to 300° C. and more preferably 70° C. to 170° C.

[Coating Solvent]

As a solvent that is used to prepare a coating solution, an organic solvent is preferably used. Examples of the organic solvent include amides (for example, N,N-dimethylformamide), sulfoxides (for example, dimethylsulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone and methyl ethyl ketone), ethers (for example, tetrahydrofuran and 1,2-dimethoxyethane). Alkyl halides and ketones are preferred. The organic solvents may be used in combination of two or more thereof.

[Coating Method]

A coating solution may be coated by a known method (for example, a wire bar coating method, an extrusion coating method, a direct gravure coating method, a reverse gravure coating method and a dye coating method). Among them, when the optically anisotropic layer is formed, a wire bar coating method is preferably used to perform the coating, and the rotation speed of the wire bar preferably satisfies the following equation.

$$0.6<(W\times(R+2r)\times\pi)/V<1.4$$

[W: Rotation speed (rpm) of the wire bar, R; Diameter (m) of the bar core, r: Diameter (m) of the wire, and V: Conveying speed (m/min) of the support]

(W×(R+2r)×π)/V is more preferably in arrange of 0.7 to 1.3, and still more preferably in a range of 0.8 to 1.2.

In forming the optically anisotropic layer, a die coating method is preferably used, and a coating method using a slide coater or a slot die coater is particularly preferred.

[Alignment Film]

In the present invention, it is preferred that the composition is coated on the surface of an alignment film, thereby aligning the molecules of the liquid crystalline compound. The alignment film is preferably used for implementing a preferred aspect of the present invention because the alignment film has a function of regulating the alignment direction, of the liquid crystalline compound. However, the alignment film, is serving the role once the alignment state is fixed after aligning the liquid crystalline compound, and thus is not always essential as a constitutional element of the present invention. That is, it is also possible to manufacture the polarizing plate of the present invention by transferring only the optically anisotropic layer on the alignment film in which the alignment state is fixed onto a polarizing layer or a support.

An alignment film may be formed by means of the rubbing treatment of an organic compound (preferably a polymer), the oblique deposition of an inorganic compound, formation of a layer having microgrooves, or accumulation of organic compounds (for example, ω-tricosanic acid, dioctadecylmethylammonium chloride and methyl stearate) by a Langmuir-Blodgett method (LB film). Further, an alignment film that exhibits an alignment function by giving an electric field, giving a magnetic field or irradiating light, is also known. It is preferred that an alignment film is formed by the rubbing treatment of a polymer.

Examples of the polymer include a methacrylate-based copolymers described, for example, in Paragraph No. [0022]

of the official gazette of Japanese Patent Application Laid-Open No. Hei 8-338913, styrene-based copolymers, polyolefins, polyvinyl alcohols and modified polyvinyl alcohols, poly(N-methylolacrylamides), polyesters, polyimides, vinyl acetate copolymers, carboxymethylcellulose, polycarbonates and the like. A silane coupling agent may be used as a polymer. Water-soluble polymers (for example, poly(N-methylolacrylamides), carboxymethylcellulose, gelatin, polyvinyl alcohols and modified polyvinyl alcohols) are preferred, gelatin, polyvinyl alcohols and modified polyvinyl alcohols are more preferred, and polyvinyl alcohols and modified polyvinyl alcohols are most preferred.

The saponification degree of a polyvinyl alcohol is preferably 70% to 100%, and more preferably 80% to 100%. The polymerization degree of a polyvinyl alcohol is preferably 100 to 5,000.

In the alignment film, it is preferred that the side chain having a crosslinkable functional group (for example, a double bond) is bonded to the main chain or a crosslinkable functional group having a function of aligning the liquid crystalline molecules is introduced into the side chain. For the polymer used in the alignment film, a polymer which is capable of crosslinking by itself or which is crosslinked by a crosslinking agent may be used, and a plurality of combinations thereof may be used.

When the side chain having a crosslinkable functional group is bonded to the main chain of the polymer for an alignment film, or when a crosslinkable functional group is introduced into the side chain having a function of aligning the liquid crystalline molecules, the polymer for an alignment film may be copolymerized with a polyfunctional monomer contained in the optically anisotropic layer. As a result, a polyfunctional monomer and a polyfunctional monomer, a polymer for the alignment film and a polymer for the alignment film, and a polyfunctional monomer and a polymer for the alignment film are strongly bonded to each other by a covalent bond. Therefore, the strength of an optical compensation sheet may be significantly improved by introducing a crosslinkable functional group into the polymer for an alignment film.

It is preferred that the crosslinkable functional group in a polymer for an alignment film includes a polymerizable group like the polyfunctional monomer. Specific examples thereof include those as described in Paragraph Nos. [0080] to [0100] of the specification of the official gazette of Japanese Patent Application Laid-Open No. 2000-155216, and the like.

The polymer for an alignment film may be crosslinked by using a crosslinking agent apart from the above-mentioned crosslinkable functional group. Examples of the crosslinking agent include aldehyde, an N-methylol compound, a dioxane derivative, a compound acting by activating a carboxyl group, an activated vinyl compound, an activated halogen compound, isooxazole and dialdehyde starch. The crosslinking agents may be used in combination of two or more thereof. Specific examples thereof include the compounds described in Paragraph Nos. [0023] and [0024] of the specification of the official gazette of Japanese Patent Application Paid-Open No. 2002-62420, and the like. High reactive aldehydes are preferred, and glutaraldehyde is particularly preferred.

The amount of the crosslinking agent added is preferably 0.1% by mass to 20% by mass and more preferably 0.5% by mass to 15% by mass, based on a polymer. The amount of the unreacted crosslinking agent, remaining in the alignment film is preferably 1.0% by mass or less, and more preferably 0.5% by mass or less. Through the control in this manner, sufficient durability without generating reticulation may be obtained, even though the alignment film is used for a long time in the liquid crystal display device or the alignment film is left to stand under a high temperature and high humidity atmosphere for a long period of time.

An alignment film can be basically formed by coating a solution including the polymer, which is an alignment film forming material, a crosslinking agent and an additive onto a transparent support, and then heat drying (crosslinking) the coated transparent support and subjecting the support to rubbing treatment. The crosslinking reaction may be performed at an arbitrary time after coating a solution onto a transparent support as described above. When a water-soluble polymer such as polyvinyl alcohol is used as an alignment film forming material, it is preferred that a coating solution is prepared in a mixed solvent of water and an organic solvent (for example, methanol) having a defoaming action. The ratio in the mass ratio of water:methanol is preferably 0:100 to 99:1, and more preferably 0:100 to 91:9. Accordingly, foam generation is inhibited, and defects on the alignment film, and furthermore, detects on the surface of the optically anisotropic layer are significantly reduced.

A coating method used for forming an alignment film is preferably a spin coating method, a dip coating method, a curtain coating method, an extrusion coating method, a rod coating method, or a roll coating method. A rod coating method is particularly preferred. Further, the film thickness after drying is preferably 0.1 µm to 10 µm. Heat drying may be performed at 20° C. to 110° C. In order to form a sufficient crosslinking, the heat drying is performed preferably at 60° C. to 100° C., and particularly preferably at 80° C. to 100° C. The drying time may be 1 minute to 36 hours, and preferably 1 minute to 30 minutes. It is also preferred that the pH is set at a value which is optimal for the crosslinking agent used, and when glutaraldehyde is used, the pH is preferably 4.5 to 5.5.

The alignment film is preferably formed on a transparent support. The alignment film may be obtained by crosslinking the polymer layer and then subjecting the surface to rubbing treatment, as described above.

As the rubbing treatment, a treatment method may be applied, which is widely adopted as a process for treating the alignment for liquid crystal of LCD. That is, it is possible to use a method of obtaining the alignment by rubbing the surface of the alignment film using paper or gauze, felt, rubber or nylon, polyester fibers, or the like in a certain direction. In general, the method is carried out by performing rubbing a number of times using a cloth which has averagely transplanted fibers having a uniform length and thickness, or the like.

The composition is coated on the rubbing-treated surface of the alignment film to align the molecules of the liquid crystalline compound. Thereafter, if necessary, the polymer for an alignment film may be reacted with a polyfunctional monomer contained in an optically anisotropic layer, or the polymer for an alignment film may be crosslinked using a crosslinking agent, thereby forming the optically anisotropic layer.

The thickness of the alignment film is preferably in a range of 0.1 µm to 10 µm.

[Transparent Support]

The λ/4 plate (optical film) in the present invention may include a support that is formed from a polymer film supporting an optically anisotropic layer that is formed of a composition containing a discotic liquid crystalline compound. A polymer film with a low optical anisotropy may be used, and a polymer film in which an optical anisotropy is developed by a stretching processing. It is preferable that the support has an optical transmittance of not less than 80%.

The in-plane retardation of the support (Re) at the wavelength of 550 nm is preferably 0 nm to 50 nm, more preferably 0 nm to 30 nm, and most preferably 0 nm to 20 nm from the viewpoint of maintaining an on-axis circular polarization property. In addition, the retardation in the thickness-direction of the support at the wavelength of 550 nm is preferably −300 nm to 300 nm, more preferably −100 nm to 200 nm, and most preferably 0 nm to 130 nm in view of also maintaining the circular polarization property in an inclined direction. The optical anisotropy of the support is preferably selected by a combination with an optically anisotropic layer provided thereon, and the Nx value of the optical film may be controlled by the combination.

Examples of the polymer include cellulose acylate films (for example, a cellulose triacetate film (refractive index 1.48), a cellulose diacetate film, a cellulose acetate butyrate film, and a cellulose acetate propionate film), polyethylene terephthalate films, polyethersulfone films, polyacrylic resin films, polyurethane-based resin films, polyester films, polycarbonate films, polysulfone films, polyether films, polymethylpentene films, polyether ketone films, (meth)acrylnitrile films, polyolefins, polymers having an alicyclic structure (norbornene-based resins (ARTON: trade name, manufactured by JSR Corporation, and amorphous polyolefins (ZEONEX: trade name, manufactured by Zeon Corporation)), and the like. Among them, triacetylcellulose, polyethylene terephthalate and polymers having an alicyclic structure are preferred, and triacetylcellulose is particularly preferred.

The polymer film is preferably formed by a solvent casting method. The thickness of a transparent support is usually approximately 25 μm to 1000 μm, preferably 25 μm to 250 μm, and more preferably 30 μm to 90 μm. In order to improve the adhesiveness between a transparent support and a layer formed thereon (an adhesive layer, a vertical alignment film or a phase difference film), a surface treatment (for example, a glow discharge treatment, a corona discharge treatment, an ultraviolet (UV) treatment, and a flame treatment) may be performed on the transparent support. On the transparent support, an adhesive layer (undercoat layer) may be formed. In addition, in order to impart slidability in the conveying process or to prevent adhesion of the surface with the reverse surface after winding, it is preferred to use a transparent support or a long transparent support, which is formed by coating or co-casting with the support of, on one side of the support, a polymer layer in which inorganic particles having an average particle diameter of approximately 10 nm to 100 nm are mixed at a weight ratio of the solid content of 5% to 40%.

Meanwhile, an optical film having a laminate structure in which an optically anisotropic layer is formed on a support has been described above, but the present invention is not limited to this aspect, and the optically anisotropic layer may be, of course, composed of only a stretched polymer film, or composed of only a liquid crystal film formed of a composition containing a liquid crystalline compound. Preferred examples of the stretched polymer film are the same as the preferred examples of the support that the optical film has. Furthermore, preferred examples of the liquid crystal film are also the same as the preferred examples of the optically anisotropic layer included in the optical film.

It is preferred that the optical film is manufactured continuously in a long state. Further, it is preferred that the slow axis is in a direction which is neither parallel nor orthogonal to the longitudinal direction. That is, an angle formed by the slow axis of at least one optically anisotropic layer included in the optical film and the long side of the film is preferably 5° to 85°. When the optically anisotropic layer is formed of the liquid crystalline compound, the angle of the slow axis of the optically anisotropic layer may be adjusted by the angle of rubbing. When the optically anisotropic layer is formed of a stretch-treated polymer film, the angle of the slow axis may be adjusted according to the stretch direction. By setting the angle of the slow axis of the optically anisotropic layer at an angle which is neither parallel nor orthogonal to the longitudinal direction of the long film, in the manufacture of a discotic polarizing plate or an elliptically polarizing plate as described below, it is possible to adhere the polarizing plate with a long polarizing film by roll-to-roll, thereby making it possible to manufacture a discotic polarizing plate or an elliptically polarizing plate with high precision of the axis angle in adhesion and with high productivity.

(Layer Configuration of Optical Film)

In the optical film of the present invention, a required single or a plurality of functional layers may be formed according to the purpose. Examples of a preferred aspect include an aspect in which a hardcoat layer is stacked on an optically anisotropic layer, an aspect in which an antireflection layer is stacked on an optically anisotropic layer, an aspect in which a hardcoat layer is stacked on an optically anisotropic layer and an antireflection layer is further stacked thereon, and the like. The antireflection layer is a layer composed of at least one layer, which is designed in consideration of the refractive index, the film thickness, the Number of layers, the order of the layers and the like so as to reduce the reflectance by optical interference.

The simplest configuration of the antireflection layer is a configuration in which only a low refractive index layer is coated and formed on the outermost surface of the film. In order to further reduce the reflectance, a configuration in which a high refractive index layer having a high refractive index and a low refractive index layer having a low refractive index are combined to form an antireflection layer is preferred. Configuration examples include a bilayer configuration with a high refractive index layer/a low refractive index layer, stacked sequentially from the lower side, a configuration with three layers having different refractive indices, that is, a constitution in which a medium refractive index layer (a layer having a refractive index that is higher than that of the lower layer and lower than that of the high refractive index layer)/a high refractive index layer/a low refractive index layer are stacked in this order, and the like, and a configuration in which more antireflection layers are stacked is also proposed. Among them, due to durability, optical characteristics, cost, productivity and the like, a configuration with a medium refractive index layer/a high refractive index layer/a low refractive index layer, stacked in this order on the hardcoat layer, is preferred, and examples thereof include the configurations described in the official gazette of Japanese Patent Application Laid-Open Nos. H8-122504, H8-110401, H10-300902, 2002-243906, 2000-111706, and the like. Further, other functions may be imparted to each layer, and examples thereof include a configuration in which an antifouling low-refractive index layer, an antistatic high refractive index layer and an antistatic hardcoat layer are stacked (for example, the official gazette of Japanese Patent Application Laid-Open Nos. H10-206603, 2002-243906 and the like), and the like.

Specific examples of the layer configuration of the optical film of the present invention having a hardcoat layer or an antireflection layer will be shown below.

A transparent support/an alignment film/an optically anisotropic layer/a hardcoat layer A transparent support/an alignment film/an optically anisotropic layer/a low refractive index layer A transparent support/an alignment film/an optically anisotropic layer/an antiglare layer/a low refractive index layer A transparent support/an alignment film/an optically anisotropic layer/a hardcoat layer/a low refractive index layer A transparent support/an alignment film/an optically anisotropic layer/a hardcoat layer/an antiglare layer/a low refractive index layer A transparent support/an alignment film/an optically anisotropic layer/a hardcoat layer/a high refractive index layer/a low refractive index layer A transparent support/an alignment film/an optically anisotropic layer/a hardcoat layer/a medium refractive index layer/a high refractive index layer/a low refractive index layer A transparent support/an alignment film/an optically anisotropic layer/a hardcoat layer/an antiglare layer/a high refractive index layer/a low refractive index layer A transparent support/an alignment film/an optically anisotropic layer/a hardcoat layer/an antiglare layer/a medium refractive index layer/a high refractive index layer/a low refractive index layer A transparent support/an alignment film/an optically anisotropic layer/an antiglare layer/a high refractive index layer/a low refractive index layer A transparent support/an alignment film/an optically anisotropic layer/an antiglare layer/a medium refractive index layer/a high refractive index layer/a low refractive index layer In each of the above-mentioned configurations, a configuration in which functional layers such as a hardcoat layer, an antiglare layer, an antireflection layer and the like are directly formed on an optically anisotropic layer is preferred. In addition, an optical film having layers of a hardcoat layer, an antiglare layer, an antireflection layer and the like formed on a support apart from an optical film including the optically anisotropic layer may be stacked for manufacture.

Although FIG. 1 illustrates five examples of optical films in the present invention, the present invention is not limited thereto.

As one of the preferred aspects of the optical film, of the present invention, the optical film has an antireflection layer in which a medium refractive index layer, a high refractive index layer and a low refractive index layer are sequentially stacked from an optically anisotropic layer side. It is preferred that the refractive index of the medium refractive index layer is 1.00 to 1.65 at a wavelength of 550 nm, the thickness of the medium refractive index layer is 50.0 nm to 70.0 nm, the refractive index of the high refractive index layer is 1.70 to 1.74 at a wavelength of 550 nm, the thickness of the high refractive index layer is 90.0 nm to 115.0 nm, the refractive index of the low refractive index layer is 1.33 to 1.38 at a wavelength of 550 nm, and the thickness of the low refractive index layer is 85.0 nm to 95.0 nm.

Among the configurations, configuration (1) or configuration (2) shown below is particularly preferred.

Configuration (1): an antireflection film which is a low refractive index layer, in which the refractive index of the medium refractive index layer is 1.60 to 1.64 at a wavelength of 550 nm, the thickness of the medium refractive index layer is 55.0 nm to 65.0 nm, the refractive index of the high refractive index layer is 1.70 to 1.74 at a wavelength of 550 nm, the thickness of the high refractive index layer is 105.0 nm to 115.0 nm, the refractive index of the low refractive index layer is 1.33 to 1.38 at a wavelength of 550 nm, and the thickness of the low refractive index layer is 85.0 nm to 95.0 nm.

Configuration (2): an antireflection film, in which the refractive index of the medium refractive index layer is 1.60 to 1.65 at a wavelength of 550 nm, the thickness of the medium refractive index layer is 55.0 nm to 65.0 nm, the refractive index of the high refractive index layer is 1.70 to 1.74 at a wavelength of 550 nm, the thickness of the high refractive index layer is 90.0 nm to 100.0 nm, the refractive index of the low refractive index layer is 1.33 to 1.38 at a wavelength of 550 nm, and the thickness of the low refractive index layer is 85.0 nm to 95.0 nm.

The variation in reflected color may be decreased to a smaller value by adjusting the refractive index and thickness of each layer within the ranges. Configuration (1) is a configuration in which the reflectance may be adjusted to a particularly small value while suppressing the variation in reflected color at a low level, and is particularly preferred. Furthermore, Configuration (2) is a configuration in which the variation in reflectance is suppressed at a level lower than Configuration (1), and is particularly preferred because the robustness against the variation in film thickness is excellent.

Moreover, in the present invention, it is preferred that with respect to a design wavelength λ (=550 nm; representative of a wavelength region in which the visibility is the highest), the medium refractive index layer, the high refractive index layer and the low refractive index layer satisfy the following Equations (I), (II) and (III), respectively.

$$\lambda/4 \times 0.68 < n_1 d_1 < \lambda/4 \times 0.74 \quad \text{Equation (I)}$$

$$\lambda/2 \times 0.66 < n_2 d_2 < \lambda/2 \times 0.72 \quad \text{Equation (II)}$$

$$\lambda/4 \times 0.84 < n_3 d_3 < \lambda/4 \times 0.92 \quad \text{Equation (III)}$$

(However, in the equations, $n_1$ is the refractive index of the medium refractive index layer, $d_1$ is the layer thickness (nm) of the medium refractive index layer, $n_2$ is the refractive index of the high refractive index layer, $d_2$ is the layer thickness (nm) of the high refractive index layer, $n_3$ is the refractive index of the low refractive index layer, $d_3$ is the layer thickness (nm) of the low refractive index layer, and $n_3 < n_1 < n_2$)

In the case of satisfying Equations (I), (II) and (III), the reflectance is decreased and the change in reflected color may be suppressed, and thus the configuration is preferred. Further, accordingly, when oil components such as fingerprints, sebum or the like are adhered, the change in tint is small, making it difficult to recognize if a smear occurs, and thus the configuration is preferred.

When the tint of regularly reflected light for the light with 5° incident angle from a CIE standard light source D65 in a wavelength region of 380 to 780 nm is represented by a* and b* values in the CIE1976L*a*b* color space, by setting the a* and b* values within the ranges of 0≤a*≤8 and −10≤b*≤10, respectively and furthermore setting a color difference ΔE when the layer thickness of any layer in each layer changes by 2.5% within, the above-mentioned range of the variation of tint to the range of the following Equation (5), the neutrality of the reflected color for each product is good, there is no difference in the reflected color, and the smear becomes inconspicuous when oil components such as fingerprints, sebum or the like are adhered on the surface, and thus the configuration is preferred. By combining a low refractive index layer containing a fluorine-containing antifouling agent having a polymerizable unsaturated group and a fluorine-containing polyfunctional acrylate with the layer configuration and using the combination, even in a multilayer interference film configuration, it is difficult for felt pen mark or oil components such as fingerprints, sebum or the like to be attached, easy for the felt pen mark or the oil components to be wiped off even though attached, and possible for the felt pen mark or the oil components to become inconspicuous.

$$\Delta E=\{(L^{*}-L^{*\prime})^2+(a^{*}-a^{*\prime})^2+(b^{*}-b^{*\prime})^2\}^{1/2} \leq 3 \quad \text{Equation (5)}$$

(L*', a*' and b*' are the tints of reflected light in a design film thickness)

In addition, in the case of installation on the surface of an image display device, the glare may be significantly reduced by setting the average value of the specular reflectance to 0.5% or less, and thus the configuration is preferred.

As for the measurement of specular reflectance and tint, the antireflection property may be evaluated by mounting an adapter "ARV-474" on a spectrophotometer "V-550" (manufactured by JASCO Corporation), measuring the specular reflectance for the outgoing angle of −θ at an incident angle of θ (θ=5 to 45°, interval of 5°) in the wavelength region 380 nm to 780 nm, and calculating an average reflectance at 450 nm to 650 nm. Further, the tint of reflected light may be evaluated by calculating, from the reflection spectrum measured, the L*, a* and b* values of the CIE1976 L*a*b* color space, which are values showing the tint of regularly reflected light for incident light at each incident angle of a CIE standard light source D65.

The refractive index of each layer may be measured using Multi-Wavelength Abbe Refractometer DR-M2 (manufactured by ATAGO Co., Ltd.) by coating the coating solution for each layer onto a glass plate to a thickness of 3 μm to 5 μm. In the present specification, a refractive index measured using a filter "Interference Filter 546(e) nm for DR-M2 and M4, Paris No.: RE-3523", is adopted as the refractive index at a wavelength of 550 nm. The film thickness of each layer may be measured by observing the cross-section by means of a reflection spectroscopy film thickness meter "FE-3000" (manufactured by Otsuka Electronics Co., Ltd.) using light interference or a TEM (transmission electron microscope). The refractive index may be measured simultaneously with the film thickness even by the reflection spectroscopy film thickness meter, but in order to increase the measurement precision of film thickness, a refractive index of each layer measured by another means is preferably used. When the refractive index of each layer may not be measured, the measurement of film thickness by TEM is preferred. In this case, it is preferred that the film thickness is measured at 10 or more portions and the average value of the values obtained is used.

It is preferred that a form of the optical film of the present invention at the time of manufacture takes a form of winding the film into a roll shape. In this case, in order to obtain the neutrality of tint of the reflected color, the layer thickness distribution value calculated by the following Equation (6) in which the average d (average value), minimum d (minimum value) and maximum d (maximum value) of the layer thickness in a range of an arbitrary 1,000 m in length are used as the parameters is preferably 5% or less, more preferably 4% or less, still more preferably 3% or less, still more preferably 2.5% or less, and particularly preferably 2% or less, with respect to each layer of thin film layers.

$$(\text{maximum } d - \text{minimum } d) \times 100/\text{average } d \quad \text{Equation (6)}$$

(Hardcoat Layer)

In the optical film of the present invention, a hardcoat layer may be formed in order to impart physical strength to the film. In the present invention, the hardcoat layer may not be formed, but forming a hardcoat layer is preferred in that the scratch resistance surface becomes strong in a pencil scratch test or the like.

A low refractive index layer is preferably formed on the hardcoat layer, and a medium refractive index layer and a high refractive index layer are more preferably formed between the hardcoat layer and a low refractive index layer to constitute the antireflection film.

The hardcoat layer may be composed of lamination of two or more layers.

The refractive index of the hardcoat layer in the present invention is in a range of preferably 1.48 to 2.00, and more preferably 1.48 to 1.70, due to an optical design to obtain an antireflection film. In the present invention, at least one layer of the low refractive index layer is present on the hardcoat layer, and thus when the refractive index is much smaller than the range, the antireflection property is reduced, and when the refractive index is much larger than the range, the tint of the reflected light tends to become strong.

The film thickness of the hardcoat layer is usually about 0.5 μm to 50 μm, preferably 1 μm to 20 μm and more preferably 5 μm to 20 μm, from the viewpoints of imparting sufficient durability and impact resistance to the film.

The strength of the hardcoat layer is preferably H or more, more preferably 2H or more and most preferably 3H or more by a pencil hardness test. Further, it is preferred that the amount of abrasion of a test specimen before and after the test in the Taber test in accordance with JIS K5400 is as small as possible.

The hardcoat layer is preferably formed by a crosslinking reaction or a polymerization reaction of an ionized radiation curable compound. The hardcoat layer may be formed, for example, by coating a coating composition including ionized radiation curable polyfunctional monomers or polyfunctional oligomers on a transparent support, and subjecting the polyfunctional monomers or the polyfunctional oligomers to a crosslinking reaction or a polymerisation reaction. The functional group of the ionized radiation curable polyfunctional monomers or the polyfunctional oligomers is preferably photo-, electron beam-, or radiation-polymerizable, and among these, a photopolymerizable functional group is preferred. Examples of the photopolymerizable functional group include an unsaturated polymerizable functional group such as a (meth)acryloyl group, a vinyl group, a styryl group, an allyl and the like, and among them, a (meth)acryloyl group is preferred. Specifically, compounds exemplified in the (polyfunctional monomer having a polymerizable unsaturated group) may be preferably used.

The hardcoat layer may contain matte particles having an average particle diameter of 1.0 μm to 10.0 μm, and preferably 1.5 μm to 7.0 μm, for example, particles of inorganic compounds or resin particles, for the purpose of imparting an internal scattering property.

Various refractive index monomers or inorganic particles, or both of them may be added to the binder of the hardcoat layer for the purpose of controlling the refractive index of the hardcoat layer. The inorganic particles have, in addition to an effect of controlling the refractive index, an effect of suppressing curing shrinkage caused by a crosslinking reaction. In the present invention, after formation of the hardcoat layer, a polymer produced by polymerizing the polyfunctional monomers and/or the high refractive index monomers and the like, and inorganic particles dispersed therein are collectively referred to as a binder.

(Antiglare Layer)

The antiglare layer is formed for the purpose of imparting, to the film, a hard coating property for improving the antiglare property caused by surface scattering, and preferably the hardness and the scratch resistance of the film.

The antiglare layer is described in Paragraphs Nos. [0178] to [0189] of the official gazette of Japanese Patent Application Laid-Open. No. 2009-98658, and the same applies to the present invention.

[High Refractive Index Layer and Medium Refractive Index Layer]

The refractive index of the high refractive index layer is preferably 1.70 to 1.74, and more preferably 1.71 to 1.73. The refractive index of the medium refractive index is adjusted so as to be a value between the refractive index of the low refractive index layer and the refractive index of the high refractive index layer. The refractive index of the medium refractive index layer is preferably 1.60 to 1.64, and more preferably 1.61 to 1.63.

As for a method for forming the high refractive index layer or the medium refractive index layer, it is possible to use a transparent thin film of inorganic oxide formed by a chemical vapor deposition (CVD) method or a physical vapor deposition (PVD) method, particularly, a vacuum deposition method or a sputtering method, which is a kind of the physical vapor deposition method, but a method using all-wet coating is preferred.

The medium refractive index layer may be adjusted in the same manner using the same materials as the high refractive index layer, except that the refractive index is different from that of the high refractive index layer, and thus the high refractive index layer will be particularly described below.

The high refractive index layer is preferably formed by coating a coating composition containing inorganic fine particles, a curable compound having a trifunctional or higher polymerizable group (hereinafter also referred to as a "binder" in some cases), a solvent, and a polymerization initiator, drying the solvent, and then curing the coating by using either one of heating and irradiation of ionised radiation or both in combination thereof. When the curable compound or the initiator is used, the curable compound may be cured by a polymerization reaction by means of heat and/or ionized radiation after coating, thereby forming a medium refractive index layer or high refractive index layer having excellent scratch resistance and adhesion property.

(Inorganic Fine Particles)

The inorganic fine particles are preferably inorganic fine particles containing an oxide of metal, and more preferably inorganic fine particles containing an oxide of at least one metal selected from Ti, Zr, In, Zn, Sn, Al and Sb. Furthermore, in order to assist the antistatic property developed by a conductive polymer compound introduced into a layer (A), at least one of the medium refractive index layer and the high refractive index layer may contain conductive inorganic fine particles.

As the inorganic fine particles, fine particles of zirconium oxide are preferred from the viewpoint of a refractive index. Further, it is preferred that inorganic fine particles having an oxide of at least one metal of Sb, In and Sn as a main component are used from the viewpoint of conductivity. The conductive inorganic fine particles are more preferably at least one metal oxide selected from, the group consisting of tin-doped indium oxide (ITO), antimony-doped tin oxide (ATO), fluorine-doped tin oxide (FTO), phosphorus-doped tin oxide (PTO), Zinc antimonate (AZO), indium-doped zinc oxide (IZO), zinc oxide, ruthenium oxide, rhenium oxide, silver oxide, nickel oxide, and copper oxide.

By varying the amount of the inorganic fine particles, the refractive index may be adjusted to a predetermined refractive index. When zirconium oxide is used as a main component, the average particle diameter of the inorganic fine particles in the layer is preferably 1 nm to 120 nm, more preferably 1 nm to 60 nm, and still mote preferably 2 nm to 40 nm. The range is preferred because the haze is suppressed and dispersion stability and adhesion to the upper layer due to appropriate unevenness on the surface are improved.

The refractive index of the inorganic fine particles having zirconium oxide as a main component is preferably 1.90 to 2.80, more preferably 2.00 to 2.40, and most preferably 2.00 to 2.20.

The amount of the inorganic line particles added may vary depending on the layer added, and in the medium refractive index layer, the amount added is preferably 20% by mass to 60% by mass, more preferably 25% by mass to 55% by mass, and still more preferably 30% by mass to 50% by mass, based on the solid content of the entire medium refractive index layer. In the high refractive index layer, the added amount is preferably 40% by mass to 90% by mass, more preferably 50% by mass to 85% by mass, and still more preferably 60% by mass to 80% by mass, based on the solid content of the entire high refractive index layer.

The particle diameter of the inorganic fine particles may be measured by a light-scattering method or an electron microscope photograph. The specific surface area of the inorganic fine particles is preferably 10 $m^2/g$ to 400 $m^2/g$, more preferably 20 $m^2/g$ to 200 $m^2/g$, and most preferably 30 $m^2/g$ to 150 $m^2/g$.

The inorganic fine panicles may be subjected to a physical surface treatment such as plasma discharge treatment or corona discharge treatment or a chemical surface treatment with a surfactant or a coupling agent in order to achieve dispersion stabilization in a dispersion liquid or a coating solution or enhance affinity for or binding properties to a binder component. The use of the coupling agent is particularly preferred. As the coupling agent, an alkoxymetal compound (for example, a titanium coupling agent or a silane coupling agent) is preferably used. Among them, treatment with a silane coupling agent having an acryloyl group or a methacryloyl group is particularly effective. The chemical surface treatment agents of inorganic fine particles, the solvents, the catalysts and the stabilizers of dispersed products are described in [0058] to [0083] of the official gazette of Japanese Patent Application Paid-Open No. 2000-17870.

The inorganic fine particles may be dispersed by using a disperser. Examples of the disperser include a sand grinder mill (for example, bead mill with a pin), a high-speed impeller mill, a pebble mill, a roller mill, an attritor and a colloid mill. A sand grinder mill and a high-speed impeller mill are particularly preferred. In addition, a preliminary dispersion treatment may be performed. Examples of the disperser used in the preliminary dispersion treatment include a ball mill, a three-line roll mill, a kneader and an extruder.

The inorganic fine particles are preferably dispersed in a dispersion medium to have a particle size as refined as possible, and the mass average diameter is 10 nm to 120 nm. The mass average diameter is preferably 20 nm to 100 nm, more preferably 30 nm to 90 nm, and particularly preferably 30 nm to 80 nm. By refining the inorganic fine particles to 200 nm or less, the high refractive index layer and the medium refractive, index layer may be formed without impairing transparency.

(Curable Compound)

The curable compound is preferably a polymerizable compound, and as the polymerizable compound, an ionized radiation curable polyfunctional monomer or a polyfunctional oligomer is preferably used. The functional group in these compounds is preferably photo-, electron beam-, or radiation-polymerizable, and among them, a photopolymerizable functional group is preferred. Examples of the photopolymerizable functional group include an unsaturated polymerizable functional group such as a (meth)acryloyl group, a vinyl group, a styryl group, an allyl and the like, and among them, a (meth)acryloyl group is preferred.

As specific examples the photopolymerizable polyfunctional monomer having a photopolymerizable functional group, the compounds described in the (polyfunctional monomer having a polymerizable unsaturated group) may be suitably used.

In the high refractive index layer, a surfactant, an antistatic agent, a coupling agent, a thickener, a coloration inhibitor, a colorant (a pigment or a dye), a defoaming agent, a leveling agent, a flame retardant, an ultraviolet absorbent, an infrared absorbent, an adhesion-imparting agent, a polymerization, inhibitor, an antioxidant, a surface modifier, a conductive metal line particle and the like may be added, in addition to the above-mentioned components (inorganic fine particles, a curable compound, a polymerization initiator, a photosensitive and the like).

It is preferred that the high refractive index layer and the medium refractive index layer used in the present invention are formed by adding a curable compound (for example, the above-described ionized radiation curable polyfunctional monomer, the polyfunctional oligomer or the like) which is a binder precursor further necessary to form a matrix, a photopolymerization initiator and the like to a dispersion liquid prepared by dispersing inorganic fine particles in a dispersion medium as described above to prepare a coating composition for forming a high refractive index layer and a medium refractive index layer, coating the coating composition for forming a high refractive index layer and a medium refractive index layer on a transparent support, and curing the coating composition, by a crosslinking reaction or a polymerization reaction of the curable compound.

Further, it is preferred that the binder of the high refractive index layer and the medium refractive index layer is subjected to crosslinking reaction or polymerization reaction with a dispersing agent simultaneously with coating of the layer or after coating. The binder of the high refractive index layer and the medium refractive index layer thus-manufactured takes a form, for example, in which the anionic groups of the dispersing agent are introduced into the binder as a result of crosslinking or polymerization reaction between the above-described preferred dispersing agent and the ionized radiation curable polyfunctional monomer or polyfunctional oligomer. Further, the anionic groups introduced into the binder of the high refractive index layer and the medium refractive index layer have a function of maintaining the dispersed state of the inorganic fine particles, and the crosslinked or polymerized structure imparts a film-forming ability to the binder, thereby improving the physical strength, chemical resistance and weather resistance of the high refractive index layer and the medium refractive index layer containing the inorganic fine particles.

In the formation of the high refractive index layer, the crosslinking reaction or polymerization reaction of the curable compound is preferably performed in an atmosphere having an oxygen concentration of 10% by volume or less. By forming the high refractive index layer in an atmosphere having an oxygen concentration of 1.0% by volume or less, it is possible to improve the physical strength, chemical resistance, and weather resistance of the high refractive index layer and furthermore adhesion between the high refractive index layer and a layer adjacent to the high refractive index layer. The layer through a crosslinking reaction or polymerization reaction of the curable resin is formed in an atmosphere having an oxygen concentration of preferably 6% by volume or less, more preferably 4% by volume or less, particularly preferably 2% by volume or less, and most preferably 1% by volume or less.

As described above, the medium refractive index layer may be obtained by using the same materials and in the same manner as those of the high refractive index layer.

Specifically, for example, a main composition is determined by selecting the kind of fine particle and the kind of resin and determining the blending ratio therebetween such that the medium refractive index layer and the high refractive index layer may satisfy the film thickness and refractive index of Formulas (I) and (II).

In the coating composition for forming all the layers, a solvent may be used in the same manner as in the composition for a low refractive index layer.

[Low Refractive Index Layer]

The refractive index of the low refractive index layer in the present invention is preferably 1.30 to 1.47. The refractive index of the low refractive index layer in the case of the antireflection film of a multi-layer thin film interference type (medium refractive index layer/high refractive index layer/low refractive index layer) is preferably 1.33 to 138, and more preferably 1.35 to 1.37. The range is preferred because the film strength may be maintained by suppressing the reflectance. Even for a method of forming the low refractive index layer, it is possible to use a transparent thin film of inorganic oxide formed by a chemical vapor deposition (CVD) method or a physical vapor deposition (PVD) method, particularly, a vacuum deposition method or a sputtering method, which is a kind of the physical vapor deposition method, but a method by all-wet coating using a composition for a low refractive index layer is preferably used.

The haze of the low refractive index layer is preferably 3% or less, more preferably 2% or less and most preferably 1% or less.

The strength of the antireflection film, of which even the low refractive index layer is formed, is preferably H or more, more preferably 2H or more, and most preferably 3H or more in a pencil hardness test under a load of 500 g.

In addition, in order to improve the antifouling performance of the antireflective film, the contact angle of the surface with water is preferably 90° or more. The contact angle is more preferably 102° or more, in particular, when the contact angle is 105° or more, the anti-fouling performance against fingerprints is significantly improved, which is thus particularly preferred. Furthermore, the contact angle with water is 102° or more, and the surface free energy is more preferably 25 dynes/cm or less, particularly preferably 23 dynes/cm or less, and still more preferably 20 dynes/cm or less. Most preferably, the contact angle with water is 105° or more and the surface free energy is 20 dynes/cm or less.

(Formation of Low Refractive Index Layer)

The low refractive index layer is preferably formed by coating a coating composition having dissolved or dispersed therein a fluorine-containing antifouling agent having a polymerizable unsaturated group, a fluorine-containing copolymer having a polymerizable unsaturated group, inorganic fine particles, and other arbitrary components contained if desired, simultaneously with the coating or after the coating and drying, curing the coating by a crosslinking reaction or polymerization reaction by the irradiation of ionized radiation (examples thereof include irradiation of light, irradiation of an electron beam, and the like) or heating.

In particular, when the low refractive index layer is formed by the crosslinking reaction or polymerisation reaction of an ionized radiation curable compound, the crosslinking reaction or polymerization reaction is preferably performed in an atmosphere having an oxygen concentration of 10% by volume or less. By forming the low refractive index layer in an atmosphere having an oxygen concentration of 1% by volume or less, an outermost layer having excellent physical strength and chemical resistance may be obtained.

The oxygen concentration is preferably 0.5% by volume or less, more preferably 0.1% by volume or less, particularly preferably 0.05% by volume or less, and most preferably 0.02% by volume or less.

As a means of adjusting the oxygen concentration to 1% by volume or less, replacement of the air (nitrogen concentration is about 79% by volume, oxygen concentration is about 21% by volume) with other gases is preferred, and replacement with nitrogen (purging by nitrogen) is particularly preferred.

(Ultraviolet Absorbent)

As the ultraviolet absorbent, any known ultraviolet absorbent which may express an ultraviolet absorbing property may be used. Among the ultraviolet absorbents, a benzotriazole-based or hydroxyphenyltriazine-based ultraviolet absorbent is preferred, in order to obtain a high ultraviolet absorbing property and an ultraviolet absorbing ability (ultraviolet blocking ability) that is used in an electronic image display device. Further, two or more of ultraviolet absorbents having different maximum absorption wavelengths may be used in combination in order to widen the ultraviolet absorption band.

Examples of the benzotriazole-based ultraviolet absorbent include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyl)phenyl]-5-tert-butyl-2H-benzotriazole, 2-[2'-hydroxy-5'-(methacryloyloxyethyl)phenyl]-5-nitro-2H-benzotriazole, 2-(2-hydroxy-5-tert-butylphenyl)-2H-benzotriazole, benzenepropanoic acid-3-(2H-benzotriazol-2-yl)-5-(1,1-dimethylethyl)-4-hydroxy-, C7- to 9-branched or straight chained alkyl ester, 2-(2H-benzotriazol-2-yl)-4,6-bis(1-methyl-1-phenylethyl)phenol, 2-(2H-benzotriazol-2yl)-6-(1-methyl-1-phenylethyl)-4-(1,1,3,3-tetramethylbutyl)phenol and the like.

Examples of the hydroxyphenyltriazine-based ultraviolet absorbent include 2-[4-[(2-hydroxy-3-dodecyloxypropyl)oxy]-2-hydroxyphenyl]-4,6-bis(2,4-dimethylphenyl)-1,3,5-triazine, 2-[4-(2-hydroxy-3-tridecyloxypropyl)oxy]-2-hydroxyphenyl)-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, 2-(2-hydroxy-4-[1-oxtyloxycarbonylethoxy]phenyl)-4,6-bis(4-phenylphenyl)-1,3,5-triazine, 2,2',4,4'-tetrahydroxybenzophenone, 2,2'-dihydroxy-4,4'-dimethoxybenzophenone, 2,2'-dihydroxy-4-methoxybenzophenone, 2,4-dihydroxybenzophenone, 2-hydroxy-4-acetoxyethoxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-n-octoxybenzophenone, 2,2'-dihydroxy-4,4'-dimethoxy-5,5'-disulfobenzophenone-disodium salt and the like.

The content of the ultraviolet absorbent depends on a required ultraviolet transmittance or absorptivity of an ultraviolet absorbent, but is usually 20 parts by mass or less, and preferably 1 part by mass to 20 parts by mass, based on 100 part by mass of the ultraviolet curable resin. When the content of the ultraviolet absorbent is more than 20 parts by mass, there is a tendency that the curability of the curable composition by ultraviolet rays is reduced, and at the same time, there is a concern that the visible light transmittance of the hardcoat film 10 may be reduced. Meanwhile, when the content of the ultraviolet absorbent is less than 1 part by mass, the ultraviolet absorptivity of the hardcoat film 10 may not be sufficiently exhibited.

[Polarizing Plate]

The polarizing plate of the present invention has the optical film and a polarizing film. As the polarizing film, any one of an iodine-based polarizing film, a dye-based polarizing film which uses a dichromatic dye, and a polyene-based polarizing film may be used. A polyvinyl alcohol-based film is generally used to prepare an iodine-based polarizing film and a dye-based polarizing film. The absorption axis of the polarizing film corresponds to the stretching direction of the film. Therefore, the polarizing film stretched to the machine direction (conveying direction) has an absorption axis parallel to the longitudinal direction, and the polarizing film stretched to the transverse direction (a direction vertical to the conveying direction) has the absorption axis vertical to the longitudinal direction.

The polarizing film generally has a protective film. In the present invention, the optical film may function as a protective film of the polarizing film. When a protective film of the polarizing film is stacked apart from the optical film, a cellulose ester film having high optical isotropy as a protective film is preferably used.

A preferred method for manufacturing the polarizing plate of the present invention includes a process of continuously stacking the optical film and the polarizing film respectively in a long state. The long polarizing plate is cut to fit the size of a screen in the image display device used.

A linear polarizing film as the polarizing film may be used in combination with the optical film to manufacture a polarizing film-integrated optical film which functions as a discotic polarizing plate or an elliptically-polarizing plate, with high productivity. These discotic polarizing plates or elliptically-polarizing plates have a plurality of uses, such as the use for improving the contrast of or enlarging the viewing angle of a liquid crystal display device, the use as an antireflection film of an organic EL display device, the use as a luminance improving film by stacking with a cholesteric liquid crystal film or the use as a viewing improving film of a 3D display device.

Figure 2:
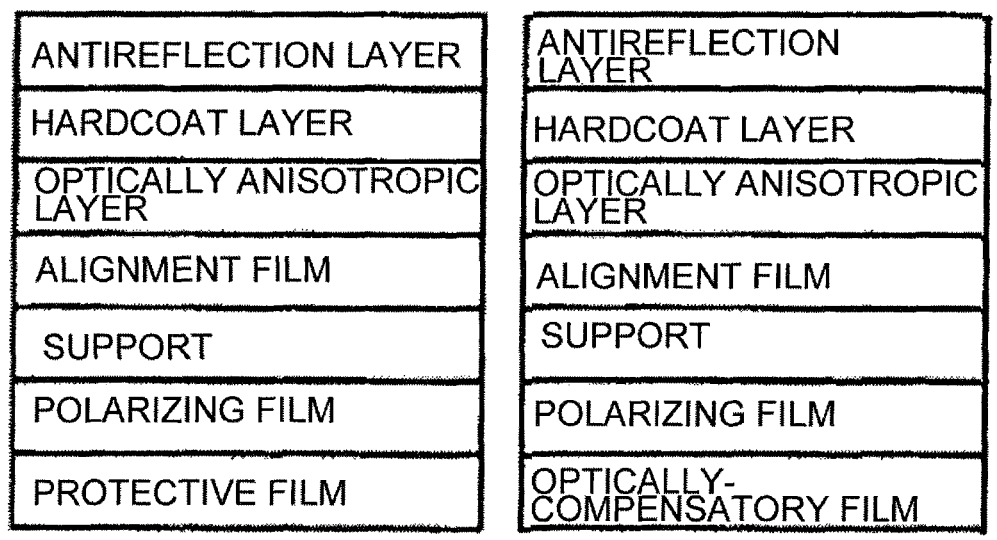
FIG. 2 is a schematic view illustrating an example of a polarizing plate according to the present invention.
Figure 3:
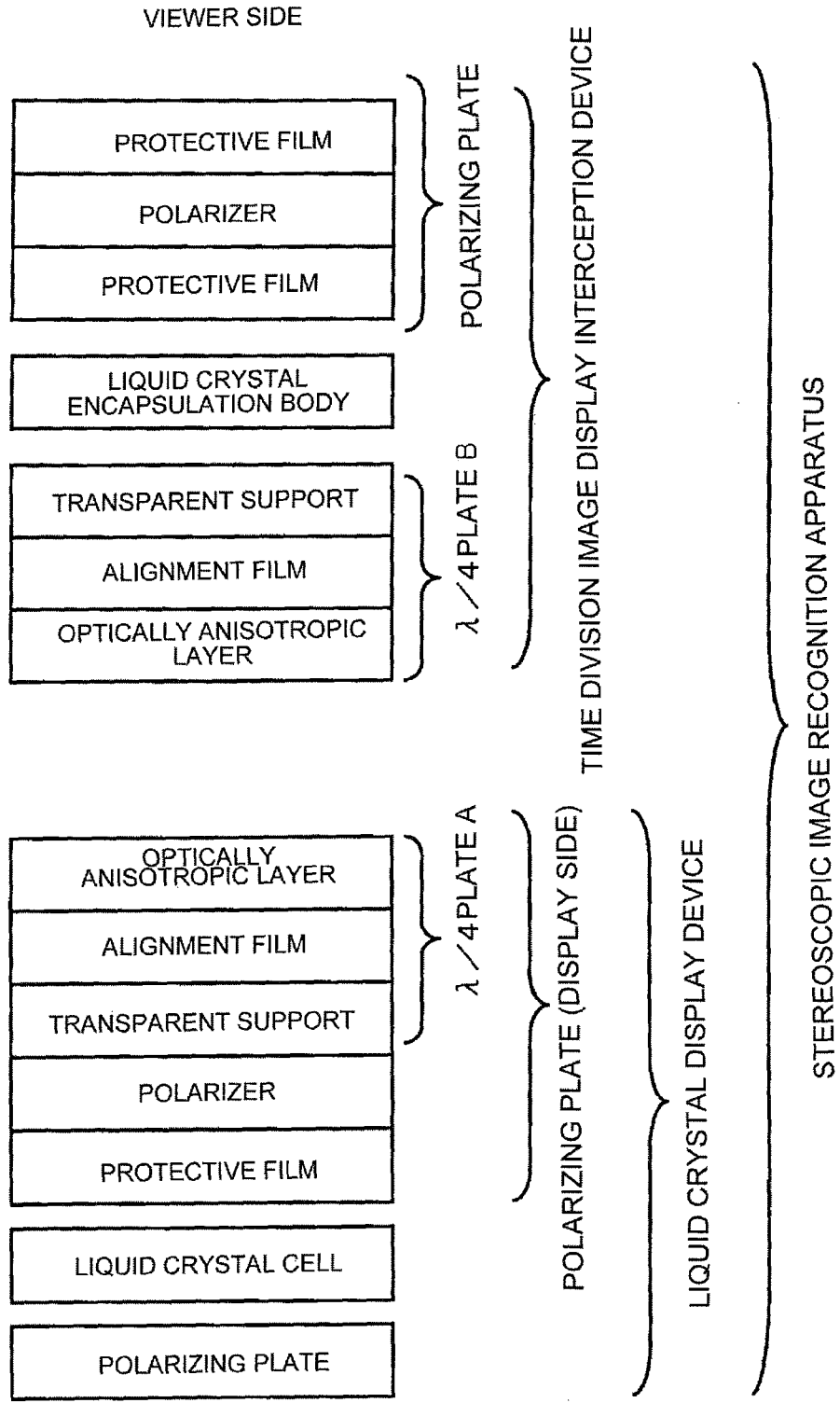
FIG. 3 is a schematic view illustrating an example of a stereoscopic image recognition apparatus of the present invention.
Figure 4:
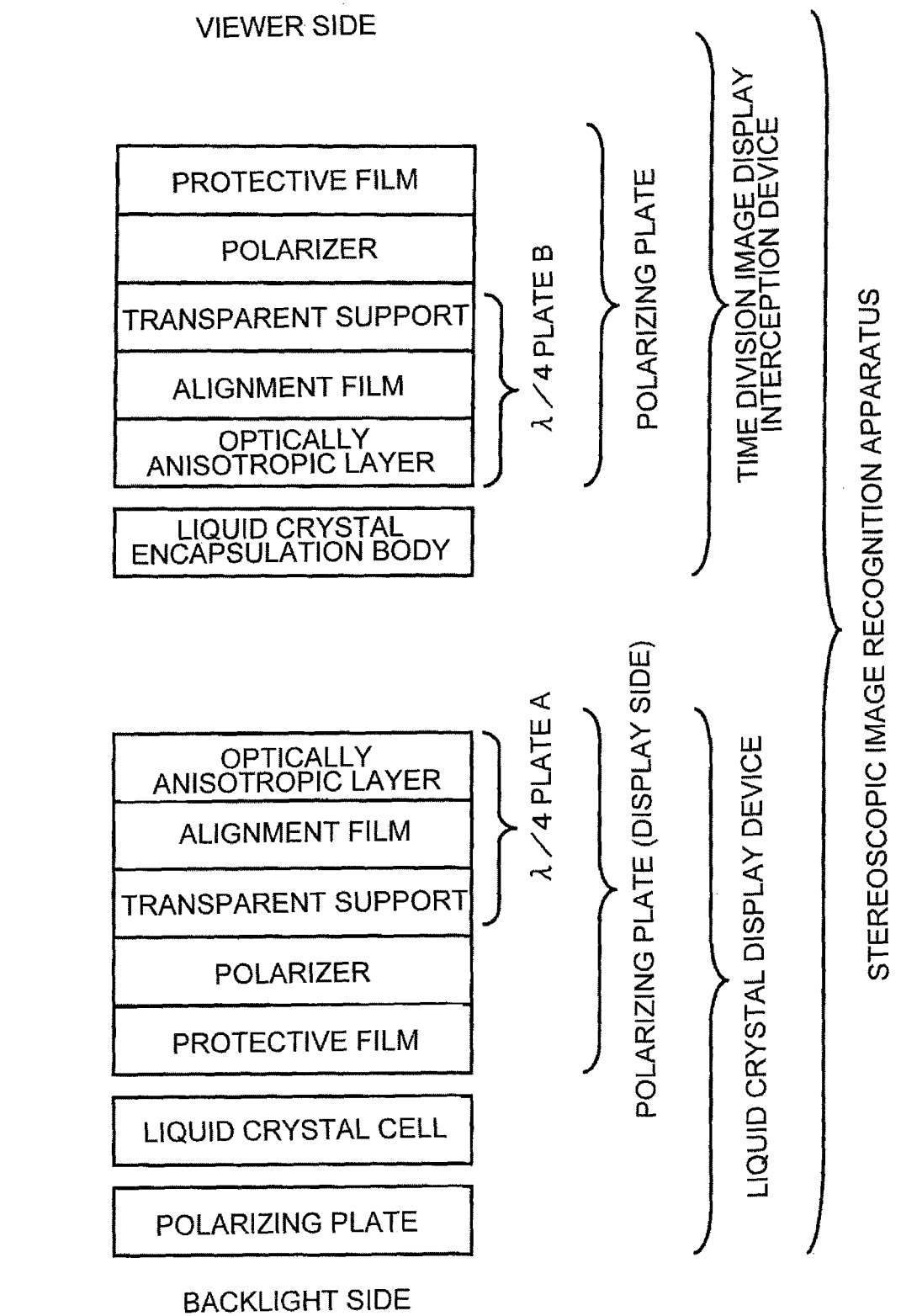
FIG. 4 is a schematic view illustrating an example of a stereoscopic image recognition apparatus of the present invention.
Figure 5:
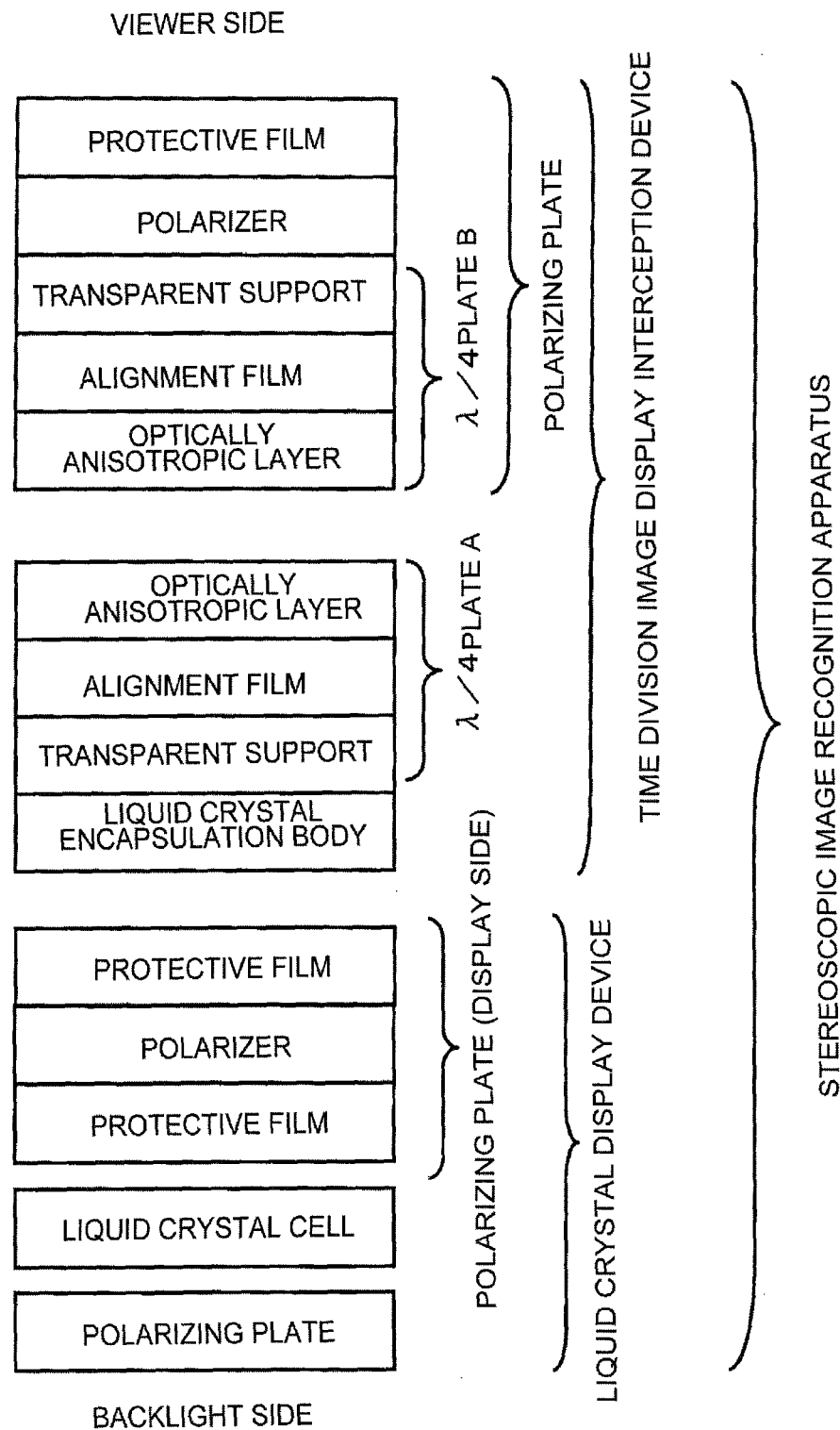
FIG. 5 is a schematic view illustrating an example of a stereoscopic image recognition apparatus of the present invention.
Figure 6:
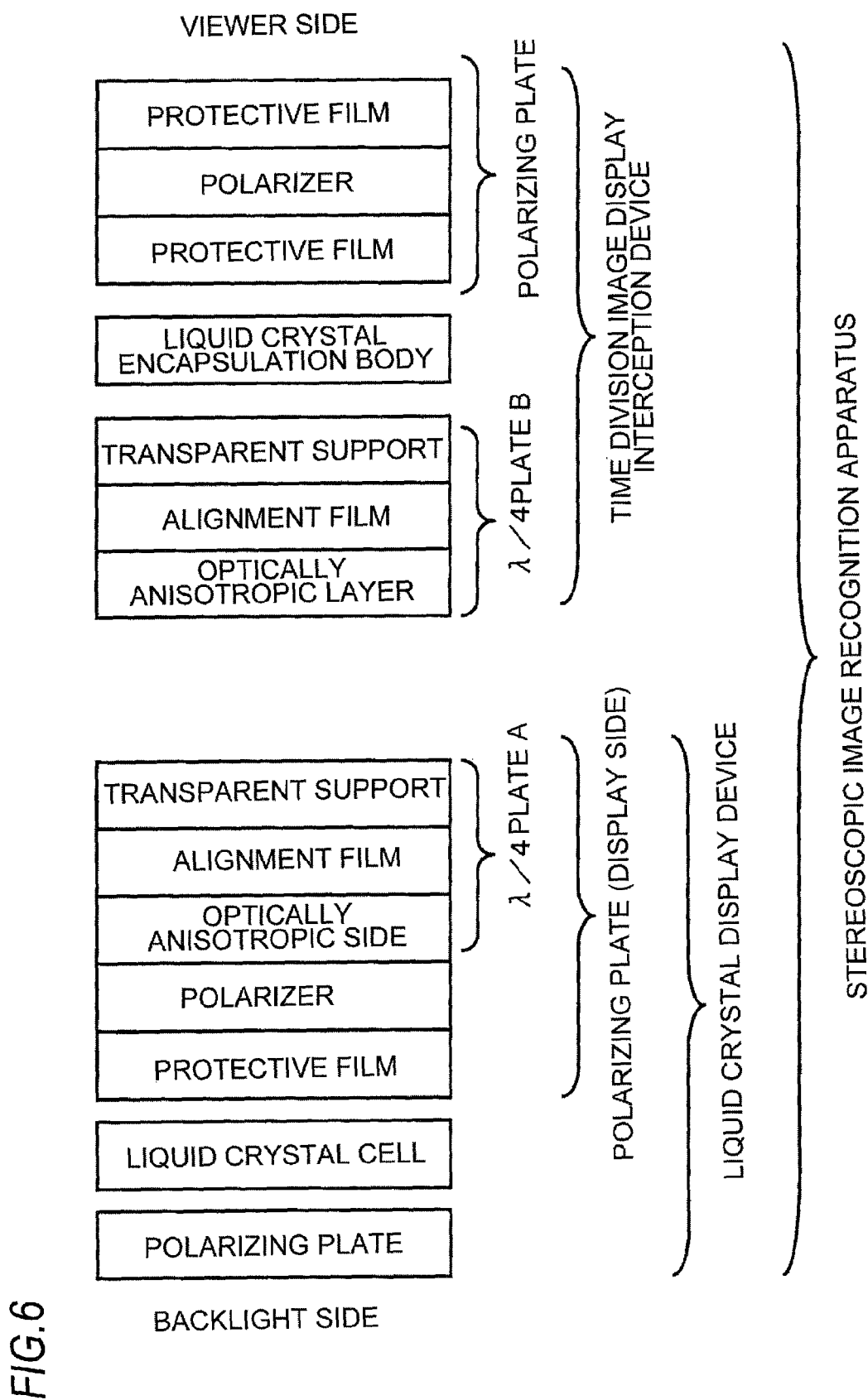
FIG. 6 is a schematic view illustrating an example of a stereoscopic image recognition apparatus of the present invention.

Although FIG. 2 illustrates two examples of configuration of polarizing plates in the present invention, the present invention is not limited thereto.

The stereoscopic image recognition apparatus according to the present invention includes a liquid crystal display device and a time division display interception device, in which the liquid crystal display device includes a liquid crystal cell and a pair of polarizing plates on both sides of the liquid crystal cell, and the time division image display interception device includes a polarizer, a liquid crystal encapsulation body, and a λ/4 plate B. The display side polarizing plate of the liquid crystal display device and the polarizing plate of the time division image display interception device may be further laminated with the optical film on one side of the polarizing film and an optically-compensatory film with an optical anisotropy on the other side of the polarizing film. The optical film, the polarizing film, the optically-compensatory film, and the liquid crystal cell in the present invention are arranged in this order from the viewer side, or the optical film, the polarizing film, the optically-compensatory film, and the liquid crystal cell in the present invention are arranged in this order from the backlight side, whereby the optically-compensatory film may be made to function as a film for compensating the contrast or viewing angle of the liquid crystal display device, and the optical film in the present invention in the present invention may function as a film used on the outside (viewer side or backlight side) of the polarizing film.

[Liquid Crystal Display Device]

The liquid crystal display device in the present invention includes a liquid crystal cell, and a pair of polarizing plates on the both sides of the liquid crystal cell (a display side polarizing plate and a backlight side polarizing plate), and has a λ/4 plate (as described above, including a transparent support, an alignment film, and an optically anisotropic layer containing a discotic liquid crystal compound) on the visible side of the polarizer of the display side polarizing plate, in which the polarizer and the λ/4 plate are arranged in the order of the polarizer, the transparent support, the alignment film, and the optically anisotropic layer containing the discotic liquid crystal compound from the backlight side toward the visible side.

Alternatively, the liquid crystal display device has the λ/4 plate (as described above, including a transparent support, an alignment film, and an optically anisotropic layer containing a discotic liquid crystal compound) on the visible side of the polarizer of the display side polarizing plate. In which the polarizer and the λ/4 plate are arranged in the order of the polarizer, the optically anisotropic layer containing the discotic liquid crystal compound, the alignment film, and the transparent support from the backlight side toward the visible side. With this layer arrangement, manufacture of a λ/4 plate-integrated polarizing plate by adhering the polarizer and the λ/4 plate is generally enabled by using an adhesive.

The liquid crystal display device may be any of reflection type, semi-transmission type, and transmission type liquid crystal display devices. The liquid crystal display device generally includes a polarizing plate, a liquid crystal cell, and as desired, a phase difference plate, a reflective layer, a light diffusion layer, a backlight, a front light, a light control film, a light guide plate, a prism sheet, and a color filter. In the present invention, although the optical film is used on the outer side (visible side) of the liquid crystal display device, it may be used on the backlight side. As the liquid crystal cell, an ordinary liquid crystal cell, in which a liquid layer is sandwiched between a pair of transparent substrates with an electrode, may be used without a specific limit. As the transparent substrates of the liquid crystal cell, there is no specific limit if a liquid crystalline material for forming the liquid crystal layer is aligned in a specific alignment direction. Specifically, it is possible to use any of a transparent substrate which has a property to align the liquid crystal, and a transparent substrate which lacks for aligning capability but is formed with an alignment film having a property of aligning liquid crystal. In addition, as the electrode of the liquid crystal cell, a publicly-known electrode may be used. Typically, the electrode may be provided on a surface of a transparent substrate where the liquid crystal layer is in contact, and when a substrate with an alignment film is used, the electrode may be provided between the substrate and the alignment film. The liquid crystalline material forming the liquid crystal layer may be various ordinary low-molecular liquid crystalline compounds, high-molecular compounds and a mixture thereof capable of forming various liquid crystal cells without a specific limit. In addition, a pigment a chiral agent, or a non-liquid crystalline compound may be added to these within a range of unaffecting the liquid crystalline property.

The liquid crystal cell may include various constituent elements necessary to constitute various types of liquid crystal cells as described below, in addition to the above-mentioned electrode substrate and liquid crystal layer. Examples of the liquid crystal cell mode includes various modes such as a TN (Twisted Hematic) mode, an STN (Super Twisted nematic) mode, an ECB (Electrically Controlled Birefringence) mode, an IPS (In-Plane Switching) mode, a VA (Vertical Alignment) mode, an MVA (Multidomain Vertical Alignment) mode, a PVA (Patterned Vertical Alignment) mode, au OCB (Optically Compensated Birefringence) mode, a HAN (Hybrid Aligned Nematic) mode, an ASM (Axially Symmetric Aligned Microcell) mode, a halftone gray scale mode, a domain division mode or a display mode using a ferroelectric liquid crystal and an antiferroelectric liquid crystal, and the like. In addition, the driving system of the liquid crystal cell is not also particularly limited, and may be any driving system of a passive matrix system used in STN-LCD or the like, an active matrix system using an active electrode such as TFT (Thin Film Transistor) electrode, a TFD (Thin Film Diode) electrode or the like, a plasma address system, and the like. The driving system may also be a field sequential system which does not use a color filter.

The polarizing plate in the present invention is preferably used in reflection-type, semi-transmission type and transmission type liquid crystal display devices. Furthermore, the polarizing plate in the present invention is combined with a cholesteric liquid crystal film, and thus is also preferably used as a luminance improving film. The reflection type liquid crystal display device has a configuration in which a reflection plate, a liquid crystal cell and a polarizing plate are stacked in this order. The phase difference plate is disposed between a reflection plate and a polarizing film (between a reflection plate and a liquid crystal cell or between a liquid crystal cell and a polarizing film). The reflection plate may share a substrate with a liquid crystal cell. The semi-transmission-reflection type liquid crystal display device at least includes a liquid crystal cell, a polarizing plate disposed closer to an observer side than to the liquid crystal cell, at least one phase difference plate disposed between the polarizing plate and the liquid crystal cell, and a semi-transmission reflection layer provided in the back away from the observer father than the liquid crystal layer, and has at least one phase difference plate and a polarizing plate in the back away from the observer further than the semi-transmissive reflection layer. In this type of the liquid crystal display device. It is possible to use both a reflection mode and a transmission mode by providing a backlight.

The liquid crystal cell is preferably of a VA mode, an OCB mode, an IPS mode or a TN mode.

In the VA mode liquid crystal cell, rod-like liquid crystalline molecules are substantially vertically aligned when no voltage is applied. The VA mode liquid crystal cells include (1) liquid crystal cells in a VA mode in a narrow sense in which rod-like liquid crystalline molecules are aligned substantially vertically when no voltage is applied but are aligned substantially horizontally when voltage is applied (described in the official gazette of Japanese Patent Application Laid-Open No. 1-176625), (2) liquid crystal cells (in an MVA mode) in which a VA mode is multidomained for enlarging the viewing angle (described in SID97, Digest of Tech. Papers (Proceedings) 28 (1997), 845), (3) liquid crystal cells in a mode (n-ASM mode) in which rod-like liquid crystalline molecules are aligned substantially vertically when no voltage is applied but are aligned in a twisted multidomained mode when voltage is applied (described in Proceedings of Symposium on Japanese Liquid Crystal Society, 58 to 59 (1988)), and (4) liquid crystal cells in a SURVAIVAL mode (reported in LCD International 98).

The OCB mode liquid crystal cell is a liquid crystal cell in a bend alignment mode in which rod-shaped liquid crystalline molecules are substantially reversely (symmetrically) aligned in the upper and lower portions of the liquid crystal cell. Liquid crystal displays using the liquid crystal cell in bend alignment mode are disclosed in U.S. Pat. Nos. 4,583,825 and 5,410,422. The rod-like liquid crystalline molecules are symmetrically aligned in the upper and lower portions of the crystal cell are symmetrically aligned and thus the liquid crystal cell in a bend alignment mode has a self-optically-compensatory function. For this reason, the liquid crystal mode is referred to as an OCB (Optically Compensatory Bend) liquid crystal mode. The liquid crystal display device in a bend alignment mode is advantageous in fast response speed.

In a liquid cell in an IPS mode, rod-like liquid crystal molecules are aligned substantially in parallel to a substrate, and the liquid crystal molecules respond planarly by applying an electric field parallel to the surface of the substrate. An IPS mode displays black when no electric field is applied thereto, and the transmission axes of a pair of upper and lower polarizing plates are disposed orthogonal to each other. Methods for improving the viewing angle by reducing light leakage in an inclined direction during the black display using an optically compensatory sheet are disclosed in the official gazettes of Japanese Patent Application Laid-Open-Nos. H10-54982, H11-202323, H9-292522, H11-133408, H11-305217, H10-307291 and the like.

In a liquid cell in a TN mode, rod-like liquid crystalline molecules are substantially horizontally aligned when no voltage is applied, and are aligned twisted at 60° to 120°, liquid crystal cells in TN mode are mostly used as a color TFT liquid crystal display device, and are described in numerous literatures.

It is preferred that the polarizing plate of the present invention is configured by stacking the optical film, polarizing film and optically-compensatory film of the present invention. It is preferred that the optically-compensatory film has a function as a compensatory film of contrast or viewing angle of a liquid crystal display device. As the optically-compensatory film, it is possible to use an optically-compensatory film in which the optical anisotropy is developed by stretching a polymer film or aligning a liquid crystalline compound. It is preferred that the optically-compensatory film controls the refractive index anisotropy in the three-dimensional direction according to the mode or the disposed position of a liquid crystal display device used. The refractive index anisotropy in the three-dimensional direction may be controlled in the molecular shape or the alignment state of a liquid crystalline compound, may be controlled by using a polymer film having an optical anisotropy used as a support, and may be controlled by the combination thereof.

One of preferred aspects of the optically-compensatory film includes liquid crystalline compounds, and discotic liquid crystal compounds or rod-like liquid crystal compounds are preferably used. The alignment state of the liquid crystalline compound is preferably any one of a vertical alignment, a horizontal alignment, a hybrid alignment, an inclined alignment, a twisted alignment and a spiral alignment.

The vertical alignment of a discotic liquid crystalline compound means that the disc plane of the discotic liquid crystalline compound is substantially vertical to the film surface (the molecular symmetry axis is substantially parallel to the film surface). The average tilt angle of the disc plane for the film surface is preferably 70° to 90°, more preferably 75° to 90% and most preferably 80° to 90°.

The horizontal alignment of a discotic liquid crystalline compound means that the disc plane of the discotic liquid crystalline compound is substantially parallel to the film surface (the molecular symmetry axis is substantially vertical to the film surface). The average tilt angle of the disc plane for the film surface is preferably 70° to 90°, more preferably 0° to 15°, And most preferably 0° to 10°.

The vertical alignment of the rod-like liquid crystalline compound means that the major axis (molecular symmetry axis) of the rod-like liquid crystalline compound is substantially vertical to the film surface. The average tilt angle of the major axis for the film surface is preferably 70° to 90°, more preferably 75° to 90°, and most preferably 80° to 90°.

The horizontal alignment of the rod-like liquid crystalline compound means that the major axis (molecular symmetry axis) of the rod-like liquid crystalline compound is substantially horizontal to the film surface. The average tilt angle of the major axis for the film surface is preferably 0° to 20°, more preferably 0° to 15°, and most preferably 0° to 10°.

When the optically-compensatory film includes a vertically aligned discotic liquid crystalline compound or a vertically aligned rod-like liquid crystalline compound, the optically anisotropic layer may be suitably used as a viewing angle-compensatory film of a liquid crystal display device in an IPS mode and the like.

When the optically compensatory layer is used as a viewing angle-compensatory film of a liquid crystal display device in an IPS mode, the in-plane retardation of an optically anisotropic layer in which, a discotic liquid crystalline compound is vertically aligned is preferably 50 nm to 200 nm, more preferably 60 nm to 180 nm, and most preferably 70 nm to 160 nm. Further, the retardation in a thickness direction of the optically anisotropic layer is −100 nm to −25 nm, more preferably −90 nm to −30 nm, and most preferably −80 nm to −35 nm. Further, a transparent support may be included. The in-plane retardation of the support is preferably 0 nm to 20 nm, more preferably 0 nm to 10 nm, and most preferably 0 nm to 5 nm. Further, the retardation in a thickness direction of the support is preferably 20 nm to 120 nm, and more preferably 40 nm to 100 nm.

When the optically anisotropic layer is used as a viewing angle-compensatory film of a liquid crystal, display device in an IPS mode, the in-plane retardation of an optically anisotropic layer in which a rod-like liquid crystalline compound is vertically aligned is preferably 0 nm to 10 nm, more preferably 0 nm to 5 nm, and most preferably 0 nm to 3 nm. Further, the retardation in a thickness direction of the optically anisotropic layer is −400 nm to −80 nm, more preferably −360 nm to −100 nm, and most preferably −320 nm to −120 nm. In addition, a transparent support may be included. The in-plane retardation of the support is preferably 20 nm to 150 nm, more preferably 30 nm to 130 nm, and most preferably 40 nm to 110 nm. Further, the retardation in a thickness direction of the support is 100 nm to 300 nm, more preferably 120 nm to 280 nm, and most preferably 140 nm to 260 nm.

When the optically-compensatory film includes a horizontally aligned discotic liquid crystalline compound or a horizontally aligned rod-like liquid crystalline compound, the optically anisotropic layer may be suitably used as a viewing angle-compensatory film of a liquid crystal display device in VA mode and the like.

When the optically anisotropic layer is used as a viewing angle-compensatory film of a liquid crystal display device in a VA mode, the in-plane retardation of an optically anisotropic layer in which a discotic liquid crystalline compound is horizontally aligned is preferably 0 nm to 10 nm, and more preferably 0 nm to 5 nm. Further, the retardation in a thickness direction of the optically anisotropic layer is preferably 30 nm to 300 nm, and more preferably 40 nm to 200 nm. In addition, a transparent support may be included. The in-plane retardation of the support is preferably 0 nm to 40 nm, and more preferably 0 nm to 20 nm. Further, the retardation in a thickness direction of the support is preferably 0 nm to 200 nm, and more preferably 20 nm to 150 nm.

When the optically anisotropic layer is used as a viewing angle-compensatory film of a liquid crystal display device in a VA mode, the in-plane retardation of an optically anisotropic layer in which a rod-like liquid crystalline compound is horizontally aligned is preferably 60 nm to 140 nm, and more preferably 80 nm to 120 nm. Further, the retardation in a thickness direction of the optically anisotropic layer is preferably 30 nm to 70 nm, and more preferably 40 nm to 60 nm. In addition, a transparent support may be included. The in-plane retardation of the support is preferably 0 nm to 20 nm, and more preferably 0 nm to 10 nm. Further, the retardation in a thickness direction of the support is preferably –30 nm to 30 nm, and more preferably –20 nm to 20 nm.

When the optically-compensatory film includes a discotic liquid crystalline compound and the disc plane of the discotic liquid crystalline compound is obliquely aligned to the film surface, the optically anisotropic layer may be suitably used as a viewing angle-compensatory film of a liquid crystal display device in a TN mode, an OCB mode, an ECB mode, a HAN mode and the like. In the thickness direction of the optically anisotropic layer, the discotic liquid crystalline compound may be obliquely aligned at a substantially uniform angle or may be in a hybrid alignment with a different tilt angle, but the hybrid alignment is more preferred. When the optically anisotropic layer is used as a viewing angle-compensatory film of a liquid crystal display device in a TN mode, an OCB mode, an ECB mode, a HAN mode and the like, the in-plane retardation of au optically anisotropic layer including a discotic liquid crystalline compound is preferably 0 nm to 50 nm, more preferably 15 nm to 45 nm, and most preferably 20 nm to 40 nm. Furthermore, a transparent support may be included. The in-plane retardation of the support is preferably 0 nm to 60 nm, and more preferably 0 nm to 50 nm. Further, the retardation in a thickness direction of the support is preferably 40 nm to 300 nm, and more preferably 60 nm to 200 nm.

[Time Division Image Display Interception Device]

The time division image display interception, device in the present invention includes a polarizer, a liquid crystal encapsulation body, and a λ/4 plate. In which the time division display interception device has the encapsulation body and the λ/4 plate in the liquid crystal display side of the polarizer.

The time division image display interception device may be any of publicly known ones, but is preferably constituted by liquid crystal (LC) shutter glasses, or by an active retarder panel and polarizing glasses.

The liquid crystal shorter glasses include a polarizing plate and liquid crystal encapsulation body from the viewer side toward the outside (the liquid crystal display device side) in this order, and more preferably include a liquid crystal encapsulation body, a transparent support, an alignment film, and optically anisotropic layer in this order.

The active retarder panel includes a liquid crystal encapsulation body. The active retarder panel may be any of publicly known ones.

The polarizing glasses may be any of publicly known ones.

At least one of the active retarder panel and the polarizing glasses includes the λ/4 plate in the present invention. Preferably, the polarizing glasses have the λ/4 plate on the liquid crystal display device side. When the active retarder panel and the polarizing glasses are used, the active retarder panel is preferably provided on the outer side (front side) of the display side polarizing panel of the liquid crystal display device, and more preferably, a filler is provided between the display side polarizing plate of liquid crystal display device and the active retarder panel.

Examples of the liquid crystal encapsulation body in the liquid crystal shutter glasses or the active retarder panel may include those which are the same as for a liquid crystal cell in each mode in the liquid crystal display device.

[Stereoscopic Image Recognition Apparatus]

The stereoscopic image recognition apparatus according to the present invention includes the liquid crystal display device and a time division image display interception device.

The absorption axis of the display side polarizing plate of the liquid crystal display device and the absorption axis of the polarizer of the time division image display interception device are orthogonal or parallel to each other. Preferably, the absorption axis of the display side polarizing plate of the liquid crystal display device and the absorption axis time of the polarizing plate of the division image display interception device are orthogonal or parallel to each other.

The angle formed by the absorption axis of the display side polarizing plate of the liquid crystal display device and the slow axis of the λ/4 plate A is 45° or 135°, "45°" or "135°" means an angle within a range of a precise angle ±5°. The error in relation to the precise angle is preferably less than 4°, and more preferably less than 3°.

The λ/4 plate A of the liquid crystal display device and the slow axis of the λ/4 plate B of the time division image display interception device are orthogonal or parallel to each other.

Although examples of the inventive stereoscopic image recognition apparatus are illustrated in FIGS. 3 to 6, the present invention is not limited thereto.

Preferably, the absorption axis of the display side polarizing plate of the liquid crystal display device and the absorption axis of the polarizing plate of the time division image display interception device are parallel to each other.

EXAMPLES

Hereinafter, characteristics of the present invention will be described in more detail with reference to Examples and Comparative Examples. The materials, used amounts, ratios, contents of treatments, order of treatments and the like shown in the following Examples may appropriately be modified as long as they do not depart from, the spirit of the present invention. Therefore, the scope of the present invention is not to be construed as being limited by specific Examples shown below.

Manufacture of λ/4 plate

[Manufacture of F102]

<Manufacture of support (Cellulose Acetate Film T1)>

The following composition was put into a mixing tank and stirred while heating to dissolve each component, thereby preparing a cellulose acetate solution.

(Composition of Cellulose Acetate Solution)

| | |
|---|---|
| Cellulose acetate with a degree of acetylation of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of the following retardation enhancer (A), 92 parts by mass of methylene chloride and 8 parts by mass of methanol were put into a separate mixing tank and stirred while heating to prepare a retardation enhancer solution. 25 parts by mass of the retardation enhancer solution was mixed with 474 parts by mass of the cellulose acetate solution, and followed by stirring sufficiently to prepare a dope. The amount of the retardation enhancer added was 6.0 parts by mass based on 100 parts by mass of cellulose acetate.

Retardation enhancer (A)

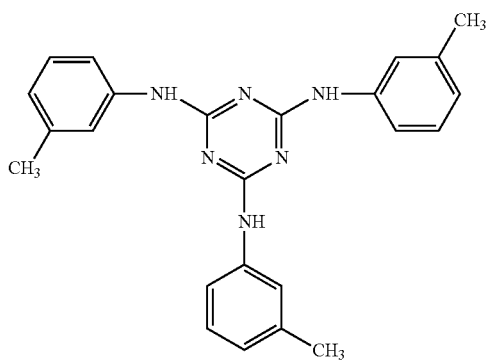

The obtained dope was cast by using a band stretch device. After the temperature of film surface on the band reaches 40° C., the dope was dried with warm air at 70° C. for 1 minute, and the film from the band was dried with dry air at 140° C. for 10 minutes, thereby manufacturing Cellulose Acetate Film T1 having a residual solvent amount of 0.3% by mass.

The width and the thickness of the obtained long cellulose acetate film T1 were 1490 mm and 80 μm, respectively. Further, the in-plane retardation (Re) and the retardation in a thickness direction (Rth) at 550 nm were 8 nm and 78 nm, respectively.

<<Formation of Optically Anisotropic Layer Including Liquid Crystalline Compound>>

(Alkali Saponification Treatment)

The Cellulose Acylate Film T1 was passed through a dielectric heating roll at a temperature of 60° C. to elevate the film surface temperature to 40° C. and then an alkali solution having the composition shown below was coated onto one surface of the film in a coating amount of 14 ml/m² by using a bar coater. Then, the film was conveyed for 10 seconds under a steam type far-IR heater manufactured by Noritake Co., Ltd., which was heated at 110° C. Subsequently, pure water was coated thereon in an amount of 3 ml/m² by using a bar coaler in the same manner as above. Subsequently, the film was washed with water by a fountain coater and dewatered by an air knife, this process was repeated three times, and then the film was conveyed and dried in a drying zone at 70° C. for 10 seconds to manufacture a cellulose acylate film.

(Composition of Alkali Solution)

| | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

(Formation of Alignment Film)

An alignment film coating solution having the following composition was continuously coated onto the saponification-treated long cellulose acetate film as described above, by using a wire bar #14. The film was dried with warm air at 60° C. for 60 seconds and further with warm air at 100° C. for 120 seconds.

| | |
|---|---|
| The following modified polyvinyl alcohol | 10 pars by mass |
| Water | 371 parts by mass |
| Methanol | 119 pars by mass |
| Glutaraldehyde | 0.5 parts by mass |
| Photopolymerization initiator (Irgacre 2959, manufactured by CIBA Japan Co., Ltd.) | 0.3 parts by mass |

Modified polyvinyl alcohol

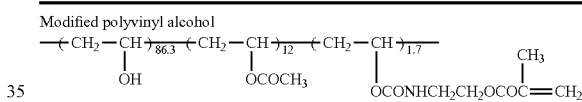

(Formation of Optically Anisotropic Layer Including Discotic Liquid Crystalline Compound)

The alignment film manufactured above was continuously subjected to rubbing Treatment. At this time, the longitudinal direction and the conveying direction of the long film were parallel to each other, and the rotation axis of a rubbing roller was set to be at 45° in a clockwise direction with respect to the longitudinal direction of the film.

Coating Solution (A) including a discotic liquid crystal compound having the following composition was continuously coated on the alignment film manufactured above by using a wire bar #2.7. The conveying speed (V) of the film was set to 36 m/min. For the drying of the solvent of the coating solution and the alignment aging of the discotic liquid crystal compound, the film was heated with warm air at for 90 seconds. Subsequently, the film was irradiated with UV light at 80° C. to fix the alignment of the liquid crystal compound, thereby forming an optically anisotropic layer to obtain Optical Film F102. The film thickness of the optically anisotropic layer of Optical Film F102 was 1.7 μm.

Composition of Optically Anisotropic Coating Solution (A)

| | |
|---|---|
| The following discotic liquid crystal compound | 100 parts by mass |
| Photopolymerization initiator (Irgasure 907, manufactured by Ciba Japan Co., Ltd.) | 3 parts by mass |
| Sensitizer (KAYACURE DETX, manufactured by Nippon Kayaku Co., Ltd.) | 1 part by mass |
| The following pyridinium salt | 1 part by mass |
| The following fluorine-based polymer (FPI) | 0.4 parts by mass |
| Methyl ethyl ketone | 252 parts by mass |

-continued

Discotic liquid crystalline compound

Pyridinium salt

Fluorine-based polymer (FP1)

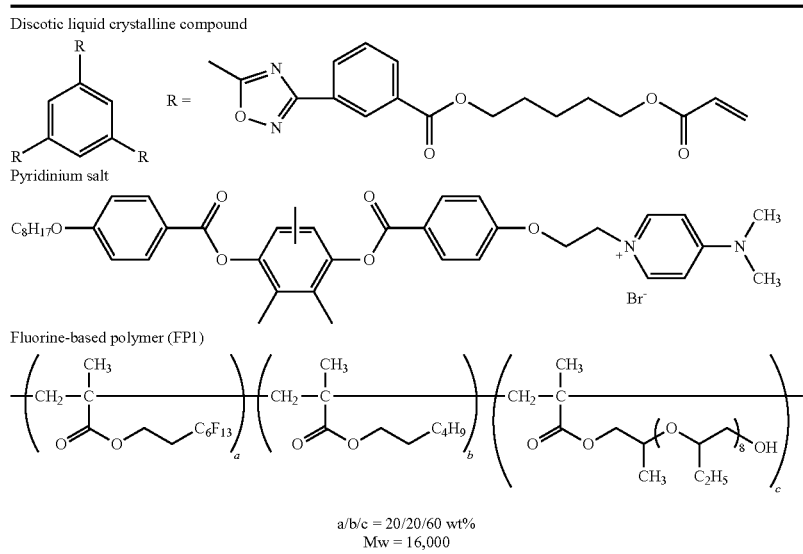

a/b/c = 20/20/60 wt%
Mw = 16,000

The evaluation results of the manufactured Optical Film F102 are presented below. The direction of the slow axes was parallel to a rotation axis of a rubbing roller. That is, the slow axes were in the 45° direction clockwise in relation to the longitudinal direction of supports. Instead of using a separate cellulose acetate film as a support, a glass was used as a substrate to form a discotic liquid crystal compound containing layer, and Re(0), Re(40) and Re(−40) were measured, which were 142.3 nm, 128.9 nm and 128.7 nm, respectively. From these results, it was confirmed that the average inclined angle of the discotic planes of the discotic liquid crystalline molecules in relation to a film plane is 90° and the discotic liquid crystal is aligned perpendicular to the film plane.

$$Rth/Re+0.5=0.57(F102)$$

[Manufacture of F101]

Cellulose Acetate Film T2 was manufactured in the same manner as in the manufacture of Cellulose Acetate Film T1 of Example 1 except that the thickness of the film was changed. The thickness of Cellulose Acetate Film T2 were 60 μm, and at 550 nm, Re was 6 nm, and Rth was 60 nm.

In the same manner as in Example 1, a surface of Cellulose Acetate Film T2 was saponified, and an alignment film was provided again. A rubbing treatment was continuously performed on the manufactured alignment film. At this time, the longitudinal direction and the conveying direction of the long film were parallel to each other, and the rotation axis of the rubbing roller was set to be at 45° in a counterclockwise direction with respect to the longitudinal direction of the film.

Coating Solution (B) containing a discotic liquid crystal compound having the following composition was continuously coated on the alignment film manufactured above by using a wire bar of #2.7. The conveying speed (V) of the film was set to 36 m/min. For the drying of the solvent of the coating solution and the alignment aging of the discotic liquid crystal compound, the film was heated with warm air at 120° C. for 90 seconds. Subsequently, the film was irradiated with UV light at 80° C. to fix the alignment of the liquid crystal compound, thereby forming an optically anisotropic layer to obtain Optical Film F101. The film thickness of the optically anisotropic layer of F101 was 1.0 μm.

Composition of Optically Anisotropic Coating Solution (B)

| | |
|---|---|
| The following discotic liquid crystal compound | 100 parts by mass |
| Photopolymerization initiator (Irgacure 907, manufactured by Ciba Japan Co., Ltd.) | 3 parts by mass |
| Sensitizer (KAYACURE DETX, manufactured by Nippon Kayaku Co., Ltd.) | 1 part by mass |
| The following pyridinium salt | 1 part by mass |
| The following fluorine-based polymer (FP2) | 0.4 parts by mass |
| Methyl ethyl ketone | 252 parts by mass |

Discotic liquid crystalline compound

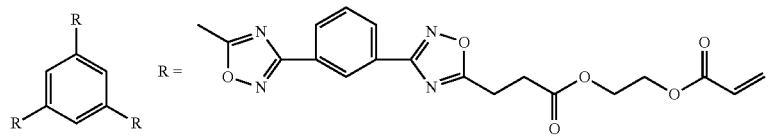

Pyridinium salt

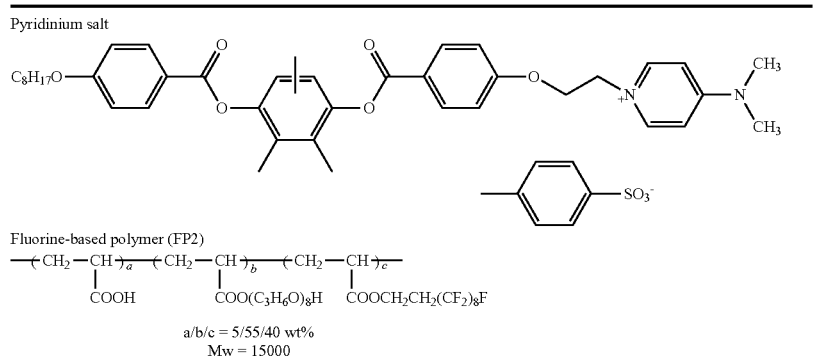

Fluorine-based polymer (FP2)

—(CH$_2$—CH)$_a$—(CH$_2$—CH)$_b$—(CH$_2$—CH)$_c$—
  |                   |                    |
  COOH       COO(C$_3$H$_6$O)$_8$H   COOCH$_2$CH$_2$(CF$_2$)$_8$F a/b/c = 5/55/40 wt%
Mw = 15000

The evaluation of the manufactured Optical Film F101 was performed in the same manner as in Example 1. The direction of the slow axis was orthogonal to the rotation axis of the rubbing roller. That is, the slow axis was in the 45° direction in relation to the longitudinal direction of the support. In addition, it was confirmed that the mean inclined angle of the discotic planes of the discotic liquid crystalline molecules in relation to a film plane is 90° and the discotic liquid crystal is aligned perpendicular to the film plane.

$Rth/Re+0.5=0.44(F101)$

Manufacture of Polarizing Plate for Stereoscopic Display Device

A surface of a support of the manufactured F101 was subjected to alkali saponification treatment. It was immersed in a 1.5 N aqueous sodium hydroxide solution at 55° C. for 2 minutes, washed in a water-washing bath at room temperature, and neutralized at 30° C. by using 0.1 N sulfuric acid. The films were washed again in the water-washing hath, at room temperature, and dried with warm air at 100° C.

Subsequently, a polyvinyl alcohol film having a thickness of 80 μm in a roll shape was continuously stretched 5-fold in an iodine aqueous solution and dried to obtain a polarizing film having a thickness of 20 μm. By using a 3% aqueous solution of polyvinyl alcohol (PVA-117H) manufactured by Kuraray Co. Ltd.) as an adhesive, each film subjected to the above-mentioned alkali saponification treatment and a phase difference film for VA (manufactured by FUJI Photo Film Co., Ltd., Re/Rth at 550 nm=50 nm/125 nm) subjected to alkali saponification treatment in the same manner were prepared, and a polarizing film was sandwiched and adhered between the both films such that these saponification-treated surfaces face the polarizing film, thereby manufacturing long polarizing plates, in which F101 and the phase difference film for VA function as the protective films of the polarizing film. At this time, the angle between the absorption axis of the polarizer and the axis of F101 was set to be 135°. In addition, the angle between the absorption axis of the polarizer and the slow axis of the phase different film for VA was set to be 90°.

In addition, a polarizing plate P102 was manufactured in the same manner except that F101 was changed to P102.

Manufacture of LC Shutter Glasses

An LC shutter glasses G101 was manufactured by peeling off a polarizing plate (SSG-2100 AB manufactured by Samsung) in a side opposite to the viewer's eye side (panel side), and bonding the support side of the manufactured film F101 thereto through an easy-adhesive layer. Here, the slow axis of the film F101 of G101 was adapted to be orthogonal to the slow axis of the film F101 on the polarizing plate P101.

In addition, an LC shutter glasses G102 was manufactured in the same manner except that F101 was changed to F102.

An LC shutter glasses G104 was manufactured by setting the LC of the LC shutter glasses as ECB or OCB, and boding a polarizing plate to the eye side of the LC layer and the film F101 to the opposite side through adhesive layers, respectively. Here, the slow axis of the film F101 of G104 was set to be orthogonal to the slow axis of the film F101 on the polarizing plate P101.

An LC shutter glasses G105 was manufactured by setting the LC of the LC shutter glasses as ECB or OCB, and bonding the film F101 to the eye side of the LC layer and then the polarizing film above the film F101 through easy-adhesive layers, respectively. Here, the slow axis of the film F101 of G105 was set to be orthogonal to the slow axis of the film F101 on the polarizing plate P101.

Manufacture of Active Retarder Panel (Manufacture of TN Mode Panel)

A liquid crystal cell, in which Δn·d of the liquid crystal layer is 450 nm, was manufactured as a TN mode liquid crystal cell, by encapsulating a liquid crystal material having a plus dielectric anisotropy between substrates by a vacuum introduction. Used as the liquid crystal material is a liquid crystal which has a plus dielectric anisotropy, and a refractive anisotropy Δn=0.0854 (589 nm, 20° C.) and Δ∈+8.5 (for example, MLC-9100 manufactured by Merck). In addition, the inner surfaces of the top and bottom substrates were subjected to a rubbing treatment, and when no voltage is applied, the liquid layer was twist-aligned with a twist angle of 90° between the top and bottom substrates.

(Manufacture of ECB Mode Panel)

A liquid crystal cell, in which Δn·d of the liquid crystal layer has is 300 nm, was manufactured as an ECB mode liquid crystal cell, by encapsulating a liquid crystal material with a plus dielectric anisotropy between substrates by a dropping introduction. Used as the liquid crystal material is a liquid crystal which has a plus dielectric anisotropy, and a refractive anisotropy Δn=0.0854 (589 nm, 20° C.) and Δ∈=+8.5 (for example, MLC-9100 manufactured by Merck). In addition, the inner surfaces of the top and bottom substrates were subjected to a rubbing treatment, and when no voltage is applied, the liquid layer was aligned at the 0° cross-angle in which no twist exists between the top and bottom substrates.

(Manufacture of OCB Mode Panel)

A polyimide film is provided on a glass substrate bonded to an ITO electrode as an alignment film, and a rubbing treatment is performed on the alignment film. Two sheets of obtained glass substrates were arranged to be opposed to each other and to be parallel to the rubbing direction, and the thickness of the liquid crystal cell was set to 5.4 μm. A liquid crystal cell of a band alignment was manufactured by introducing a liquid crystalline compound having Δn of 0.1396 (ZLI132 manufactured by Merck) into a gap of the liquid crystal cell. Δnd of the liquid crystal cell was about 750 nm. This was used as the liquid crystal cell of the band alignment mode.

Manufacture of Polarizing Glasses

A polarizing glasses G103 was manufactured by preparing two sheets of P101. The polarizing glasses are configured to have a configuration of a phase difference-film t or VA/a polarizer/F101 in the viewer side.

Manufacture Stereoscopic Display Device

TV: A stereoscopic display device T101 was manufactured by peeling off the polarizing plate n the visible side of UN46 C7000 manufactured by SAMSUNG, and boding the phase difference film for VA of the polarizing plate P101 and the LC cell manufactured as described above through easy-adhesive layers.

In addition, a stereoscopic display apparatus T102 was manufactured in the same manner except that P101 is changed to P102.

Furthermore, the absorption axis of the display side polarizing plate of the liquid crystal display device and the absorption axis of the polarizer of the time division image display interception device were set to be parallel to each other.

Example 1

The constructions of G101 and T101 are adopted as Example 1.

Example 2

The constructions of G102 and T102 are adopted as Example 2.

Comparative Example

Manufacture of Polarizing Plate for LC Shutter Glasses

A polarizing plate PH101 was manufactured in the same manner as for P101 except that the film F101 and the phase difference film for VA are both formed by TD80UL (manufactured by Fujifilm Ltd.).

Manufacture of Polarizing Plate for Stereoscopic Display Device

A polarizing plate PH102 was manufactured in the same manner as for P101 except that the film F101 was formed by TD80UL (manufactured by Fujifilm Ltd).

In the same manner as for P101 except that the optically anisotropic layer side of the film F101 was bonded to a polarizing film through an easy-adhesive layer, a polarizing plate PH103 was manufactured.

Comparative Example 1

GH 101 was manufactured by replacing F101 of G101 in Example 1 with PH101. TH101 was manufactured by replacing P101 of T101 with PH102.

Comparative Example 2

G102 was manufactured in a form free of F101 of G101 in Example 1.

Comparative Example 3

TH103 was manufactured by replacing P101 of T101 in Example 1 with PH103.

Evaluation Result

As evaluation results, (1) brightness, (2) a fluorescent lamp and flicker, (3) Crosstalk (dual images) by face tilting at the time of on-axis observation, and (4) Crosstalk at the time of oblique observation were sensorily evaluated when watching a 3D move with 3D glasses within a room with a fluorescent lamp, and under an environment in which the illuminance of a panel surface is about 100 lux.

Brightness

AA: Not bothered by darkness at ail and very easy to watch 3D

A: Not bothered by darkness and easy to watch 3D

B: Bothered by darkness and slightly difficult to watch 3D

C: Bothered by darkness and very difficult to watch 3D

Flicker

AA: Not bothered at all

A: Hot bothered

B: Slightly bothered

C: Very bothered

Crosstalk

AA: Not bothered at all

A: Not bothered

B: Slightly bothered

C: Very bothered

The results are represented in Table 1. Although the glasses are for both eyes, only one side is simply described for the same layer arrangement.

From Table 1, it can be appreciated that the constructions of the present invention in each layer obtain good evaluation results as compared to the constructions of Comparative Examples.

In addition, the evaluation results in Examples 3 to 22 are represented in Tables 2 to 7.

Example 3

By bonding a clear LR of a low-reflective film (CV film manufactured by Fujifilm Corporation, and indicated as CV-LC in tables) on T101 of Example 1 through an easy-adhesive layer, T103 was manufactured.

Example 4

By bonding a clear AR of a low-reflective film (manufactured by Sony Chemical and indicated as CL-AR in tables) on T101 of Example 1 through an easy-adhesive layer, T104 was manufactured.

Example 5

By bonding CV-LU of a projection inhibiting film (CV film manufactured by Fujifilm Ltd.) on T101 of Example 1 through an easy-adhesive layer, T105 was manufactured.

Example 6

By bonding AGA1 of a projection inhibiting film (manufactured by Sanritz Corporation) on T101 of Example 1 through an easy-adhesive layer, T106 was manufactured.

Example 7

By coating an optical elasticity resin easy-adhesive layer (SVR1100 manufactured by Sony Chemical), as a filler, between T101 of Example 1 and a glass, and bonding a clear LR on the opposite side of the glass through an easy-adhesive layer, T107 was manufactured.

Example 8

In TH101 of Comparative Example 1, by bonding F101 and a clear LR on the visible side of the glass in this order through an easy-adhesive layer, and coating the optical elasticity resin easy-adhesive layer, as a filler, between TH101 and the glass, T108 was manufactured.

Example 9

In TH101 of Comparative Example 1, by bonding the clear LR and F101 to the visible side and panel side of the glass through an easy-adhesive layer, respectively, and coating the optical elasticity resin easy-adhesive layer (SVR1100 manufactured by Sony Chemical), as a filler, between TH101 and the glass, T109 was manufactured.

Example 10

By arranging a glass on T101 of Example 1, in which the glass was bonded with a clear LR on the both sides thereof through an easy-adhesive layer, T110 was manufactured.

Example 11

By arranging a glass on TH101 of Comparative Example 1, in which the glass was bonded with a clear LR and F101 on the visible side and panel side through an easy-adhesive layer, respectively, T111 was manufactured.

Example 12

By arranging a glass on TH101 of Comparative Example 1, in which the glass is bonded with a clear LR on the visible side and a clear LR and F101 on the panel side through an easy-adhesive layer, respectively. T112 was manufactured.

Example 13

By arranging a glass on TH101 of Comparative Example 1, in which the glass is bonded with a clear LR and F101 on the visible side and a clear LR on the panel side, T113 was manufactured.

Example 14

By replacing the glass of T107 of Example 7 with an active retarder layer, T114 was manufactured.

Example 15

By replacing the glass of T108 of Example 8 with an active retarder layer, T115 was manufactured.

Example 16

By replacing the glass of T109 of Example 9 with an active retarder layer, T116 was Manufactured.

Example 17

By replacing the glass of T110 of Example 10 with an active retarder layer, T117 was manufactured.

Example 18

By replacing the glass of T111 of Example 11 with an active retarder layer, T118 was manufactured.

Example 19

By replacing the glass of T112 of Example 12 with an active retarder layer, T119 was manufactured.

Example 20

By replacing the glass of T113 of Example 13 with an active retarder layer, T120 was manufactured.

Example 21

The constructions of G104 and T101 were adopted as Example 21.

Example 22

The constructions of G105 and T101 were adopted as Example 22.

Lake Table 1, it can be appreciated that the constructions in each layer have good evaluation results as compared with the constructions of Comparative Examples.

Example 23

An evaluation was executed for a layer construction which is the same as in Example 1 except that a polarizing plate P103 is manufactured in the same manner except that the optically anisotropic layer of F101 manufactured in Example 1 and a polarizer are bonded with an adhesive (SK-2057 manufactured by Soken Chemical), and P101 of Example 1 was substituted by P103. It was confirmed that the results are substantially same as Example 1.

TABLE 1

| | | | | | | | (Non TV surface layer) | | | | |
|---|---|---|---|---|---|---|---|---|---|---|---|
| | | | Example 1 | | Example 2 | | Comparative Example 1 | | Comparative Example 2 | | Comparative Example 3 |
| Construction | Glasses | G101 | Polarizing plate LC shutter glasses F101 | G102 | Polarizing plate LC shutter glasses F102 | GH101 | Polarizing plate LC shutter glasses PH101 | GH102 | Polarizing plate LC shutter glasses | G101 | Polarizing plate LC shutter glasses F101 |
| | Stereoscopic display device | T101 | P101 LC cell Polarizing plate Backlight unit | T102 | P102 LC cell Polarizing plate Backlight unit | TH101 | PH102 LC cell Polarizing plate Backlight unit | TH101 | PH102 LC cell Polarizing plate Backlight unit | TH103 | PH103 LC cell Polarizing plate Backlight unit |

TABLE 1-continued (Non TV surface layer)

|  |  | Example 1 | Example 2 | Comparative Example 1 | Comparative Example 2 | Comparative Example 3 |
|---|---|---|---|---|---|---|
| Evaluation result | Brightness | AA | AA | C | AA | AA |
|  | Flicker | AA | AA | C | AA | AA |
|  | Crosstalk by tilting face | AA | AA | AA | C | AA |
|  | Crosstalk at oblique observation | AA | A | AA | C | B |

TABLE 2

(TV surface layer)

|  |  |  | Example 3 |  | Example 4 |  | Example 5 |  | Example 6 |
|---|---|---|---|---|---|---|---|---|---|
| Construction | Glasses |  | G101 Polarizing plate<br>LC shutter<br>glasses<br>F101 |  | G101 Polarizing plate<br>LC shutter<br>glasses<br>F101 |  | G101 Polarizing plate<br>LC shutter<br>glasses<br>F101 |  | G101 Polarizing plate<br>LC shutter<br>glasses<br>F101 |
|  | Stereoscopic display device | T101 | CL-LR<br>P101<br>LC cell<br>Polarizing plate<br>Backlight unit | T102 | CL-AR<br>P101<br>LC cell<br>Polarizing plate<br>Backlight unit | T105 | CV-LU<br>P101<br>LC cell<br>Polarizing plate<br>Backlight unit | T106 | AGAI<br>P101<br>LC cell<br>Polarizing plate<br>Backlight unit |
| Evaluation result | Brightness |  | AA |  | AA |  | AA |  | AA |
|  | Flicker |  | AA |  | AA |  | AA |  | AA |
|  | Crosstalk by tilting face |  | AA |  | AA |  | AA |  | AA |
|  | Crosstalk at oblique observation |  | AA |  | AA |  | AA |  | AA |

TABLE 3

(Front plate + Filler)

|  |  |  | Example 7 |  | Example 8 |  | Example 9 |
|---|---|---|---|---|---|---|---|
| Construction | Glasses |  | G101 Polarizing plate<br>LC shutter<br>glasses<br>F101 |  | G101 Polarizing plate<br>LC shutter<br>glasses<br>F101 |  | G101 Polarizing plate<br>LC shutter<br>glasses<br>F101 |
|  | Front plate | T107 | CL-LR<br>Glass<br>Filler | T108 | CL-LR<br>F101<br>Glass<br>Filler | T109 | CL-LR<br>Glass<br>F101<br>Filler |
|  | Stereoscopic display device |  | P101<br>LC cell<br>Polarizing plate<br>Backlight unit |  | PH102<br>LC cell<br>Polarizing plate<br>Backlight unit |  | PH102<br>LC cell<br>Polarizing plate<br>Backlight unit |
| Evaluation result | Brightness |  | AA |  | AA |  | AA |
|  | Flicker |  | AA |  | AA |  | AA |
|  | Crosstalk by tilting face |  | AA |  | AA |  | AA |
|  | Crosstalk at oblique observation |  | AA |  | AA |  | AA |

TABLE 4

(Front plate + No Filler (air layer))

| | | | Example 10 | | Example 11 | | Example 12 | | Example 13 |
|---|---|---|---|---|---|---|---|---|---|
| Construction | Glasses | G101 | Polarizing plate<br>LC shutter<br>glasses<br>F101 | G101 | Polarizing plate<br>LC shutter<br>glasses<br>F101 | G101 | Polarizing plate<br>LC shutter<br>glasses<br>F101 | G101 | Polarizing plate<br>LC shutter<br>glasses<br>F101 |
| | Front plate | T110 | CL-LR<br>Glass<br><br>CL-LR<br>Air layer | T111 | CL-LR<br>Glass<br><br>F101<br>Air layer | T112 | CL-LR<br>Glass<br>F101<br>CL-LR<br>Air layer | T113 | CL-LR<br>F101<br>Glass<br>CL-LR<br>Air layer |
| | Stereoscopic<br>display<br>device | | P101<br><br><br>LC cell<br>Polarizing plate<br>Backlight unit | | Polarizing plate<br>(PH102)<br><br>LC cell<br>Polarizing plate<br>Backlight unit | | Polarizing plate<br>(PH102)<br><br>LC cell<br>Polarizing plate<br>Backlight unit | | Polarizing plate<br>(PH102)<br><br>LC cell<br>Polarizing plate<br>Backlight unit |
| Evaluation<br>result | Brightness | | AA | | AA | | AA | | AA |
| | Flicker | | AA | | AA | | AA | | AA |
| | Crosstalk by<br>tilting face | | AA | | AA | | AA | | AA |
| | Crosstalk at<br>oblique<br>observation | | AA | | AA | | AA | | AA |

TABLE 5

(Active retarder + Filler)

| | | | Example 14 | | Example 15 | | Example 15 |
|---|---|---|---|---|---|---|---|
| Construction | Glasses | G103 | Polarizing plate<br>F101 | G103 | Polarizing plate<br>F101 | G103 | Polarizing plate<br>F101 |
| | Active<br>retarder | T114 | CL-LR<br>Active retarder panel<br>Filler | T115 | CL-LR<br>F101<br>Active retarder panel<br>Filler | T116 | CL-LR<br>Active retarder panel<br>F101<br>Filler |
| | Stereoscopic<br>display device | | P101<br>LC cell<br>Polarizing plate<br>Backlight unit | | Polarizing plate (PH102)<br>LC cell<br>Polarizing plate<br>Backlight unit | | Polarizing plate (PH102)<br>LC cell<br>Polarizing plate<br>Backlightunit |
| Evaluation<br>result | Brightness | | AA | | AA | | AA |
| | Flicker | | AA | | AA | | AA |
| | Crosstalk by<br>tilting face | | AA | | AA | | AA |
| | Crosstalk at<br>oblique<br>observation | | AA | | AA | | AA |
| | | | Active retarder<br>panel: ECB, OCB | | Active retarder<br>panel: ECB, OCB | | Active retarder<br>panel: TN, ECB, OCB |

TABLE 6

(Active retarder + No Filler (air layer))

| | | | Example 17 | | Example 17 | | Example 19 | | Example 20 |
|---|---|---|---|---|---|---|---|---|---|
| Construction | Glasses | G101 | Polarizing plate<br>F101 | G101 | Polarizing plate<br>F101 | G101 | Polarizing plate<br>F101 | G101 | Polarizing plate<br>F101 |
| | Active<br>retarder | T117 | CL-LR<br>Active retarder<br>panel<br>CL-LR<br>Air layer | T118 | CL-LR<br>Active retarder<br>panel<br>F101<br>Air layer | T119 | CL-LR<br>Active retarder panel<br>F101<br>CL-LR<br>Air layer | T120 | CL-LR<br>F101<br>Active retarder panel<br>CL-LR<br>Air layer |
| | Stereoscopic<br>display<br>device | | P101<br><br>LC cell<br>Polarizing plate<br>Backlight unit | | Polarizing plate<br>(PH102)<br>LC cell<br>Polarizing plate<br>Backlight unit | | Polarizing plate<br>(PH102)<br>LC cell<br>Polarizing plate<br>Backlight unit | | Polarizing plate<br>(PH102)<br>LC cell<br>Polarizing plate<br>Backlight unit |

TABLE 6-continued (Active retarder + No Filler (air layer))

| | | Example 17 | Example 17 | Example 19 | Example 20 |
|---|---|---|---|---|---|
| Evaluation result | Brightness | AA | AA | AA | AA |
| | Flicker | AA | AA | AA | AA |
| | Crosstalk by tilting face | AA | AA | AA | AA |
| | Crosstalk at oblique observation | AA | AA | AA | AA |
| | | Active retarder panel: ECB, OCB | Active retarder panel: ECB, OCB | Active retarder panel: ECB, OCB | Active retarder panel: TN, ECB, OCB |

TABLE 7

(LC shutter glasses are ECB, OCB)

| | | | Example 21 | | Example 22 |
|---|---|---|---|---|---|
| Construction | Glasses | G104 | Polarizing plate LC shutter glasses F101 | G105 | Polarizing plate F101 LC shutter glasses |
| | Stereoscopic display device | T101 | P101 LC cell Polarizing plate Backlight unit | T101 | P101 LC cell Polarizing plate Backlight unit |
| Evaluation result | Brightness | | AA | | AA |
| | Flicker | | AA | | AA |
| | Crosstalk by tilting face | | AA | | AA |
| | Crosstalk at oblique observation | | AA | | AA |
| | | | LC shutter glasses: ECB, OCB | | LC shutter glasses: ECB, OCB |

In Tables 5 and 6, "ECB, OCB" for the active retarder panel means that it is carried out by an active retarder panel for an ECB mode or an active retarder panel for an OCB mode. "TN, ECB, OCB" is also the same. In addition, "ECB, OCB" for the LC shutter glasses in Table 7 means that it is carried out by LC shutter glasses for an ECB mode, or LC shutter glasses for an OCB mode.

INDUSTRIAL APPLICABILITY

According to the present invention, it is possible to provide a stereoscopic image forming apparatus which is excellent from the viewpoint of brightness, flicker, and Crosstalk by tilting a face when on-axis watching, and suppresses Crosstalk at the time of oblique observation.

Although the present invention has been described in detail with reference to specific Examples, it is apparent to an ordinarily skilled in the art that various changes and modifications can be made without departing from the idea and scope of the present invention. The present application is based on Japanese Patent Application No. 2010-133007 filed on Jun. 10, 2010 and Japanese Patent Application No. 2011-129624 filed on Jun. 9, 2011, the contents of which are hereby incorporated by reference.

The invention claimed is:

1. A stereoscopic image recognition apparatus comprising:
   a liquid crystal display device including a liquid crystal cell and a pair of polarizing plates on both sides of the liquid crystal cell; and
   a time divisional image display interception device including a polarizer, a liquid crystal encapsulation body, a λ/4 plate A, and a λ/4 plate B,
   wherein the λ/4 plate A is disposed on a visible side of the liquid crystal encapsulation body in the time divisional image display interception device,
   the λ/4 plate B is disposed on a liquid crystal display device side of the polarizer in the time divisional image display interception device,
   an angle formed by an absorption axis of a display side polarizer and a slow axis of the λ/4 plate A is 45° or 135°,
   the λ/4 plate A and the λ/4 plate B include a transparent support, an alignment film, and an optically anisotropic layer containing a discotic liquid crystal compound,
   the discotic liquid crystal compound in the optically anisotropic layer is aligned substantially perpendicular to a plane of the optically anisotropic layer, and
   a polarizer of the display side polarizing plate in the liquid crystal device, the transparent support of the λ/4 plate A, the alignment film of the λ/4 plate A, and the optically anisotropic layer of the λ/4 plate A are arranged toward the visible side in this order.

2. A stereoscopic image recognition apparatus comprising:
   a liquid crystal display device including a liquid crystal cell and a pair of polarizing plates on both sides of the liquid crystal cell; and
   a time divisional image display interception device including a polarizer, a liquid crystal encapsulation body, a λ/4 plate A, and a λ/4 plate B,
   wherein the λ/4 plate A is disposed on a visible side of the liquid crystal encapsulation body in the time divisional image display interception device,
   the λ/4 plate B is disposed on a liquid crystal display device side of the polarizer in the time divisional image display interception device,
   an angle formed by an absorption axis of a display side polarizer and a slow axis of the λ/4 plate A is 45° or 135°,
   the λ/4 plate A and the λ/4 plate B include a transparent support, an alignment film, and an optically anisotropic layer containing a discotic liquid crystal compound,
   the discotic liquid crystal compound in the optically anisotropic layer is aligned substantially perpendicular to a plane of the optically anisotropic layer, and
   a polarizer of the display side polarizing plate in the liquid crystal device, the anisotropic layer of the λ/4 plate A, the alignment film of the λ/4 plate A, and the transparent support of the λ/4 plate A are arranged toward the visible side in this order.

* * * * *